US008670653B2

(12) United States Patent
Shibata et al.

(10) Patent No.: US 8,670,653 B2
(45) Date of Patent: Mar. 11, 2014

(54) ENCODING APPARATUS AND METHOD, AND DECODING APPARATUS AND METHOD

(75) Inventors: Sayoko Shibata, Kanagawa (JP); Zhifang Zeng, Kanagawa (JP); Junichi Ogikubo, Kanagawa (JP); Taro Shigata, Kanagawa (KR)

(73) Assignee: Sony Corporation, Tokyo (JP)

( * ) Notice: Subject to any disclaimer, the term of this patent is extended or adjusted under 35 U.S.C. 154(b) by 1913 days.

(21) Appl. No.: 11/395,358

(22) Filed: Apr. 3, 2006

(65) Prior Publication Data
US 2006/0233525 A1  Oct. 19, 2006

(30) Foreign Application Priority Data

Apr. 15, 2005 (JP) ................................. 2005-119002
Aug. 24, 2005 (JP) ................................. 2005-241992

(51) Int. Cl.
*H04N 5/92* (2006.01)
*H04N 5/917* (2006.01)
*H04N 5/93* (2006.01)

(52) U.S. Cl.
USPC ............................ 386/326; 386/328; 386/354

(58) Field of Classification Search
USPC ......................................................... 386/109
See application file for complete search history.

(56) References Cited

U.S. PATENT DOCUMENTS

| 5,504,823 | A  | * | 4/1996  | Yoon ............................. 382/233 |
| 6,643,763 | B1 |   | 11/2003 | Starke et al. |
| 6,970,642 | B1 |   | 11/2005 | Kutaragi |
| 2002/0031184 | A1 | * | 3/2002  | Iwata ....................... 375/240.23 |
| 2004/0001154 | A1 | * | 1/2004  | Obrador .................... 348/231.2 |

FOREIGN PATENT DOCUMENTS

| EP | 0 790 579 A2 | 8/1997 |
| EP | 1 161 097 A1 | 12/2001 |
| JP | 8-265700 | 10/1996 |
| JP | 8-307868 | 11/1996 |
| JP | 11-341437 | 12/1999 |
| JP | 2000-253405 | 9/2000 |
| JP | 2001-148833 | 5/2001 |
| JP | 2001-273273 | 10/2001 |
| JP | 2002-57986 | 2/2002 |
| JP | 2003-9147 | 1/2003 |

OTHER PUBLICATIONS

Minoru Tanaka, et al., "LSIs for Digital TV Backend System", Sanyo Technical Review, vol. 34, No. 1, Jun. 2002, pp. 48-58.

* cited by examiner

*Primary Examiner* — William C Vaughn, Jr.
*Assistant Examiner* — Asher Khan
(74) *Attorney, Agent, or Firm* — Oblon, Spivak, McClelland, Maier & Neustadt, L.L.P.

(57) ABSTRACT

An encoding method includes controlling recording of frame-position information representing the position of a frame in a video stream, and controlling recording of unit-region-position information representing the position of a unit region serving as a processing unit used when the video stream is decoded.

23 Claims, 34 Drawing Sheets

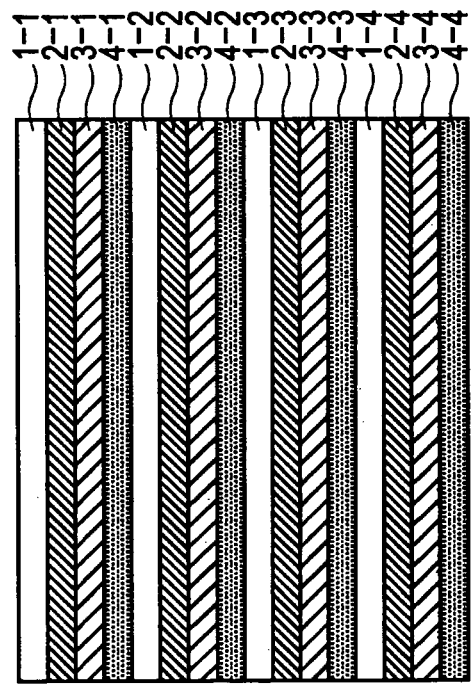
FIG. 1
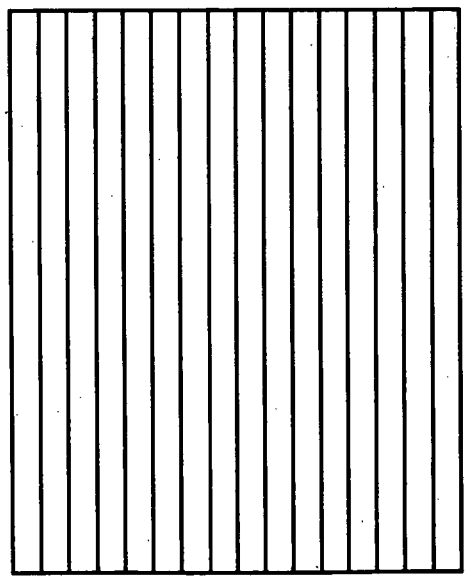

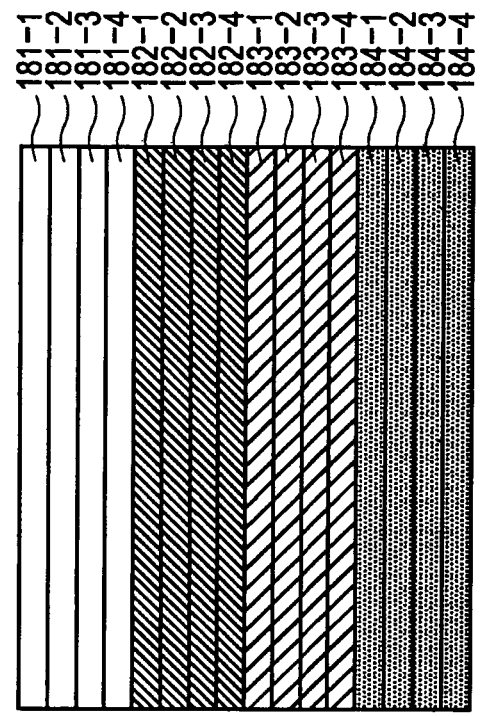
FIG. 6
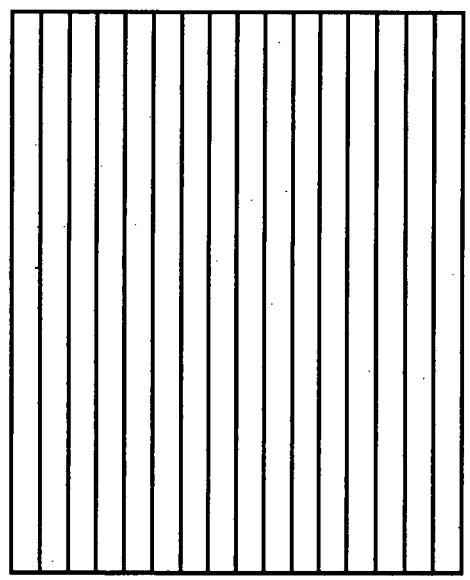

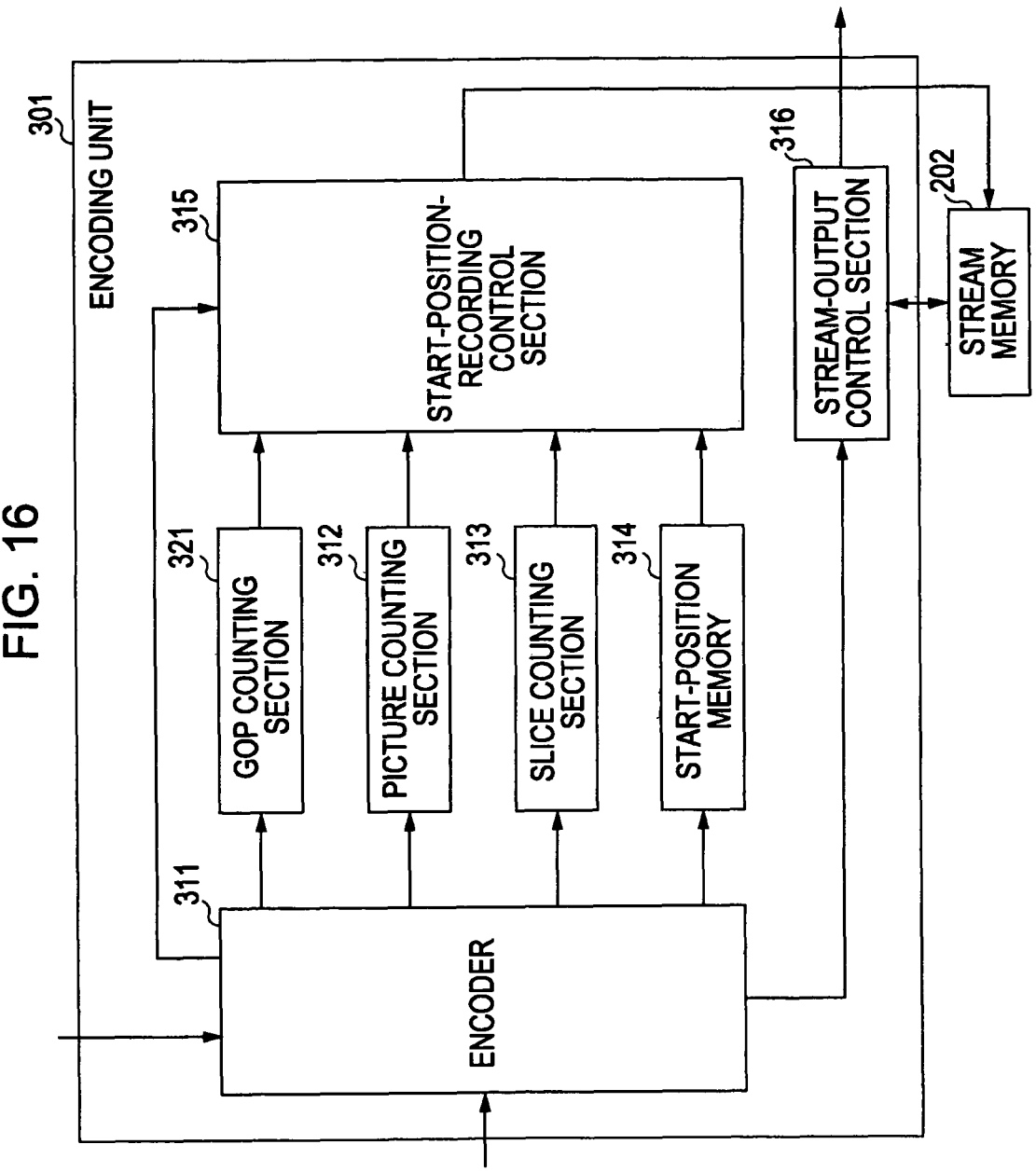

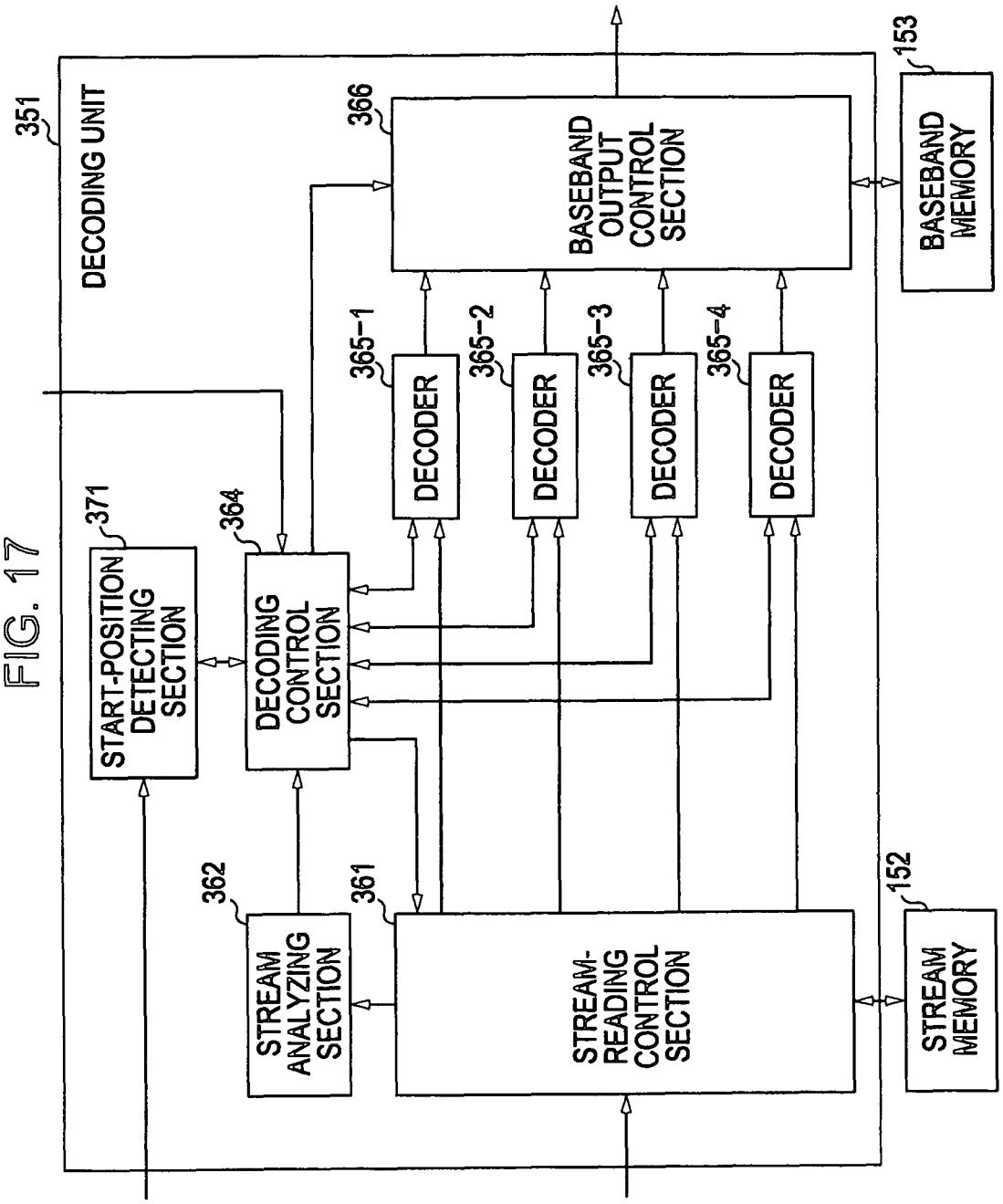

FIG. 18

| CLIP NUMBER |
|---|
| CLIP-START ADDRESS |
| PICTURE-POSITION INFORMATION 1 |
| ⋮ |
| PICTURE-POSITION INFORMATION x |
| SLICE-POSITION INFORMATION 1 |
| ⋮ |
| SLICE-POSITION INFORMATION y |

FIG. 19

| GOP NUMBER | |
|---|---|
| PICTURE-START ADDRESS | |
| SEPARATE INFORMATION 1 | PICTURE NUMBER |
| | DATA LENGTH |
| | OFFSET |
| ⋮ | ⋮ |
| SEPARATE INFORMATION m | PICTURE NUMBER |
| | DATA LENGTH |
| | OFFSET |

FIG. 20

| PICTURE NUMBER | |
|---|---|
| SLICE-START ADDRESS | |
| SEPARATE INFORMATION 1 | SLICE NUMBER |
| | DATA LENGTH |
| | OFFSET |
| ⋮ | ⋮ |
| SEPARATE INFORMATION n | SLICE NUMBER |
| | DATA LENGTH |
| | OFFSET |

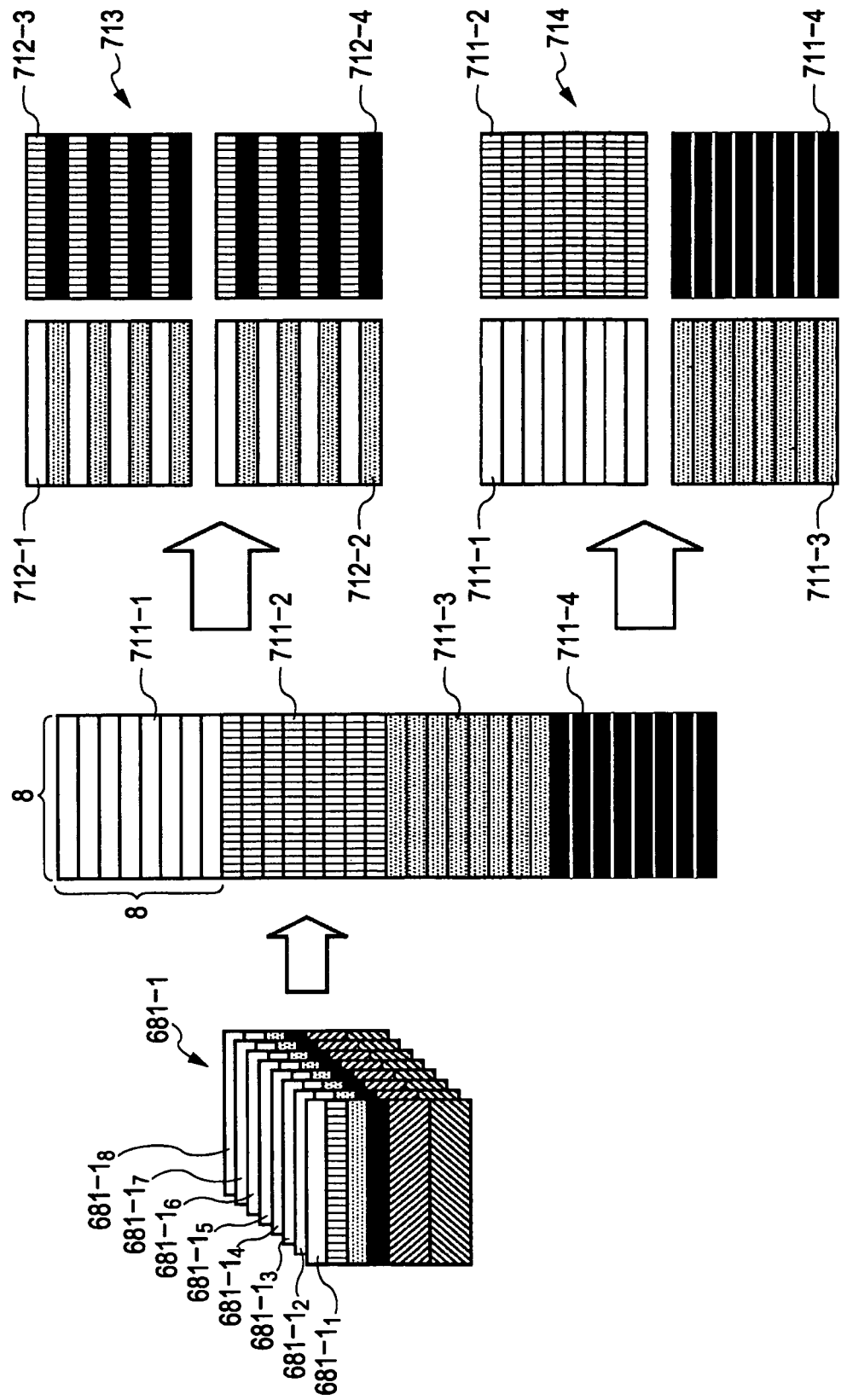

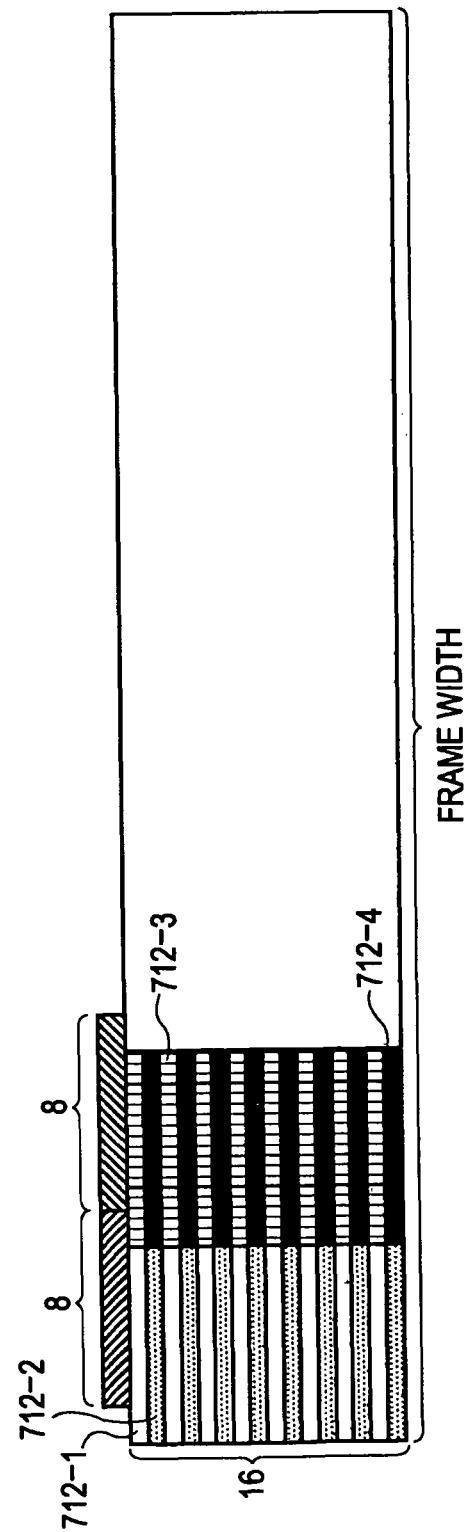

US 8,670,653 B2

ENCODING APPARATUS AND METHOD, AND DECODING APPARATUS AND METHOD

CROSS REFERENCES TO RELATED APPLICATIONS

The present invention contains subject matter related to Japanese Patent Application JP 2005-119002 filed in the Japanese Patent Office on Apr. 15, 2005 and 2005-241992 filed in the Japanese Patent office on Aug. 24, 2005, the entire contents of which are incorporated herein by reference.

BACKGROUND OF THE INVENTION

1. Field of the Invention

The present invention relates to encoding apparatuses and methods and decoding apparatuses and methods, and, in particular, to an encoding apparatus and method, and decoding apparatus and method for realizing an increase in speed of video stream decoding.

2. Description of the Related Art

It has been proposed (see, for example, Japanese Unexamined Patent Application Publication No. 11-341437) that, in order to quickly start video stream decoding, when a video stream is encoded, a frame-recording position designated by a user is recorded as index data, and, when the video stream is decoded, the index data is used to detect a position to start the video stream decoding.

In addition, in order to increase the speed of video stream decoding, it is possible to perform dividing the decoding into a plurality of threads, and using a plurality of processors to execute the threads in parallel. For example, for a video stream encoded in the MPEG-2 (Moving Picture Experts Group-2) standard (hereinafter referred to as "MPEG-2"), decoding of the video stream is divided, with each slice in a picture used as a unit. Specifically, in a case in which decoding is performed in divided form by four processors, as shown in the left part of FIG. 1, when a picture includes sixteen slices, the processors perform parallel decoding of the slices one by one in order from the top slice in the picture. In other words, the processors decode any one of four sets of slices 1-1 to 1-4, slices 2-1 to 2-4, slices 3-1 to 3-4, and slices 4-1 to 4-4 shown in the right part of FIG. 1.

SUMMARY OF THE INVENTION

However, when the decoding is divided as shown in FIG. 1, whenever each processor decodes one slice, it is necessary for the processor to detect the position of the next slice to be decoded, so that a time necessary for the processor to perform decoding position detection is increased. In addition, even if the invention disclosed in Japanese Unexamined Patent Application Publication No. 11-341437 is applied, a time necessary for detecting slice positions is not reduced, so that the time necessary for the processor to perform decoding position detection is almost not reduced.

The present invention has been made in view of the above-described circumstances, and it is desirable to enable high-speed video-stream decoding.

According to an embodiment of the present invention, there is provided an encoding method including the steps of controlling recording of frame-position information representing the position of a frame in a video stream, and controlling recording of unit-region-position information representing the position of a unit region serving as a processing unit used when the video stream is decoded.

In the frame-position-recording controlling step, the recording of the frame-position information may be controlled so that the frame-position information is recorded in the video stream when the video stream is in encoded form, and, in the unit-region-position-recording controlling step, the recording of the unit-region-position information may be controlled so that the unit-region-position information is recorded in the video stream when the video stream is in encoded form.

In frame-position-recording controlling step, the recording of the frame-position information may be controlled so that the frame-position information is recorded in a file different from a file of the video stream, and, in the unit-region-position-recording controlling step, the recording of the unit-region-position information may be controlled so that the unit-region-position information is recorded in the different file.

The video stream may be encoded by using an MPEG standard, and the unit region is a slice.

In the frame-position-recording controlling step, the recording of the frame-position information may be controlled so that the frame-position information is recorded in a user data field of one of a sequence layer and a GOP (group of pictures) layer which are included in the video stream encoded in the MPEG standard, and, in the unit-region-position-recording controlling step, the recording of the unit-region-position information may be controlled so that the unit-region-position information is recorded in a user data field of a picture layer of the video stream encoded in the MPEG standard.

The frame-position information may include information representing a relative position of the frame with respect to the beginning of the video stream, and the unit-region-position information may include information representing a relative position of the unit region with respect to the beginning of the video stream.

The frame-position information may include information representing a number assigned to the frame and a data length of the frame, and the unit-region-position information may include information representing a number assigned to the unit region in the frame and a data length of the unit region.

The frame-position information may include information representing a position on a data recording medium at which the frame is recorded, and the unit-region-position information may include information representing a position on the data recording medium at which the unit region is recorded.

The frame-position information may include information representing a number assigned to the frame and a data length of the frame, and the unit-region-position information may include information representing a number assigned to the unit region in the frame and a data length of the unit region.

According to another embodiment of the present invention, there is provided an encoding apparatus including encoding means which encodes a video stream, and recording control means which controls recording frame-position information and unit-region-position information, the frame-position information representing the position of a frame in the video stream, the unit-region-position information representing the position of a unit region serving as a processing unit used when the video stream is decoded.

According to another embodiment of the present invention, there is provided a decoding method including the steps of, on the basis of frame-position information representing the position of a frame in a video stream, and unit-region-position information representing the position of at least one unit region serving as a processing unit used when the video stream is decoded, detecting at least one decoding-start position at which decoding of the video stream is started, and controlling the decoding of the video stream to be started at the decoding-start position.

The decoding method may further include the steps of extracting the frame-position information from the video stream, and extracting the unit-region-position information from the video stream.

The decoding method may further include the step of controlling acquisition of the frame-position information and the unit-region-position information from a file different from a file of the video stream.

The video stream may be encoded in an MPEG standard, and the unit region may be a slice.

In the detecting step, on the basis of the frame-position information and the unit-region-position information, the decoding-start positions, which correspond to a plurality of decoding means which perform parallel decoding of the video stream, may be detected, and, in the decoding control step, the decoding of the video stream may be controlled so that the plurality of decoding means start the parallel decoding at the decoding-start positions.

The decoding method may further include the step of setting divided regions which are obtained by dividing, by the number of the plurality of decoding means, a region corresponding to an image in one frame of the video stream, and which each include the unit regions. In the decoding control step, the decoding of the video stream may be controlled so that the divided regions in the frame are decoded in parallel by the plurality of decoding means.

The frame-position information may include information representing a relative position of the frame with respect to the beginning of the video stream, and the unit-region-position information may include information representing a relative position of the unit region with respect to the beginning of the video stream.

The frame-position information may include information representing a number assigned to the frame and a data length of the frame, and the unit-region-position information may include information representing a number assigned to the unit region in the frame and a data length of the unit region.

The frame-position information may include information representing a position on a data recording medium at which the frame is recorded, and the unit-region-position information may include information representing a position on the data recording medium at which the unit region is recorded.

The frame-position information may include information representing a number assigned to the frame and a data length of the frame, and the unit-region-position information may include information representing a number assigned to the unit region in the frame and a data length of the unit region.

According to another embodiment of the present invention, there is provided a decoding apparatus for decoding a video stream, the decoding apparatus including detecting means which detects a decoding-start position at which decoding of the video stream is started on the basis of frame-position information representing the position of a frame in the video stream, and unit-region-position information representing the position of a unit region serving as a processing unit used when the video stream is decoded, and decoding control means which controls decoding of the video stream so as to be started at the decoding-start position.

According to another embodiment of the present invention, there is provided a decoding control method including the steps of setting divided regions which are obtained by dividing a region corresponding to a picture of a video stream by the number of first decoding means, and which each include a plurality of unit regions used as processing units of the first decoding means and second decoding means when the first decoding means and the second decoding means decode the video stream, performing first half control in which the first decoding means is controlled so that decoding, up to a predetermined intermediate stage, of the unit regions in each divided region, the decoding being assigned to each decoding means, is executed in parallel with decoding by another one of the decoding means, and performing latter half control in which the second decoding means are controlled so that, in parallel with the decoding by the first decoding means, remaining-stage decoding of the unit regions decoded up to the predetermined intermediate stage is executed.

The video stream may be encoded in an MPEG standard.

In the step of performing the first half control, the first decoding means may be controlled to perform decoding including variable length decoding and inverse quantization of a slice, and, in the step of performing the latter half control, the second decoding means may be controlled to perform decoding including inverse-discrete-cosine-transform processing on the slice.

In the decoding control method, the unit regions may be slices.

The decoding control method may be realized by hardware different from the first decoding means and the second decoding means.

The second decoding means may be realized by a graphics processing unit.

In the step of performing the latter half control, each second decoding means may be supplied with information indicating to which stage the decoding of the unit regions finishes.

According to another embodiment of the present invention, there is provided a decoding control apparatus including setting means which sets divided regions which are obtained by dividing a region corresponding to a picture of a video stream by the number of first decoding means, and which each include a plurality of unit regions used as processing units of the first decoding means and second decoding means when the first decoding means and the second decoding means decode the video stream, and decoding control means which controls the first decoding means so that decoding, up to a predetermined intermediate stage, of the unit regions in each divided region, the decoding being assigned to each decoding means, is executed in parallel with decoding by another one of the decoding means, and which controls the second decoding means so that, in parallel with the decoding by the first decoding means, remaining-stage decoding of the unit regions decoded up to the predetermined intermediate stage is executed.

In the embodiments of the present invention, recording of frame-position information representing the position of a frame in a video stream is controlled, and recording of unit-region-position information representing a unit region serving as a processing unit when the video stream is decoded.

In the embodiments of the present invention, on the basis of frame-position information representing the position of a frame in a video stream, and unit-region-position information representing the position of a unit region serving as a processing unit used when the video stream is decoded, a decoding-start position at which decoding of the video stream is started is detected, decoding of the video stream is controlled to be started at the decoding-start position.

According to the embodiments of the present invention, a time necessary for detecting a position at which decoding of a video stream is started can be shortened. In addition, the video stream can be decoded at increased speed.

BRIEF DESCRIPTION OF THE DRAWINGS

FIG. 1 is an illustration of an example of the related art of processing division when a plurality of processors perform parallel decoding of a video stream;

FIG. 6 is an illustration of an example of processing division when parallel decoding of a video stream is performed by the decoding unit shown in FIG. 3;

FIG. 16 is a block diagram showing another example of the configuration of functions of the encoding unit realized by the CPU shown in FIG. 2;

FIG. 17 is a block diagram showing another example of the configuration of functions of the decoding unit realized by the CPU shown in FIG. 2;

FIG. 18 is an illustration of an example of a data arrangement of clip-position information;

FIG. 19 is an illustration of an example of a data arrangement of picture-position information included in the clip-position information shown in FIG. 18;

FIG. 20 is an illustration of an example of a data arrangement of slice-position information included in the clip-position information shown in FIG. 18;

FIG. 36 is an illustration of rearrangement of pieces of information which form macroblocks; and FIG. 37 is an illustration of an arrangement of pieces of information in a slice.

DESCRIPTION OF THE PREFERRED EMBODIMENTS

Embodiments of the present invention are described below with reference to the accompanying drawings.

Figure 2:
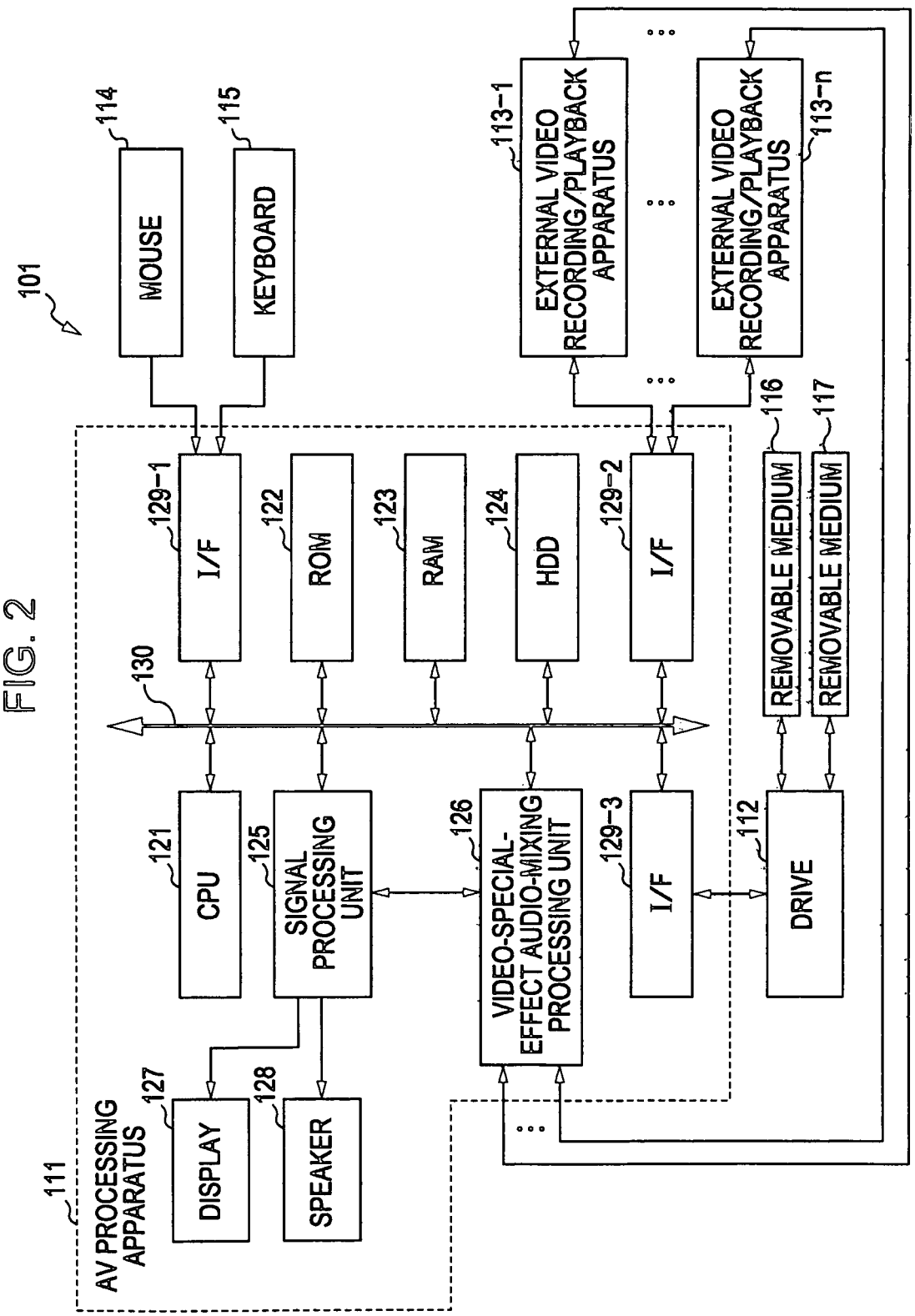
FIG. 2 is a block diagram showing an example of an AV processing system to which an embodiment of the present invention is applied.

FIG. 2 shows an example of an AV processing system 101 to which an embodiment of the present invention is applied. The AV processing system 101 includes an AV processing apparatus 111, a drive 112, external video recording/playback apparatuses 113-1 to 113-n, a mouse 114, and a keyboard 115.

The AV processing apparatus 111 performs processing, such as playback, recording, display, output, decoding, and encoding, on AV data such as a video stream, an audio stream, an AV stream in which a video stream and an audio stream are multiplexed, and still image data.

A drive 112 is connected to an interface (I/F) 129-3 of the AV processing apparatus 111. A removable medium 116, such as a magnetic disc, a magneto-optical disc, or a semiconductor memory, is connected to the drive 112, if necessary. The drive 112 inputs, to the AV processing apparatus 111, data of each type read from the removable medium 116, and stores, in the removable medium 116, data of each type output from the AV processing apparatus 111. A removable medium 117, such as a magnetic disc, a magneto-optical disc, or a semiconductor memory, is connected to the drive 112, if necessary. A program read from the removable medium 117 is installed in a hard disk drive (HDD) 124.

The external video recording/playback apparatuses 113-1 to 113-n are connected to an interface (I/F) 129-2 of the AV processing apparatus 111. Each of the external video recording/playback apparatuses 113-1 to 113-n plays back AV data such as an AV stream, a video stream, an audio stream, and still image data, and inputs the played-back data to the AV processing apparatus 111. In addition, in each of the external video recording/playback apparatuses 113-1 to 113-n, AV data, such as an AV stream, a video stream, an audio stream, and still image data, is recorded.

The external video recording/playback apparatuses 113-1 to 113-n are also connected to a video-special-effect audio-mixing processing unit 126 of the AV processing apparatus 111. Each of the external video recording/playback apparatuses 113-1 to 113-n inputs, to the video-special-effect audio-mixing processing unit 126, AV data such as an AV stream, a video stream, an audio stream, and still image data, and also acquires, from the video-special-effect audio-mixing processing unit 126, AV data processed to have various special effects or AV data processed by mixing.

When, in the following description, it is not necessary to distinguish each of the external video recording/playback apparatuses 113-1 to 113-n, they are hereinafter referred to simply as the "external video recording/playback apparatus 113".

A mouse 114 and a keyboard 115 are connected to an interface (I/F) 129-1.

The AV processing apparatus 111 includes a central processing unit (CPU) 121, a read-only memory (ROM) 122, a random access memory (RAM) 123, the HDD 124, a signal processing unit 125, the video-special-effect audio-mixing processing unit 126, a display 127, a speaker 128, and interfaces 129-1 to 129-3. The CPU 121, the ROM 122, the RAM 123, the HDD 124, the signal processing unit 125, the video-special-effect audio-mixing processing unit 126, and the interfaces 129-1 to 129-3 are connected to one another by a bus 130.

After using the interface 129-1 and the bus 130 to receive a processing instruction input by the user with the mouse 114 or the keyboard 115 and input data, on the basis of the received instruction or data, the CPU 121 executes various types of processing in accordance with a program stored in the ROM 122 or a program loaded from the HDD 124 to the RAM 123.

The CPU 121 performs various types of processing (for example, multiplexing, separation, encoding, decoding, etc.) on AV data such as an AV stream, a video stream, an audio stream, and still image data. The CPU 121 is formed by, for example, a multicore processor. As described later with reference to FIG. 4, etc., by executing a predetermined program, the CPU 121 divides decoding of a video stream encoded in a predetermined standard (e.g., MPEG-2) into a plurality of threads, and uses a plurality of processor cores to decode the threads of the video stream in parallel. In addition, as described later with reference to FIG. 11, etc., the CPU 121 uses a predetermined standard (e.g., MPEG-2) to encode a video stream that is a baseband signal prior to encoding.

The ROM 122 stores a program for use by the CPU 121 and basically fixed data among arithmetic operation parameters.

The RAM 123 stores a program executed by the CPU 121, and parameters and data that vary, if necessary, in the execution of the program.

The HDD 124 records or plays back, for example, a program that is executed by the CPU 121, and information.

The signal processing unit 125 uses hardware to execute various types of processing (e.g., multiplexing, separation, encoding, decoding, etc.) on AV data such as an AV stream, a video stream, an audio stream, and still image data. The signal processing unit 125 also generates a video signal adapted for specifications of the display 127 from an input video stream, and supplies the generated video signal to the display 127. The signal processing unit 125 also generates an audio signal adapted for specifications of the speaker 128 from an input audio stream, and supplies the generated audio signal to the speaker 128.

The video-special-effect audio-mixing processing unit 126 performs various special effect processing (e.g., image composition, division, conversion, etc.) or mixing (e.g., audio synthesis) on the AV data, such as a video stream, an audio stream, and still image data, supplied from the signal processing unit 125 or the external video recording/playback apparatus 113. The video-special-effect audio-mixing processing unit 126 supplies the processed AV data to the CPU 121, the signal processing unit 125, or the external video recording/playback apparatus 113.

The display 127 is formed by, for example, a cathode ray tube (CRT), a liquid crystal display (LCD), or the like, and displays video based on the video signal supplied fro the signal processing unit 125.

The speaker 128 outputs audio based on the audio signal supplied from the signal processing unit 125.

An example of processing performed when the AV processing apparatus 111 uses MPEG-2 to encode or decode a video stream is described below.

Figure 3:
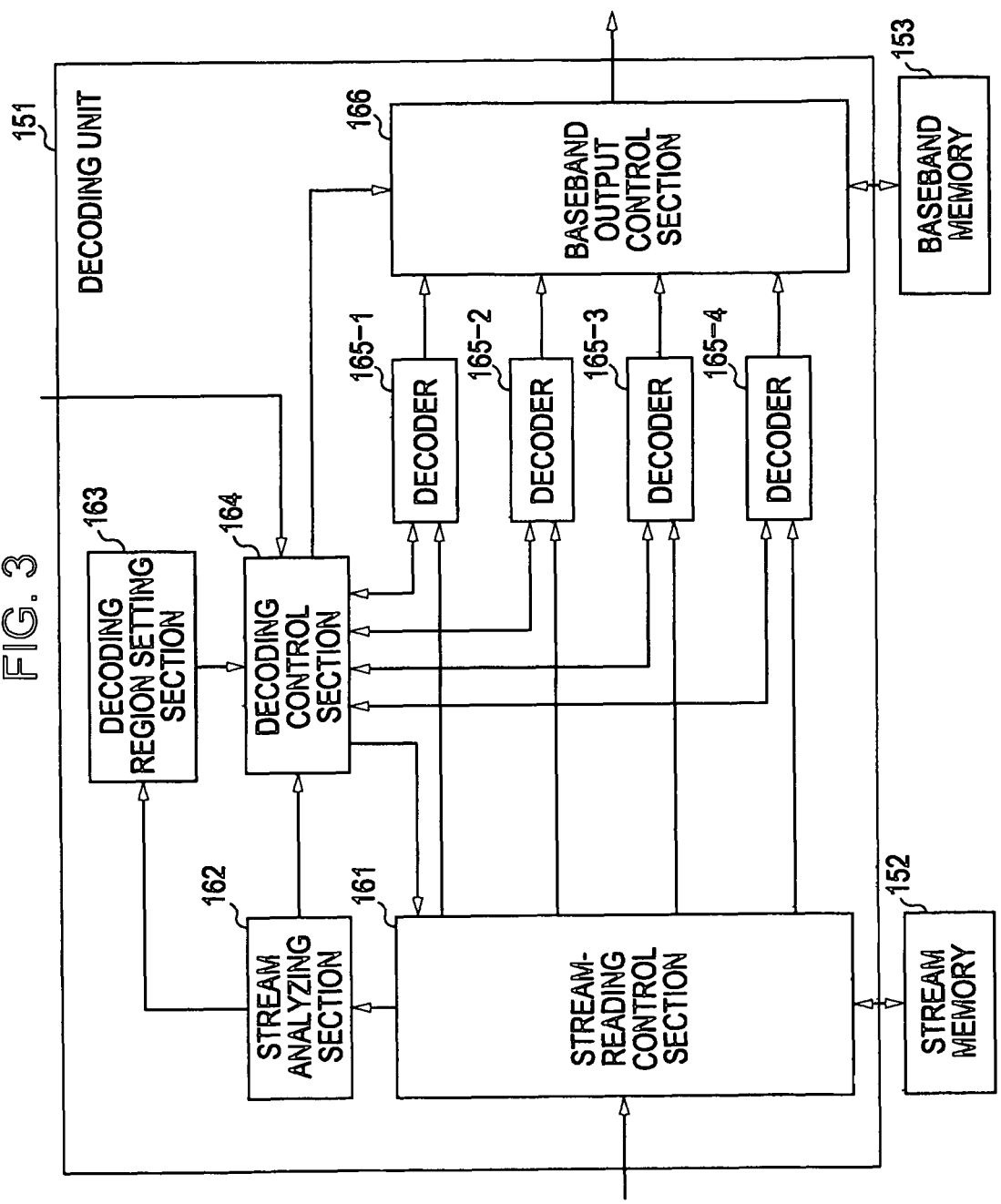
FIG. 3 is a block diagram showing an example of the configuration of functions of a decoding unit realized by the CPU shown in FIG. 2.

FIG. 3 shows an example of the configuration of functions of a decoding unit 151 realized by the CPU 121 that executes a predetermined program. The decoding unit 151 includes a stream-reading-control section 161, a stream analyzing section 162, a decoding region setting section 163, a decoding control section 164, decoders 165-1 to 165-4, and a baseband output-control section 166.

The stream-reading-control section 161 controls the drive 112 to read a video stream recorded in the removable medium 116. The stream-reading-control section 161 uses the interface 129-3 and the bus 130 to acquire the video stream read by the drive 112. The stream-reading-control section 161 also reads a video stream recorded in the HDD 124 through the bus 130. The stream-reading-control section 161 temporarily stores the acquired video stream, if necessary, in the stream memory 152, which is formed by, for example, a cache memory in the CPU 121. The stream-reading-control section 161 supplies the acquired video stream to the stream analyzing section 162 or the decoders 165-1 to 165-4, if necessary.

The stream analyzing section 162 decodes layers up to a picture layer of the video stream, and supplies the decoding control section 164 with information obtained by decoding the layers. The stream analyzing section 162 also supplies the decoding region setting section 163 with information which is obtained by decoding the layers and which represents an image size (the number of horizontal and vertical pixels of an image) of the video stream.

As described later with reference to FIGS. 4 and 5, on the basis of a video size of the video stream and the number of decoders of the decoding unit 151, the decoding region setting section 163 sets, for each frame of the video stream, regions (hereinafter referred to as "divided decoding regions") which are divisionally decoded by the decoders 165-1 to 165-4. The decoding region setting section 163 supplies the decoding control section 164 with information of the set divided decoding regions.

The decoding control section 164 controls processing of the decoding unit 151 on the basis of one of a decoding instruction by the user with the mouse 114 or the keyboard 115, and a decoding instruction input from each portion of the AV processing apparatus 111 or from a functional block different from the decoding unit 151 realized by the CPU 121. The decoding control section 164 supplies the stream-reading-control section 161 with information that directs supplying a video stream to the stream analyzing section 162 or the decoders 165-1 to 165-4. The decoding control section 164 also supplies the decoders 165-1 to 165-4 with information that directs starting decoding.

The decoding control section 164 acquires information that reports a decoding end or the occurrence of a decoding error from the decoders 165-1 to 165-4. When acquiring the information that reports the occurrence of the decoding error, the decoding control section 164 determines a position to restart decoding, and supplies, to a decoder in which the error has occurred, information that directs restarting decoding at the determined position. The decoding control section 164 also supplies the baseband output-control section 166 with information which is obtained by decoding the video stream and which directs outputting the video stream, which is a baseband signal.

The decoders 165-1 to 165-4 decode, in parallel, the divided decoding regions in each frame of the video stream which are assigned to the decoders 165-1 to 165-4. In other words, the decoders 165-1 to 165-4 decode slice and lower layers of the video stream. The decoders 165-1 to 165-4 supply the decoded data to the baseband output-control section 166. When, in the following description, it is not necessary to distinguish each of the decoders 165-1 to 165-4, each decoder is hereinafter referred to simply as the "decoder 165".

The baseband output-control section 166 combines the data supplied from the decoders 165-1 to 165-4 to generate a video stream that is a baseband signal obtained after decoding. The baseband output-control section 166 temporarily stores the generated video stream in the baseband memory 153, which is formed by, for example, a cache memory (not shown) in the CPU 121. The baseband output-control section 166 outputs the video stream to the exterior (for example, to the signal processing unit 125 through the bus 130) on the basis of an instruction of the decoding control section 164.

Next, a decoding process that is executed by the decoding unit 151 is described with reference to the flowcharts shown in FIGS. 4 and 5. The decoding process is started when the decoding control section 164 acquires, through the interface 129-1 and the bus 130, the decoding instruction input by the user with the mouse 114 or the keyboard 115. In addition, an example of decoding the video stream recorded in the removable medium 116 is described below.

In step S1, the decoding control section 164 determines whether or not the video stream has entirely been decoded. If a range of the video stream whose decoding has been directed by the user has not entirely been decoded yet, the decoding control section 164 determines that the video stream has not entirely been decoded, and the process proceeds to step S2.

In step S2, the stream analyzing section 162 decodes a sequence layer. Specifically, the decoding control section 164 supplies the stream-reading-control section 161 with information that directs reading a slice layer of a video stream to be decoded. Under the control of the stream-reading-control section 161, the drive 112 reads the slice layer of the video stream to be decoded from the removable medium 116, and supplies the read data to the stream-reading-control section 161 through the interface 129-3 and the bus 130. The stream-reading-control section 161 supplies the slice layer of the video stream to the stream analyzing section 162. The stream analyzing section 162 decodes the slice layer, and supplies the decoding control section 164 with information obtained by the decoding.

In step S3, the stream analyzing section 162 detects an image size of the video stream. Specifically, the stream analyzing section 162 detects the image size of the video stream on the basis of the information of the slice layer of the video stream. The stream analyzing section 162 supplies detected image size information to the decoding region setting section 163.

In step S4, the decoding region setting section 163 sets a region to be decoded by the decoder 165. Specifically, at first, the decoding region setting section 163 calculates the number (also called "the number of divided slices") of slices per frame which are to be decoded by the decoder 165. In the following description, the horizontal width of each slice is equal to the width of the frame (picture), and one slice is not positioned between rows.

The decoding region setting section 163 detects the number of slices included in each frame (picture) of the video stream on the basis of the image size of the video stream. For example, when the vertical image size of the video stream is represented by $S_{pv}$, and the vertical size of the slice is represented by $S_{sv}$, the number of slices per frame is detected by using the following expression:

$$N_{sf} = S_{pv} \div S_{sv} \qquad (1)$$

The decoding region setting section 163 calculates the number of divided slices by diving the detected number of slices per frame by the number of the decoders 165. For example, when the number of the decoders 165 is represented by $N_d$, the number of divided slices, represented by X, is calculated by $$X = N_{sf} \div N_d \qquad (2)$$

Accordingly, the numbers of slices to be decoded by the decoders 165 are equal and amounts of data to be decoded per frame are approximately equal.

For example, when the vertical image size of the video stream is 1088 pixels, the vertical size of the slice is 16 pixels, and the number of the decoders 165 is 4, the number X of divided slices is 17, as follows:

$$N_{sf} = 1088 \div 16 = 68$$

$$X = 68 \div 4 = 17$$

Next, the decoding region setting section 163 sets the divided decoding regions by dividing the slices in the frame by the number of divided slices. For example, as shown in the left part of FIG. 6, when sixteen slices are included in a frame and are decoded in parallel by four decoders, the number of divided slices is four. Thus, four regions obtained by dividing the slices in the frame into four in order from top are set as the divided decoding regions. The four regions include a region including slices 181-1 to 181-4, a region including slices 182-1 to 182-4, a region including slices 183-1 to 183-4, and a region including slices 184-1 to 184-4.

In a video stream encoded in MPEG-2, a slice (slice layer) is the lowest layer in which adding a start code to its beginning enables detecting a start position without analyzing a video stream, and serves as a smallest processing unit when the video stream is decoded. Therefore, the divided decoding regions include a plurality of slices used as processing units of the decoders 165, and are obtained by dividing a region for the picture of the video stream by the number of the decoders 165. In addition, consecutive slices on the video stream are disposed in order from top in the frame (picture). Thus, the slices in the divided decoding regions are consecutively positioned in the order of the top of the divided decoding regions to downward.

The decoding region setting section 163 supplies the decoding control section 164 with information of the set divided decoding regions.

In step S5, the decoding control section 164 determines whether or not all GOPs have been decoded. Specifically, the decoding control section 164 determines whether or not all GOPs included below the sequence layer decoded in step S2 have been decoded. If it is determined that all the GOPs have not been decoded, the process proceeds to step S6.

In step S6, the stream analyzing section 162 decodes a GOP layer. Specifically, the decoding control section 164 supplies the stream-reading-control section 161 with information that directs reading the next GOP to be decoded. Under the control of the stream-reading-control section 161, the drive 112 reads, from the removable medium 116, the next GOP to be decoded, and supplies the read GOP to the stream-reading-control section 161 through the interface 129-3 and the bus 30. The stream-reading-control section 161 temporarily stores the acquired GOP in the stream memory 152. The stream-reading-control section 161 supplies the acquired GOP to the stream analyzing section 162. After decoding the GOP layer, the stream analyzing section 162 supplies the decoding control section 164 with information obtained by performing decoding.

In step S6, after a plurality of GOPs are read from the removable medium 116 at a time, the GOPs may be stored in the stream memory 152.

In step S7, the decoding control section 164 determines whether or not all pictures in the GOP have been decoded. If it is determined that all the pictures in the GOP have not been decoded yet, the process proceeds to step S8.

In step S8, the stream-reading-control section 161 reads a picture layer of the next picture to be decoded. Specifically, the decoding control section 164 supplies the stream-reading-control section 161 with information that directs reading the picture layer of the next picture to be decoded. The stream-reading-control section 161 searches the GOPs stored in the stream memory 152 from their beginning for the start position (picture start code) of the next picture to be decoded, and reads a picture layer of the next picture to be decoded from the detected start position. The stream-reading-control section 161 supplies the read picture layer to the stream analyzing section 162.

In step S9, the stream analyzing section 162 decodes the picture layer. The stream analyzing section 162 supplies the decoding control section 164 with information obtained by decoding the picture layer.

In step S10, the decoding control section 164 directs starting decoding. Specifically, the decoding control section 164 supplies the stream-reading-control section 161 with information that directs supplying the decoders 165 with the slices included in the divided decoding regions assigned to the decoders 165. The decoding control section 164 also supplies each of the decoders 165 with information that directs starting decoding.

In step S11, the stream-reading-control section 161 detects the start position of each divided decoding region. Specifically, by sequentially searching the GOPs stored in the stream memory 152 for the start position (slice-start code) of the slice layer of the next picture to be decoded, the stream-reading-control section 161 detects the start position of the first slice of the divided decoding regions assigned to each of the decoders 165, that is, a position at which each of the decoders 165 starts decoding.

In step S12, the decoders 165 starts decoding. Specifically, from the stream memory 152, slices whose number is equal to the number of divided decoding regions that begin at the start position of each divided decoding region, that is, slices included in each divided decoding region, are sequentially read by the stream-reading-control section 161. The stream-reading-control section 161 supplies the read slices, for each divided decoding region, to the decoder 165 to which the divided decoding region is assigned. The decoder 165 starts decoding from the first slice in the divided decoding region. The decoders 165 sequentially supply the decoded data to the baseband output-control section 166. The baseband output-control section 166 stores the supplied data in the baseband memory 153.

In step S13, the decoding control section 164 determines whether or not an error has occurred. Specifically, if the decoding control section 164 has received, from the decoders 165, information reporting that the error has occurred, the decoding control section 164 determines that the error has occurred, and the process proceeds to step S14.

In step S14, the decoding control section 164 determines a position to restart decoding. The decoding control section 164 determines, as the position to restart decoding, for example, a slice that follows a slice whose decoding has failed.

In step S15, the decoders 165 restart decoding. Specifically, the decoding control section 164 supplies, to the decoder 165 in which the error has occurred, the information that directs restarting decoding from a slice that follows the slice in which the error has occurred.

In step S13, when the decoding control section 164 has not received, from the decoder 165, the information that reports that the error has occurred, it is determined that no error has occurred. Then, steps S14 and S15 are skipped over and the process proceeds to step S16.

In step S16, the decoding control section 164 determines whether or not processing for all the decoders 165 has finished. Specifically, the decoding control section 164 determines whether or not to have received, from all the decoders 165, information that reports the end of decoding of all the slices in the divided decoding regions assigned to the decoders 165. If the decoding control section 164 has not received yet, from all the decoders 165, information that reports the end of decoding of all the slices in the divided decoding regions assigned to the decoders 165, it is determined that the processing of all the decoders 165 has not finished yet, and the process returns to step S13. Processing in steps S13 to S16 is repeatedly executed until it is determined in step S16 that the processing of all the decoders 165 has finished.

If, in step S16, it is determined that the processing of the decoders 165 has finished, that is, if the information that reports the end of decoding of all the slices in the divided decoding regions assigned to the decoders 165 is supplied from all the decoders 165 to the decoding control section 164, the process proceeds to step S17.

In step S17, the baseband output-control section 166 outputs data for one frame. Specifically, the decoding control section 164 supplies the baseband output-control section 166 with information that directs outputting data for one frame. The baseband output-control section 166 outputs, to the exterior (for example, to the signal processing unit 125 through the bus 130), the data for one frame stored in the baseband memory 153. After that, the process returns to step S7.

If, in step S7, it is determined that all the pictures in the GOP have not been decoded yet, the process proceeds to step S8, and processing in step S8 and subsequent steps is executed. In other words, the next picture is decoded.

If, in step S7, it is determined that all the pictures in the GOP have not been decoded yet, the process returns to step S5.

If, in step S5, it is determined that all the GOPs have not been decoded yet, the process proceeds to step S6, and the processing in step S6 and subsequent steps is executed. In other words, the next GOP is decoded.

If, in step S5, it is determined that all the GOPs have been decoded, the process returns to step S1.

If, in step S1, it is determined that the video stream has not entirely been decoded yet, the process proceeds to step S2, and step S2 and the subsequent steps are executed. In other words, the next sequence layer of the video stream is decoded.

If, in step S1, it is determined that the video stream has entirely been decoded, the decoding process finishes.

As described above, for each frame (picture), it is only necessary to detect, as a position at which each decoder 165 starts decoding, the start position of each divided decoding region. Accordingly, a time necessary for the decoder 165 to detect the position of decoding is reduced, thus increasing the speed of video stream decoding.

Next, another embodiment of increasing the speed of video stream decoding is described below with reference to FIGS. 7 to 15.

Figure 7:
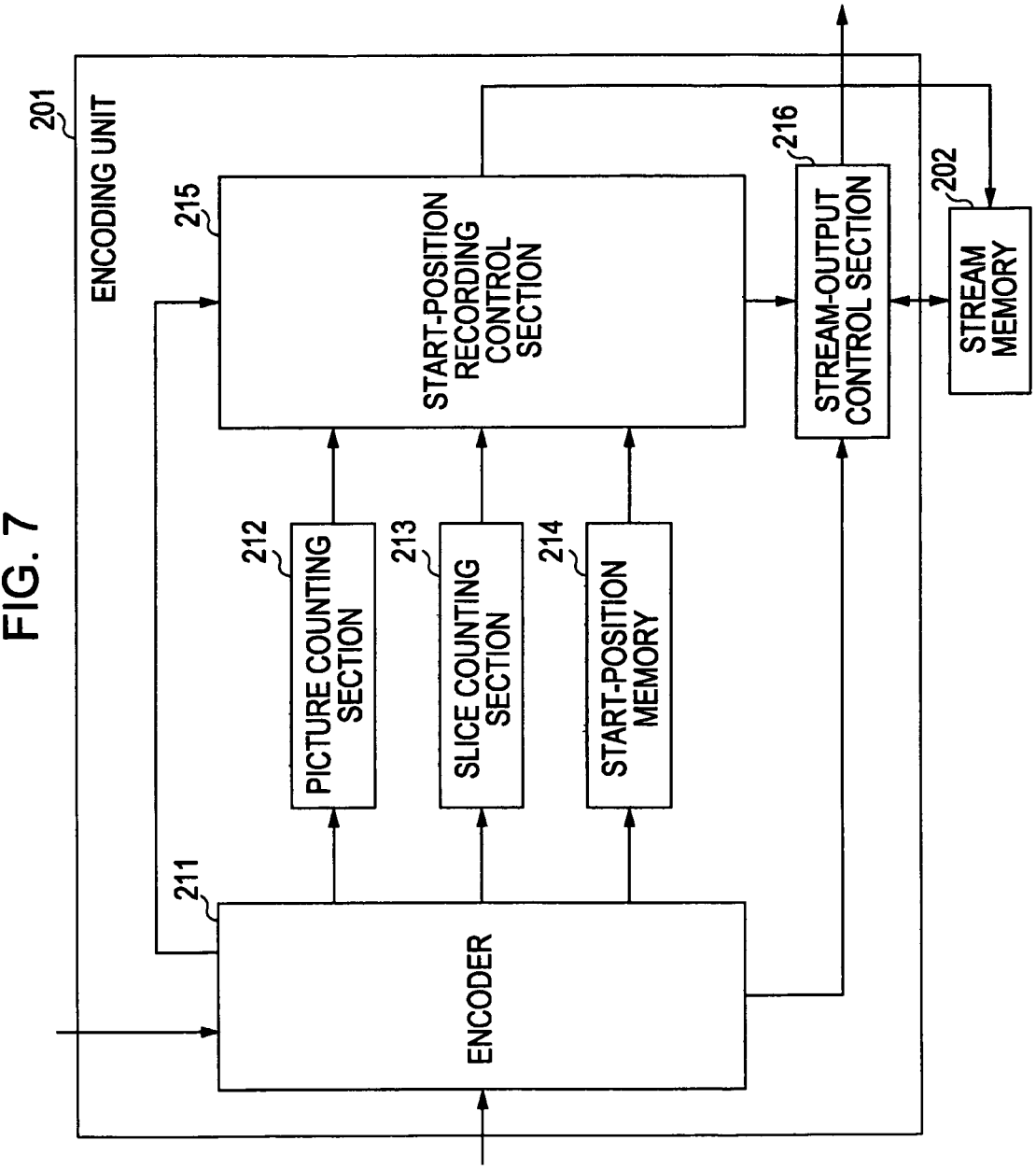
FIG. 7 is a block diagram showing an example of the configuration of an encoding unit realized by the CPU shown in FIG. 2.

FIG. 7 is a block diagram showing an example of the configuration of functions of an encoding unit 201 realized by the CPU 121 that executes a predetermined program. The encoding unit 201 includes an encoder 211, a picture counting section 212, a slice counting section 213, a start-position memory 214, a start-position recording control section 215, and a stream-output control section 216.

On the basis of an encoding instruction by the user with the mouse 114 or the keyboard 115, or an encoding instruction input from each portion of the AV processing apparatus 111 or from a functional block different from the encoding unit 201 realized by the CPU 121, the encoder 211 uses MPEG-2 to encode the video stream which is externally input before encoding and which is a baseband signal, and supplies the encoded data to the stream-output control section 216.

In addition, whenever the encoder 211 starts encoding the picture (picture layer), the encoder 211 supplies the picture counting section 212 and the start-position recording control section 215 with information that reports the start of encoding the picture. The encoder 211 records, in the start-position memory 214, information (hereinafter referred to as "picture-start-position information") representing the start position of each frame (picture) of the encoded video stream. Whenever encoding of each picture finishes, the encoder 211 supplies the slice counting section 213 and the start-position recording control section 215 with information representing the end of encoding the picture. The encoder 211 further records, in the start-position memory 214, information (hereinafter referred to as "picture-data-length information") representing the data length of the encoded picture.

Whenever the encoder 211 starts encoding the slice (slice layer), the encoder 211 supplies the slice counting section 213 and the start-position recording control section 215 with information that reports the start of encoding the slice. The encoder 211 records, in the start-position memory 214, information (hereinafter referred to as "slice-start-position information") representing the start position of the encoded video stream. Whenever encoding of each slice finishes, the encoder 211 supplies the start-position recording control section 215 with information that reports the end of encoding the slice. The encoder 211 records, in the start-position recording control section 215, information (hereinafter referred to as "slice-data-length information") representing the data length of the encoded slice.

The picture counting section 212 counts the number of pictures in each clip, which is a unit for video stream management on the recording medium. Specifically, the picture counting section 212 manages a picture counter, and increments the value of the picture counter whenever the encoder 211 supplies the picture counting section 212 with the information that reports the start of encoding the picture. The picture counting section 212 supplies the start-position recording control section 215 with information of the value of the picture counter.

The slice counting section 213 counts the number of slices in each picture. Specifically, the slice counting section 213 manages the slice counter, and increments the value of the slice counter whenever the encoder 211 supplies the slice counting section 213 with the information representing the start of encoding the slice. In addition, when the encoder 211 supplies the slice counting section 213 with the information that reports the end of encoding the picture, the slice counting section 213 resets the value of the slice counter.

The start-position recording control section 215 reads one of the picture-start-position information, the slice-start-position information, the picture-data-length information, and the slice-data-length information which are recorded in the start-position memory 214. The start-position recording control section 215 also acquires, from the picture counting section 212, the information of the picture counter value. The start-position recording control section 215 acquires, from the slice counting section 213, the information of the slice counter value.

By supplying the stream-output control section 216 with information which is based on the value of the picture counter, the picture-start-position information, and the picture-data-length information, and which directs recording, in the video stream, of information (hereinafter referred to as "picture-position information") representing the position of each picture, the start-position recording control section 215 controls recording of the picture-position information. Also, by supplying the stream-output control section 216 with information (hereinafter referred to as "slice-position information") which is based on the value of the slice counter, the slice-start-position information, and the slice-data-length information, and which represents the position of each slice, the start-position recording control section 215 controls recording of the slice-position information.

The stream-output control section 216 temporarily stores the video stream encoded by the encoder 211 in the stream memory 202, which is formed by, for example, the cache memory or the like in the CPU 121. In response to an instruction of the start-position recording control section 215, the stream-output control section 216 records the picture-position information in, for example, a user data field of the GOP layer which corresponds to each GOP of the encoded video stream. Picture-position information corresponding to all the GOPs included in the sequence layer may be recorded in a user data field of an extension and user field in the sequence layer of the video stream. In addition, in response to an instruction of the start-position recording control section 215, the stream-output control section 216 records slice-position information in, for example, a user data field of an extension and user field in the picture layer which corresponds to each picture of the encoded video stream.

The stream-output control section 216 reads the video stream stored in the stream memory 202, and outputs the read video stream to the exterior (for example, to the drive 112 or the HDD 124 through the bus 130).

Figure 8:
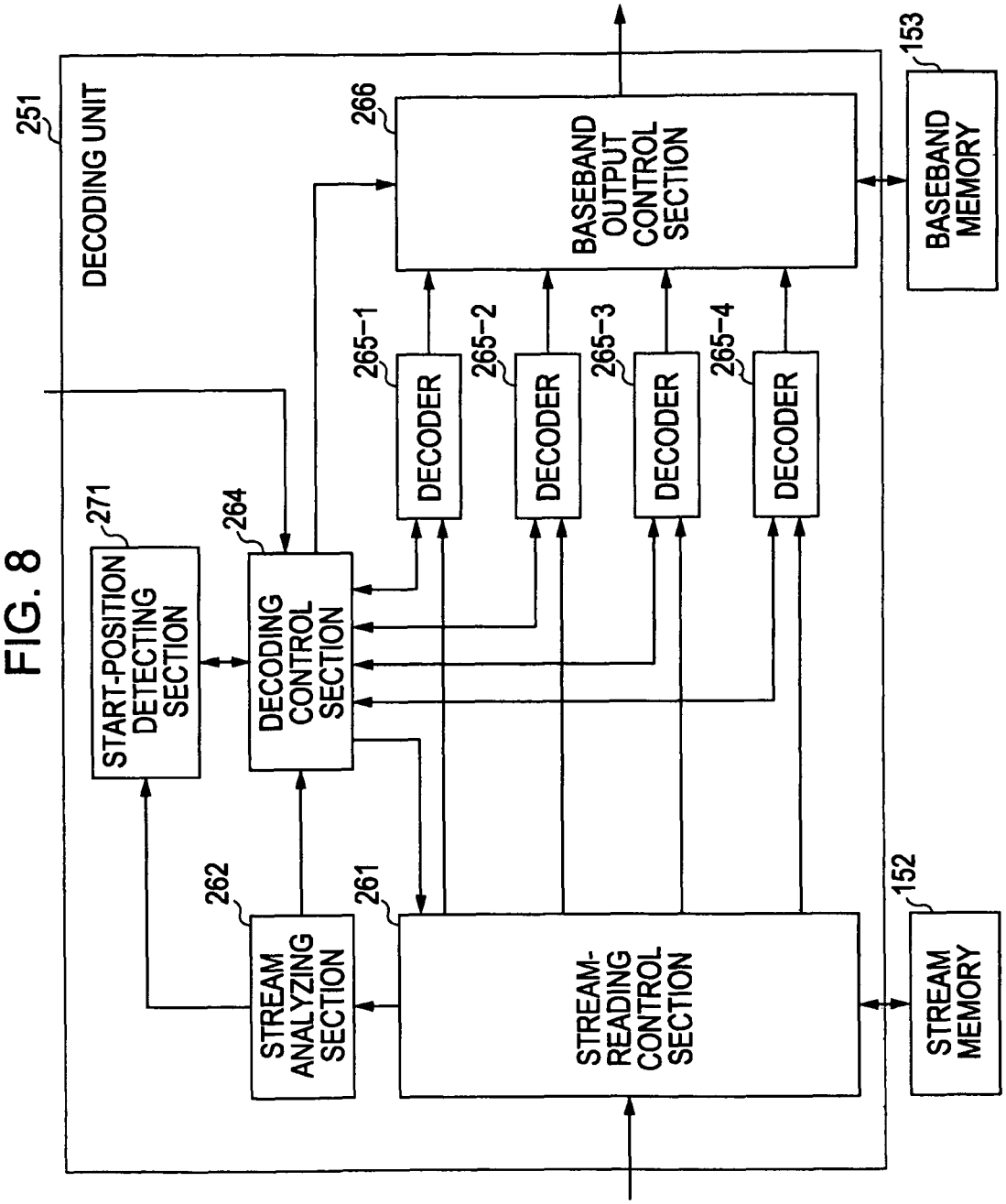
FIG. 8 is a block diagram showing another example of the configuration of a decoding unit realized by the CPU shown in FIG. 2.

FIG. 8 is a block diagram showing an example of the configuration of functions of a decoding unit 251 realized by the CPU 121 that executes a predetermined program. The decoding unit 251 differs from the decoding unit 151 shown in FIG. 3 in that a start-position decoding section 271 is provided instead of the decoding region setting section 163 in FIG. 3. In FIG. 8, portions that correspond to those shown in FIG. 3 are denoted by reference numerals which each have last two digits identical to those of each reference numeral in FIG. 3. Accordingly, a description of each identical function is omitted since it is a repetition.

The decoding unit 251 includes a stream-reading control section 261, a stream analyzing section 262, a decoding control section 264, decoders 265-1 to 265-4, a baseband output control section 266, and a start-position decoding section 271.

In addition to the processing of the stream analyzing section 162 in FIG. 3, the stream analyzing section 262 extracts the picture-position information and slice-position information recorded in the video stream, and supplies the extracted information to the start-position decoding section 271.

Figure 9:
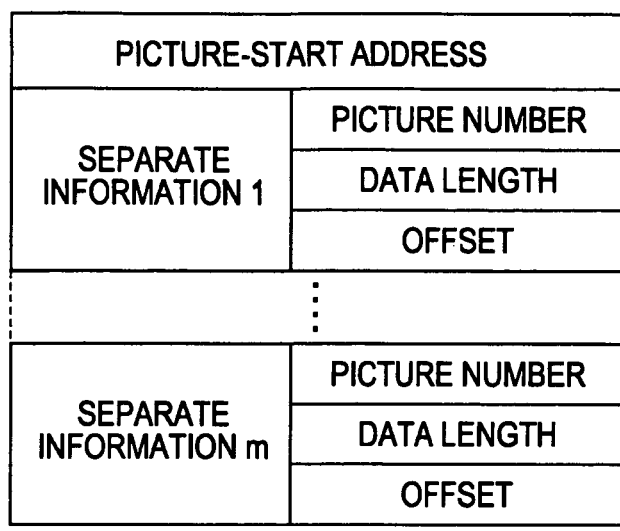
FIG. 9 is an illustration of an example of a data arrangement of picture-position information.
Figure 10:
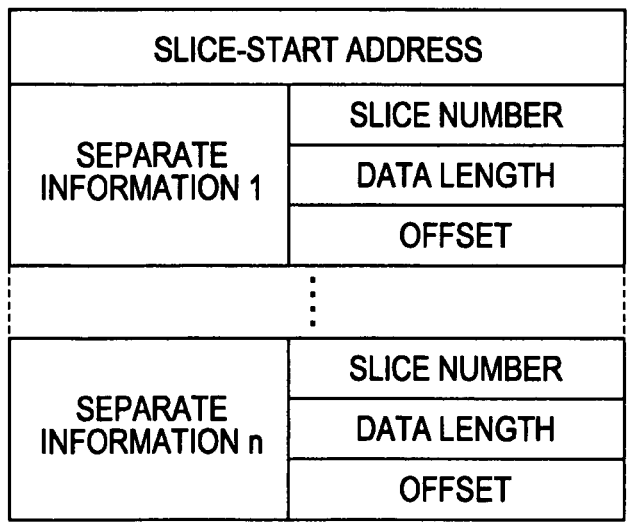
FIG. 10 is an illustration of an example of a data arrangement of slice-position information.

In addition to the processing of the decoding control section 164 in FIG. 3, the decoding control section 264 supplies the start-position decoding section 271 with information (hereinafter referred to as "start-position-detection directing information") that directs detection of a picture-start position designated by a picture number (FIG. 9) or start-position-detection directing information that directs detection of a slice-start position designated by a slice number (FIG. 10).

On the basis of the picture-position information or the slice-position information, the start-position decoding section 271 detects the start position of the picture or slice designated by the start-position-detection directing information. The start-position decoding section 271 supplies the decoding control section 264 with information representing the start position of the detected picture or slice.

In the following description, when it is not necessary to distinguish each of the decoders 265-1 to 265-4, they are referred to simply as the "decoders 265".

FIG. 9 is an illustration of an example of a data arrangement of picture-position information. The picture-position information is recorded in each GOP in the video stream, and includes a picture-start address, and separate information corresponding to each picture included in the GOP.

The picture-start address represents a relative position (relative address) from the beginning of a clip in a picture-start position that is the first picture in the GOP. When the video stream is recorded in a recording medium (for example, the removable medium 116 or the HDD 124), the picture-start address may be used as the start address of a location in which the first picture in the GOP is recorded in the recording medium.

The separate information includes a picture number, a data length, and an offset.

The picture number is a serial number obtained when the first picture in the clip is used as origin. The picture number represents where the picture is in the order of pictures from the first clip in order for the picture not to be reset in the clip.

The data length represents a data length of the picture.

The offset represents an offset (relative address) from the picture-start address. Therefore, on the basis of the picture-start address and the offset, a relative address from the beginning of a clip in the start position of each picture can be found. When the video stream is recorded in the recording medium (for example, the removable medium 116 or the HDD 124), for each picture, instead of the offset, the address of the beginning of a location in which the picture is recorded in the recording medium may be recorded.

FIG. 10 is an illustration of an example of a data arrangement of slice-position information. The slice-position information is recorded in each picture in the video stream, and includes a slice-start address, and separate information corresponding to each slice in the picture.

The slice-start address represents a relative address from the beginning of a clip in the start position of the first slice in the picture. The slice-start address may be used as the address of the beginning of a location in which the first slice in the picture is recorded in the recording medium (for example, the removable medium 116 or the HDD 124).

The separate information includes a slice number, a data length, and an offset.

The slice number is a serial number obtained when the first slice in the picture is used as origin. The slice number represents where the slice is in the order of slices in the picture from the first slice since the slice number is reset whenever the picture is changed.

The data length represents a data length of the slice.

The offset represents an offset (relative address) from the slice-start address. Therefore, on the basis of the slice-start address and the offset, a relative address from the beginning of a clip in the start position of each slice can be found. When the video stream is recorded in the recording medium (for example, the removable medium 116 or the HDD 124), for each slice, instead of the offset, the address of a location in which the slice is recorded in the recording medium (for example, the removable medium 116 or the HDD 124) may be recorded.

Next, an encoding process executed by the encoding unit 201 is described below with reference to the flowchart shown in FIG. 11. This process is started when the encoder 211 acquires an encoding instruction by the user with the mouse 114 or the keyboard 115 through the interface 129 and the bus 130. The following describes a case in which, after a video stream that is a baseband signal prior to encoding is input from the external video recording/playback apparatus 113-1 to the encoder 211 through the interface 129-2 and the bus 130, an encoded video stream is recorded in the removable medium 116.

In step S101, the encoder 211 determines whether or not a video stream has entirely been encoded. If it is determined that the video stream has not entirely been encoded yet, for example, when the video stream is continuously input from the external video recording/playback apparatus 113-1, the process proceeds to step S102.

In step S102, the encoder 211 determines whether or not a sequence layer is to be changed. If it is determined that the sequence layer is to be changed, for example, when the image size of the video stream is changed, or information that directs changing the sequence layer is externally input to the encoder 211, the process proceeds to step S103.

In step S103, the encoder 211 encodes the sequence layer of the video stream. The encoder 211 supplies the encoded data to the stream-output control section 216. The stream-output control section 216 stores the supplied data in the stream memory 202.

If, in step S102, it is determined that the sequence layer is not to be changed, the process proceeds to S104, skipping over step S103.

In step S104, the encoder 211 encodes the GOP layer. At this time, the encoder 211 reserves, in the user data field in the GOP layer, a field for later recording picture-position information. The encoder 211 supplies the encoded data to the stream-output control section 216. The stream-output control section 216 stores the supplied data in the stream memory 202.

In step S105, the encoding unit 201 performs a picture-and-lower-layers encoding process. Details of the picture-and-lower-layers encoding process are described later with reference to FIG. 12. In the picture-and-lower-layers encoding process, the picture and lower layers are encoded. After that, the process returns to step S101. Processing in steps S101 to S105 is repeatedly executed to perform video stream encoding until, in step S101, it is determined that the video stream has entirely been encoded.

If, in step S101, it is determined that the video stream has entirely been encoded, for example, when video stream input from the external video recording/playback apparatus 113-1 finishes and input video-stream encoding all finishes, the encoding process finishes.

Next, details of the picture-and-lower-layers encoding process in step S105 are described below.

In step S121, it is determined whether or not all the pictures in the GOP have been encoded. The encoder 211 confirms whether or not pictures to be included in the GOP, which is presently encoded, have been encoded. If the pictures to be included in the GOP, which is presently encoded, have not been encoded yet, it is determined that all the pictures in the GOP have not been encoded, and the process proceeds to S122. Specifically, the encoder 211 supplies the picture counting section 212 with information that reports the start of encoding the next picture. The picture counting section 212 increments the picture counter.

In step S123, the encoder 211 determines the start position of the picture. Specifically, the encoder 211 determines a position to start to record the next picture to be encoded. When the next picture to be encoded is the first picture of the GOP, the encoder 211 stores, in the start-position memory 214, picture-position information that represents a relative address from the beginning of a clip at the determined start position. In addition, when the next picture to be encoded is not the first picture of the GOP, the encoder 211 stores, in the start-position memory 214, picture-position information that represents an offset from the first picture of the GOP at the determined start position.

In step S124, in the stream-output control section 216, the picture start position is recorded. Specifically, the encoder 211 supplies the start-position recording control section 215 with information that reports the start of encoding the next picture to be encoded. The start-position recording control section 215 acquires, from the picture counting section 212, the information representing the value of the picture counter, and acquires the picture-start-position information from the start-position memory 214.

When the next picture to be encoded is the first picture of the GOP, under the control of the start-position recording control section 215, in the stream-output control section 216, for picture-start-position information corresponding to the GOP, which is being encoded, stored in the stream memory 202, the value of the picture-start-position information is recorded as the picture-start address. Under the control of the start-position recording control section 215, in the stream-output control section 216, in the first separate information of the picture-start-position information corresponding to the GOP, which is being encoded, the value of the picture counter is recorded as the picture number, and zero is recorded as the offset.

In addition, when the next picture to be encoded is not the first picture of the GOP, under the control of the start-position recording control section 215, in separate information which corresponds to a picture to be encoded and which follows the picture-position information, the value of the picture counter is recorded as the picture number and the value of the picture-start-position information is recorded as the offset.

In step S125, the encoder 211 encodes the picture layer. At this time, the encoder 211 reserves, in the user data field of the picture layer, a field for later recording slice-position information. The encoder 211 supplies the encoded data to the stream-output control section 216. The stream-output control section 216 stores the supplied data in the stream memory 202.

In step S126, the encoder 211 determines whether or not all the slices in the picture have been encoded. The encoder 211 confirms whether or not a predetermined number of slices included in the picture have been encoded. If the predetermined number of slices have not been encoded yet, the encoder 211 determines that all the slices in the picture have not been encoded yet, and the process proceeds to step S127.

In step S127, the slice counting section 213 increments the slice counter. Specifically, the encoder 211 supplies the slice counting section 213 with information that reports the start of encoding the next slice. The slice counting section 213 increments the slice counter.

In step S128, the encoder 211 determines a slice start position. Specifically, the encoder 211 determines a position to start to record the next slice to be encoded. When the next slice to be encoded is the first slice in the picture, the encoder 211 stores, in the start-position memory 214, slice-start-position information representing a relative address from the beginning go the clip at the determined start position. In addition, when the next slice to be encoded is not the first slice in the picture, the encoder 211 stores, in the start-position memory 214, slice-start-position information representing an offset from the first slice in the picture at the determined start position.

In step S129, in the stream-output control section 216, the slice start position is recorded. Specifically, the encoder 211 supplies the start-position recording control section 215 with information that reports the start of encoding the next slice. The start-position recording control section 215 acquires, from the slice counting section 213, information representing the value of the slice counter, and acquires the slice-start-position information from the start-position memory 214.

When the next slice to be encoded is the first slice in the picture, under the control of the start-position recording control section 215, in slice-position information corresponding to the picture which is being encoded and which is stored in the stream memory 202, the value of the slice-start-position information is recorded as the slice-start address. Under the control of the start-position recording control section 215, in the stream-output control section 216, in the first separate information in the slice-start-position information corresponding to the picture being encoded, the value of the slice counter is recorded as the slice number and zero is recorded as the offset.

In addition, when the next slice to be encoded is not the first slice in the picture, under the control of the start-position recording control section 215, in the stream-output control section 216, in separate information corresponding to a slice to be encoded which follows the slice-start-position information corresponding to the picture being encoded, the value of the slice counter is recorded as the slice number and the value of the slice-start-position information is recorded as the offset.

In step S130, the encoder 211 encodes the slice layer and lower layers. The encoder 211 supplies the encoded data to the stream-output control section 216. The start-position recording control section 215 stores the supplied data in the stream memory 202.

In step S131, in the start-position recording control section 215, the data length of the slice is recorded. Specifically, the encoder 211 stores, in the start-position memory 214, slice-data-length information representing the data length of the encoded slice. The encoder 211 also supplies the start-position recording control section 215 with information representing the end of slice encoding. The start-position recording control section 215 acquires the slice-data-length information from the start-position memory 214. Under the control of the start-position recording control section 215, in the stream-output control section 216, in separate information corresponding to the encoded slice in the slice-position information corresponding to the picture stored in the stream memory 202, which is being encoded, the value of the slice-data-length information is recorded as the data length.

After that, the process returns to step S126, and processing in steps S126 to S131 is repeatedly executed to perform slice encoding until, in step S126, it is determined that all the slices in the picture have been encoded.

If, in step S126, encoding of the predetermined number of slices included in the picture has finished, it is determined that all the slices in the picture have been encoded, and the process proceeds to step S132.

In step S132, in the stream-output control section 216, the data length of the picture is recorded. Specifically, the encoder 211 stores, in the start-position memory 214, picture-data-length information representing the data length of the encoded picture. In addition, the encoder 211 supplies the start-position recording control section 215 with information that indicates that the picture encoding has finished. The start-position recording control section 215 acquires the picture-data-length information from the start-position memory 214. Under the control of the start-position recording control section 215, in the stream-output control section 216, in separate information corresponding to the encoded picture in the picture-position information corresponding to the GOP which is being encoded and which is stored in the stream memory 202, the value of the picture-data-length information is recorded as the data length.

In step S133, the slice counting section 213 resets the slice counter. Specifically, the encoder 211 supplies the slice counting section 213 with information that indicates that the picture encoding has finished. The slice counting section 213 resets the slice counter.

After that, the process returns to step S121, and processing in steps S121 to S133 is repeatedly executed to encode all the pictures in the GOP until, in step S121, it is determined that all the pictures in the GOP have been encoded.

If, in step S121, encoding of pictures to be included in the GOP being encoded has finished, it is determined that all the pictures in the GOP have been encoded, and the process proceeds to step S134.

In step S134, the stream-output control section 216 outputs the resultant video stream, and the picture-and-lower-layers encoding process finishes. Specifically, for example, when the amount of data in the stream memory 202 exceeds a predetermined threshold value, the start-position recording control section 215 supplies the encoded video stream stored in the stream memory 202 to the drive 112 through the bus 130 and the interface 129-3. The drive 112 records the video stream in the removable medium 116.

Next, a decoding process performed when the decoding unit 251 decodes the video stream encoded by the encoding unit 201 is described below with reference to the flowcharts shown in FIGS. 13 and 14. This process is started when the decoding control section 264 acquires a decoding instruction input by the user with the mouse 114 or the keyboard 115 through the interface 129-1 and the bus 130. In addition, the following describes a case in which the video stream recorded in the removable medium 116 is decoded. In the following description, as shown in the right part of FIG. 1, for each picture, the slices are decoded in parallel one by one by the decoders 265 in order from the top slice.

Figure 4:
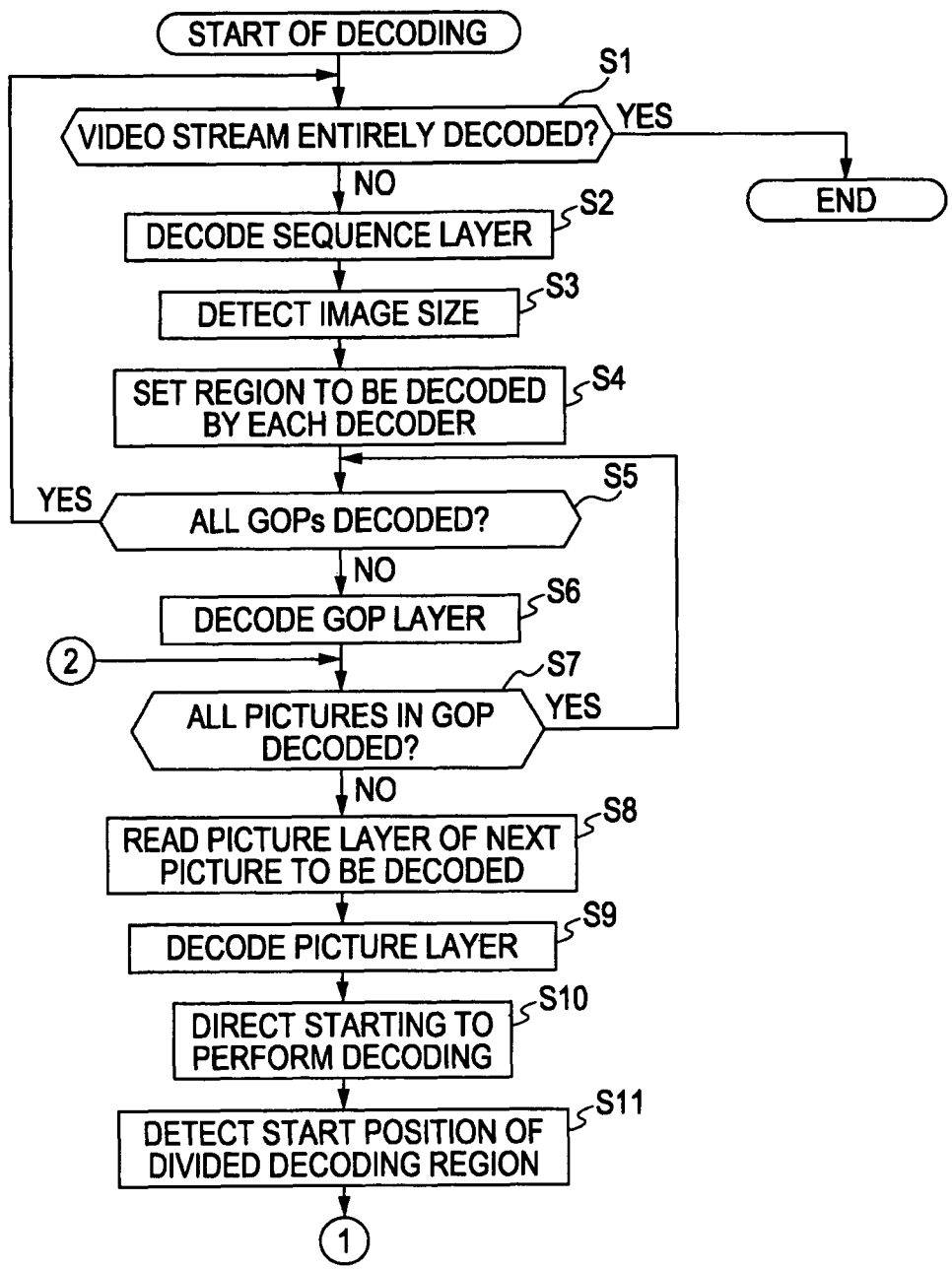
FIG. 4 is a flowchart illustrating a decoding process executed by the decoding unit shown in FIG. 3.

In step S151, similarly to step S4 in FIG. 4, it is determined whether or not the video stream has entirely been decoded. If it is determined that the video stream has not entirely been decoded yet, the process proceeds to step S152.

Similarly to step S2 in FIG. 4, in step S152, a sequence layer of a video stream to be decoded is read from the removable medium 116, and the sequence layer is decoded.

In step S153, similarly to step S5 in FIG. 4, it is determined whether or not all the GOPs have been decoded. If it is determined that all the GOPs have not been decoded, the process proceeds to step S154.

Similarly to step S6 in FIG. 4, the next GOP to be decoded is read from the removable medium 116, and a GOP layer of the read GOP is decoded.

In step S155, the stream analyzing section 262 extracts the picture-position information. Specifically, the stream analyzing section 262 extracts the picture-position information recorded in the user data field of the GOP decoded in step S154. The stream analyzing section 262 supplies the extracted picture-position information to the start-position decoding section 271.

Similarly to step S7 in FIG. 4, in step S156, it is determined whether or not all the pictures in the GOP have been decoded. If it is determined that all the pictures in the GOP have not been decoded yet, the process proceeds to step S157.

In step S174, the stream-reading control section 261 reads a picture layer of the next picture to be decoded. Specifically, by designating a picture number, the decoding control section 264 supplies the start-position decoding section 271 with start-position-detection directing information that directs detection of the start position of the next picture to be decoded. On the basis of the picture-position information, the start-position decoding section 271 detects the start position of a picture corresponding to the designated picture number. The start-position decoding section 271 supplies the decoding control section 264 with information representing the start position of the detected picture. The decoding control section 264 supplies the stream-reading control section 261 with information that directs reading the picture layer from the start position of the picture detected by the start-position decoding section 271. The stream-reading control section 261 reads, from the GOP stored in the stream memory 152, the picture layer of the next picture to be decoded, the next picture being started at the designated start position. The stream-reading control section 261 supplies the read picture layer to the stream analyzing section 262.

Similarly to step S9 in FIG. 4, in step S158, the picture layer is decoded.

In step S159, the stream analyzing section 262 extracts the slice-position information. Specifically, the stream analyzing section 262 extracts the slice-position information recorded in the user data field of the picture layer decoded in step S158. The stream analyzing section 262 supplies the extracted slice-position information to the start-position decoding section 271.

In step S160, the start-position decoding section 271 detects a position to start to perform decoding. Specifically, the decoding control section 264 supplies the start-position decoding section 271 with the start-position-detection directing information that, by designating a slice number, directs detection of the start position of the next slice to be decoded by each decoder 265. On the basis of the slice-position information, the start-position decoding section 271 detects the start position of the slice according to the designated slice number. The decoding control section 264 supplies the decoding control section 264 with information representing the start position of each slice detected.

In step S161, the decoding control section 264 directs starting decoding. Specifically, the decoding control section 264 supplies the stream-reading control section 261 with information that directs supplying each decoder 265 with each slice starting at the start position detected in step S160. The decoding control section 264 supplies the decoder 265 with information that directs starting decoding the next slice.

In step S162, the decoder 265 starts decoding. Specifically, the stream-reading control section 261 reads, from the stream memory 152, the slice starting at the start position designated by the decoding control section 264, and supplies the slice to each decoder 265. The decoder 265 starts to decode the supplied slice. When decoding of the slice started in step S162 finishes, the decoder 265 supplies the decoding control section 264 with information indicating that the decoding has finished, and supplies the decoded data to the baseband output control section 266. The baseband output control section 266 stores the supplied data in the baseband memory 153.

Figure 5:
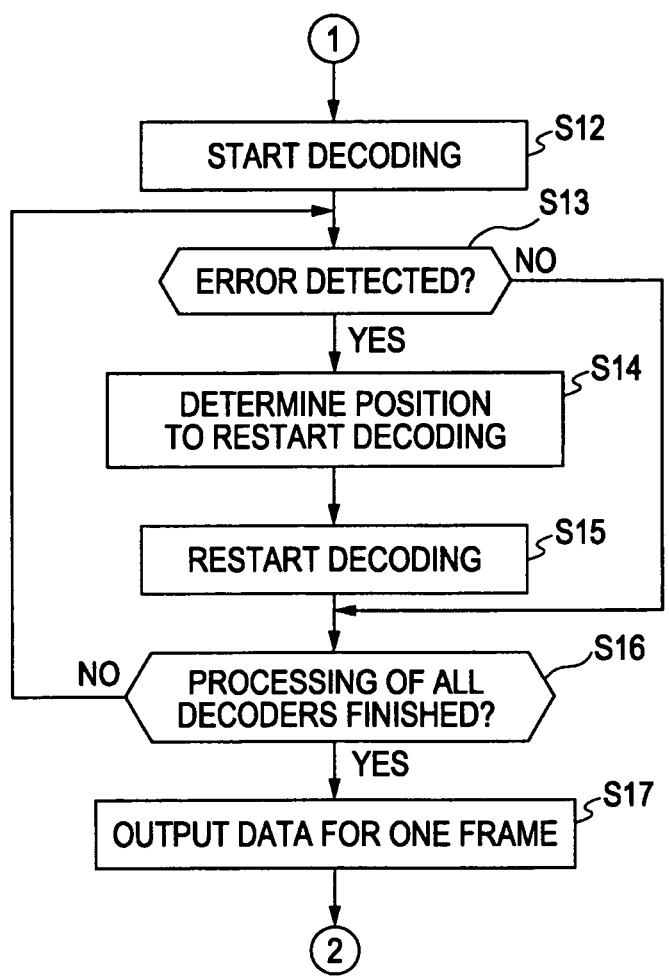
FIG. 5 is a flowchart illustrating the decoding process executed by the decoding unit shown in FIG. 3.

In step S164, similarly to step S13 in FIG. 5, in step S163, it is determined whether or not an error has occurred. If it is determined that the error has not occurred, the process proceeds to step S164.

In step S164, the decoding control section 264 determines whether or not there is one decoder 265 that has finished decoding. When the information that indicates that the decoding has finished is not acquired from any of the decoders 165, the decoding control section 264 determines that there is not any decoder 265 that has finished decoding, and the process proceeds to step S163. In step S163, it is determined that the error has occurred. Alternatively, determinations in steps S163 and S164 are repeatedly executed until, in step S164, it is determined that there is a decoder that has finished decoding.

In step S164, when the information indicating that the decoding has finished is acquired by the decoding control section 264 from at least one decoder 265, it is determined that there is the decoder 265 that has finished decoding, and the process proceeds to step S165.

In step S165, the decoding control section 264 determines whether or not the decoder 265 that has finished decoding has decoded all the slices assigned in the picture being decoded. If it is determined that all the slices assigned in the picture being decoded have not been decoded yet, the process proceeds to step S160, and steps S160 and subsequent steps are executed. In other words, the decoder 265 that has finished decoding decodes the next slice assigned in the picture being decoded.

If, in step S163, it is determined that the error has occurred, the process proceeds to step S166.

In step S166, the decoding control section 264 determines a position to restart decoding. The decoding control section 264 determines, as a decoding restart position, for example, a slice that follows a slice whose decoding fails. After that, the process returns to step S160, and processing in step S160 and subsequent steps is executed. In other words, a decoder 265 in which an error has occurred decodes a slice that follows a slice in which an error has occurred.

If, in step S165, it is determined that the decoder 265 that has finished decoding has all the slices assigned in the picture being decoded, the process proceeds to step S167.

In step S164, the decoder 265 determines whether or not processing of all the decoders 265 has finished. Specifically, the decoding control section 264 determines whether or not there is a decoder 265 that has not finished yet decoding the slices assigned in the picture being decoded. If there is the decoder 265 that has not finished yet decoding the slices assigned, the decoding control section 264 determines that the processing of all the decoders 265 has not finished yet, and the process returns to step S163. Processing in step S163 and subsequent steps is executed. In other words, processing of each decoder 265 that has not finished decoding the assigned slices is continuously executed while each decoder 265 that has already finished decoding the slices assigned in the picture being decoded remains on standby.

If, in step S167, it is determined that the processing of all the decoders 265 has finished, the process proceeds to step S168.

In step S168, similarly to step S17 in FIG. 5, data for one frame is output and the process returns to step S156.

If, in step S156, it is determined that all the pictures in the GOP have not been decoded yet, the process proceeds to step S157, and the processing in step S157 and subsequent steps is executed. In other words, the next picture is decoded.

If, in step S156, it is determined that all the pictures in the GOP have been decoded, the process returns to step S153.

If, in step S153, it is determined that all the GOPs have not been decoded yet, the process proceeds to step S154, and the processing in step S154 and subsequent steps is executed. In other words, the next GOP is decoded.

If, in step S153, it is determined that all the GOPs have been decoded, the process returns to step S151.

If, in step S151, it is determined that the video stream has not entirely been decoded, the process proceeds to step S152, and the processing in step S152 and subsequent steps is executed. In other words, the next sequence layer of the video stream is decoded.

If, in step S151, it is determined that the video stream has entirely been decoded, the decoding process finishes.

Figure 15:
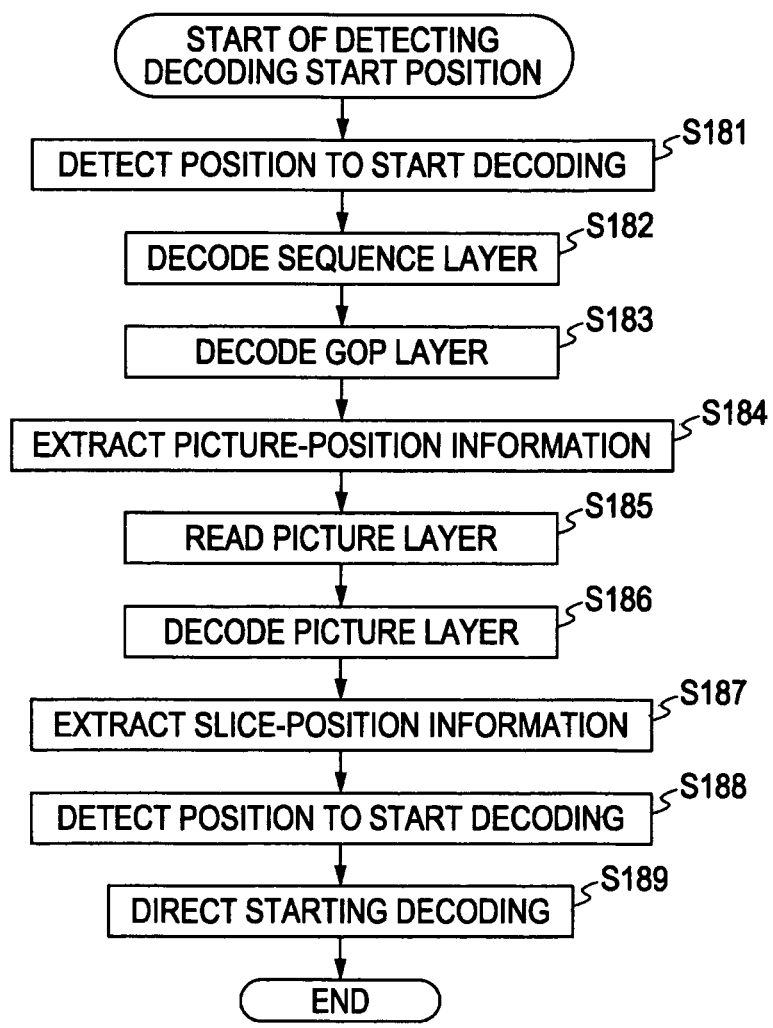
FIG. 15 is a flowchart illustrating a decoding-start-position detecting process executed by the decoding unit shown in FIG. 8.

Next, a decoding-start-position detecting process executed by the decoding unit 251 when decoding from a picture designated based on a user's instruction is started without decoding the video stream from its beginning is described below with reference to the flowchart shown in FIG. 15.

In step S181, the decoding control section 164 detects a position to start decoding. Specifically, the decoding control section 164 detects the picture number of a picture at the start position designated by the user.

In step S182, similarly to step S2 in FIG. 4, the sequence layer is decoded.

In step S183, similarly to step S6 in FIG. 4, a GOP layer of a GOP including the picture at which decoding is started is decoded.

Figure 13:
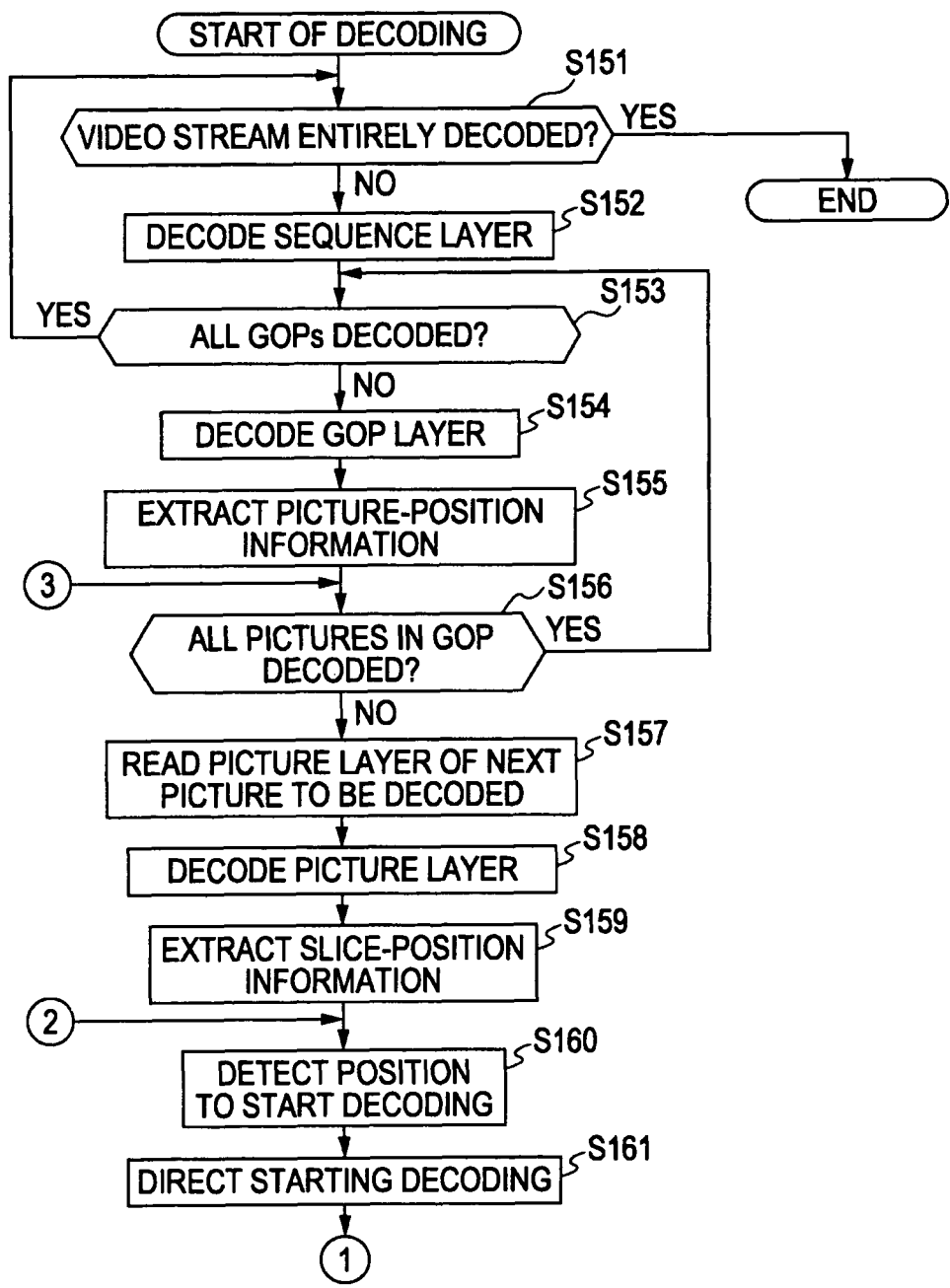
FIG. 13 is a flowchart illustrating a decoding process executed by the decoding unit shown in FIG. 8.

In step S184, similarly to step S155 in FIG. 13, picture-position information of the GOP including the picture at which decoding is started is extracted.

In step S185, similarly to step S157 in FIG. 13, on the basis of the picture-position information, a picture layer of the picture at which decoding is started is read.

In step S186, similarly to step S158 in FIG. 13, a picture layer of the picture at which decoding is started is decoded.

In step S187, similarly to step S159 in FIG. 13, slice information of the picture at which decoding is started is extracted.

In step S188, similarly to step S160 in FIG. 13, on the basis of the slice-position information, the position of a slice at which each decoder 265 starts decoding is detected.

In step S189, similarly to step S161 in FIG. 13, the information that directs supplying each decoder 265 with each slice starting at the start position detected in step S188 is supplied to the stream-reading control section 261, and each decoder 265 is directed to start decoding the slice starting at the start position detected in step S188. After that, the decoding-start-position detecting process finishes.

As described above, when the stream analyzing section 262 decodes the picture layer, the decoding-start position is rapidly detected on the basis of the picture-position information without searching for the start position (start code) of the picture layer on the video stream. In addition, when the decoders 165 decode the slices, the decoding-start position is rapidly detected on the basis of the picture-position information without searching for the start position (start code) of the slice layer on the video stream. Accordingly, a time necessary for detecting the decoding-start position is reduced, thus increasing the speed of decoding the video stream. Similarly, in the case of using one decoder to perform decoding without dividing decoding, the time necessary for detecting the decoding-start position is reduced, thus increasing the speed of decoding the video stream.

The picture-position information and the slice-position information can be recorded in a file different from a file of the video stream without being recorded in the video stream. An embodiment of the present invention when the picture-position information and the slice-position information are recorded in the file different from the file of the video stream is described below with reference to FIGS. 16 to 23.

FIG. 16 is a block diagram showing an example of the configuration of functions of an encoding unit 301 realized by the CPU 121 that executes a predetermined program. The encoding unit 301 differs from the encoding unit 201 in FIG. 7 in that it includes a GOP counting section 321. In FIG. 16, portions that correspond to those shown in FIG. 7 are denoted by reference numerals which each have last two digits identical to those of each reference numeral in FIG. 7. Accordingly, a description of each identical function is omitted since it is a repetition.

The encoding unit 301 includes an encoder 311, a picture counting section 312, a slice counting section 313, a start-position memory 314, a start-position-recording control section 315, a stream-output control section 316, and a GOP counting section 321.

In addition to the processing of the encoder 211 in FIG. 7, before starting to encode the video stream, the encoder 311 stores, in the start-position memory 314, information (clip-start-position information) representing a position to start to record, in the recording medium (for example, the removable medium 116 or the HDD 124), a clip of the video stream generated by performing encoding. In addition, when starting to encode video stream, the encoder 311 supplies the start-position-recording control section 315 with information that reports the start of encoding the video stream. Whenever the encoder 311 starts to encode the GOP (GOP layer), the encoder 311 supplies the GOP counting section 321 and the start-position-recording control section 315 with information that reports the start of GOP encoding.

The GOP counting section 321 counts the number of GOPs in the clip. Specifically, the GOP counting section 321 manages a GOP counter. Whenever the encoder 311 supplies the GOP counting section 321 with the information that reports the'start of GOP encoding, the GOP counting section 321 increments the value of the GOP counter.

The start-position-recording control section 315 reads one of the picture-start-position information, slice-start-position information, picture-data-length information, slice-data-length information, and clip-start-position information recorded in the start-position memory 314. The start-position-recording control section 315 also acquires information representing the value of the picture counter. The start-position-recording control section 315 acquires, from the slice counting section 313, the information representing the value of the slice counter. The start-position-recording control section 315 acquires, from the GOP counting section 321, the information representing the value of the GOP counter.

The start-position-recording control section 315 generates information (hereinafter referred to as "clip-position information") representing the positions of each picture and each slice in the clip. The start-position-recording control section 315 temporarily stores the clip-position information in the stream memory 202, and updates the clip-position information, if necessary.

The stream-output control section 316 temporarily stores, in the stream memory 202, the video stream encoded by the encoder 311. The stream-output control section 316 reads the video stream or clip-position information stored in the stream memory 202, and outputs the read video stream and clip-position information to the exterior (for example, to the drive 112 or the HDD 124 through the bus 130).

FIG. 17 is a block diagram showing an example of the configuration of functions of a decoding unit 351 realized by the CPU 121 that executes a predetermined program. In FIG. 17, portions that correspond to those shown in FIG. 8 are denoted by reference numerals which each have last two digits identical to those of each reference numeral in FIG. 8. Accordingly, a description of each identical function is omitted since it is a repetition.

The decoding unit 351 includes a stream-reading control section 361, a stream analyzing section 362, a decoding control section 364, decoders 365-1 to 365-4, a baseband output control section 366, and a start-position detecting section 371.

In addition to the processing of the decoding control section 264 in FIG. 8, the decoding control section 364 supplies the start-position detecting section 371 with information that directs acquiring clip-position information corresponding to a clip of the video stream to be decoded.

The start-position detecting section 371 reads, from a recording medium in which the clip is recorded, clip-position information corresponding to the clip of the video stream to be decoded. On the basis of the clip-position information, the start-position detecting section 371 detects the start position of a picture or slice designated by start-position-detection directing information from the decoding control section 364. The start-position detecting section 371 supplies the decoding control section 364 with information representing the start position of the detected picture or slice.

When it is not necessary to distinguish each of the decoders 365-1 to 365-4, they are simply referred to as the decoders 365.

FIG. 18 is an illustration of an example of a data arrangement of the clip-position information. The clip-position information is recorded for each clip of the video stream, and includes a clip number, a clip-start address, picture-position information, and slice-position information.

The clip number is used to identify a clip corresponding to clip-position information, and is assigned for uniquely identifying a clip of the video stream recorded in the recording medium.

The clip-start address represents the address of the beginning of a location in which the clip is recorded in the recording medium (for example, the removable medium 116 or HDD 124).

As described later with reference to FIG. 19, the picture-position information contains, for each GOP included in the clip, information representing the position of the picture in the GOP.

As described later with reference to FIG. 20, the slice-position information contains, for each picture included in the clip, information representing the position of each slice in the picture.

FIG. 19 is an illustration of an example of a data arrangement of the picture-position information included in the clip-position information shown in FIG. 18. The picture-position information of the clip-position information differs from the picture-position information shown in FIG. 10 in that a GOP number is added. The GOP number is assigned for uniquely identifying a GOP in the clip, and represents the GOP number of a GOP corresponding to the picture-position information.

FIG. 20 is an illustration of an example of a data arrangement of the slice-position information included in the clip-position information shown in FIG. 18. The slice-position information of the clip-position information differs from the slice-position information shown in FIG. 11 in that a picture number is added. The picture number represents the picture number of a picture corresponding to the slice-position information.

Figure 21:
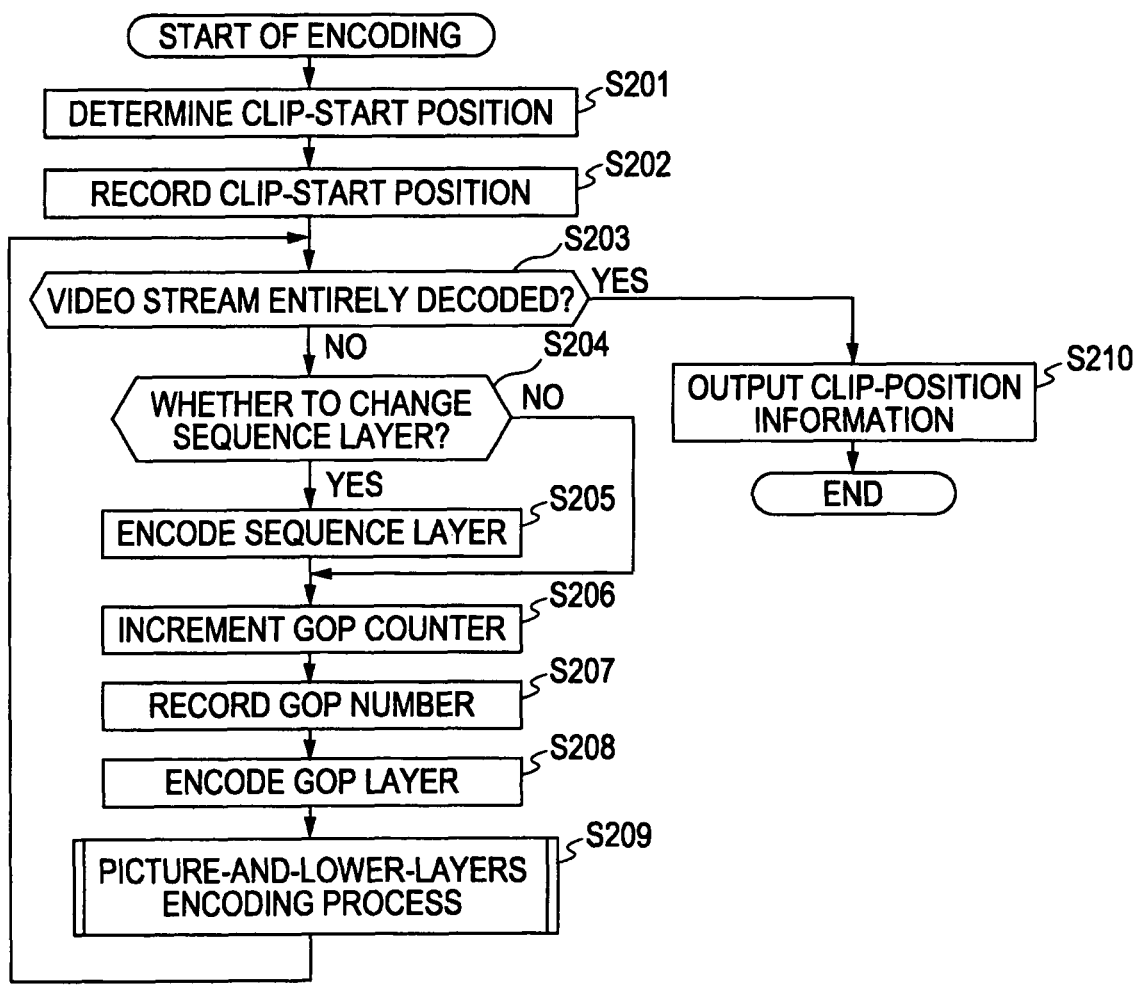
FIG. 21 is a flowchart illustrating an encoding process executed by the encoding unit shown in FIG. 16.

Next, an encoding process executed by the encoding unit 301 is described below with reference to the flowchart shown in FIG. 21. This process is started when the encoder 311 acquires, for example, an encoding instruction input by the user with the mouse 114 or the keyboard 115 through the interface 129-1 and the bus 130. The following describes a case in which, after a video stream that is a baseband signal prior to encoding is input from the external video recording/playback apparatus 113-1 to the encoder 311 through the interface 129-2 and the bus 130, an encoded video stream is recorded in the removable medium 116.

In step S201, the encoder 311 determines a clip-start position. Specifically, the encoder 311 determines a position to start to record, in the removable medium 116, the clip of the video stream to be encoded. The encoder 311 stores, in the start-position memory 314, clip-start-position information representing the determined start position.

In step S202, the start-position-recording control section 315 records the clip-start position. Specifically, the encoder 311 supplies the start-position-recording control section 315 with information that reports the start of video stream encoding. The start-position-recording control section 315 acquires the clip-start-position information from the start-position memory 314. The start-position-recording control section 315 generates the clip-position information. The start-position-recording control section 315 records, in the clip-position information, the clip number of the clip of the video stream whose encoding is to be started. The start-position-recording control section 315 also records the value of the clip-start-position information as the clip-start address of the clip-position information. The start-position-recording control section 315 stores the clip-position information in the stream memory 152.

Figure 11:
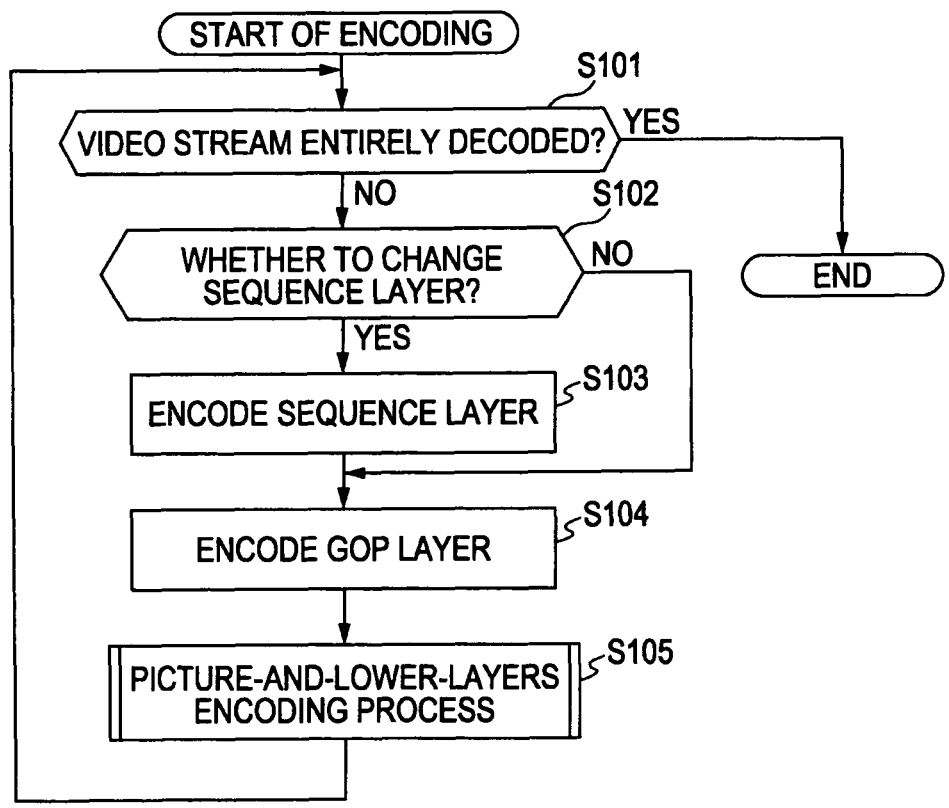
FIG. 11 is a flowchart illustrating an encoding process executed by the encoding unit shown in FIG. 7.

In step S203, similarly to step S101 in FIG. 11, it is determined whether or not the video stream has been entirely encoded. If it is determined that the video stream has not been entirely encoded, the process proceeds to step S204.

In step S204, similarly to step S102 in FIG. 11, it is determined whether or not the sequence layer is to be changed. If it is determined that the sequence layer is to be changed, the process proceeds to step S205.

In step S205, similarly to step S103 in FIG. 11, the sequence layer is encoded.

If, in step S204, it is determined that the sequence layer is not to be changed, the process proceeds to step S206, skipping over step S205.

In step S206, the GOP counting section 321 increments the GOP counter. Specifically, the encoder 311 supplies the GOP counting section 321 with information that reports the start of encoding the next GOP. The GOP counting section 321 increments the GOP counter.

In step S207, the start-position-recording control section 315 records the GOP number. Specifically, the encoder 311 supplies the start-position-recording control section 315 with the information that reports the start of encoding the next GOP. The start-position-recording control section 315 acquires the information representing the value of the GOP counter from the GOP counting section 321. The start-position-recording control section 315 records the value of the GOP counter as the GOP number for picture-position information corresponding to a GOP to be encoded which follows the clip-position information stored in the stream memory 202.

In step S208, similarly to step S104 in FIG. 11, the GOP layer is encoded.

Figure 12:
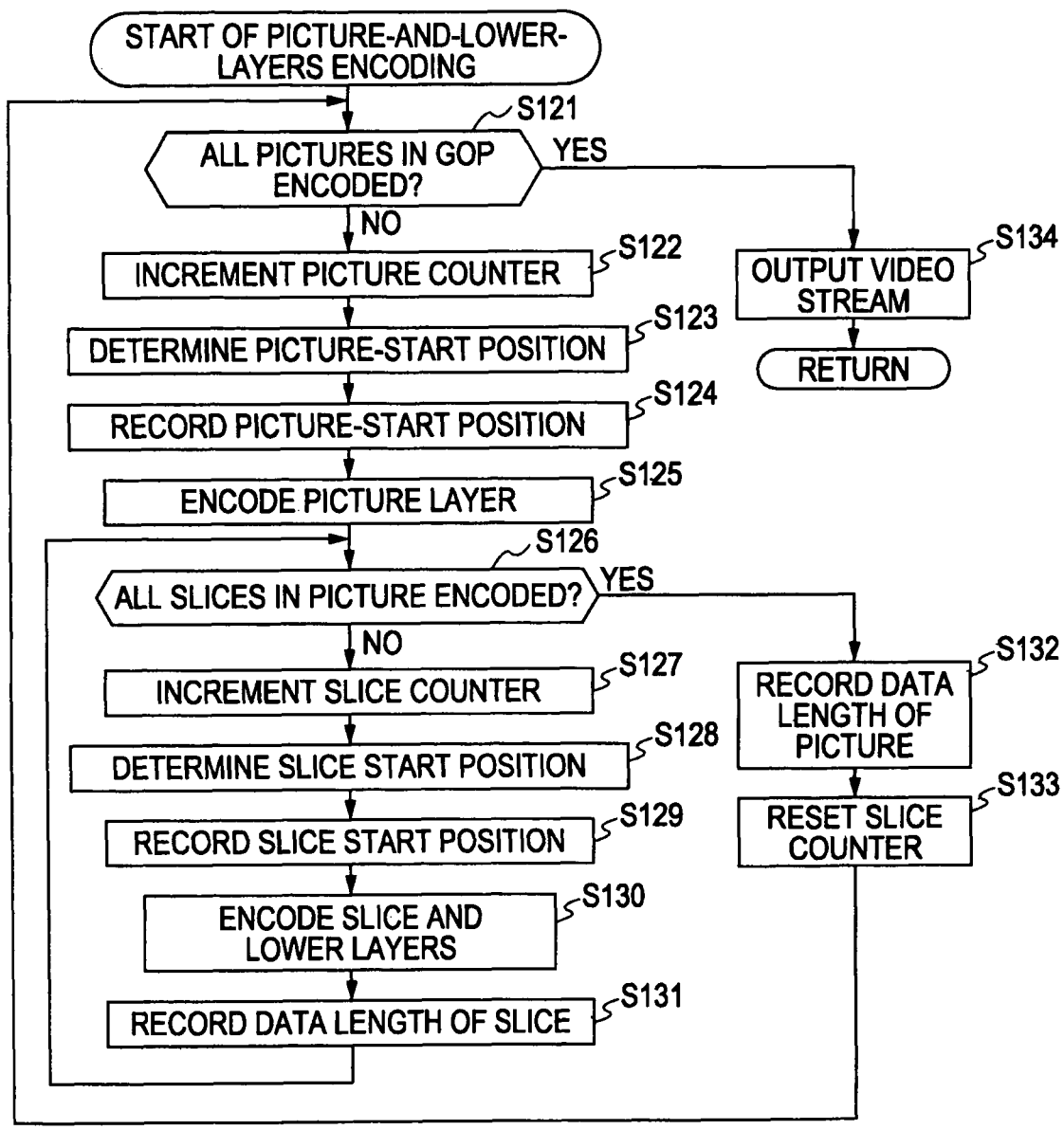
FIG. 12 is a flowchart illustrating details of a picture-and-lower-layers encoding process in step S105 in FIG. 11.

In step S209, the picture-and-lower-layers encoding process described with reference to FIG. 12 is performed. Differently from the picture-and-lower-layers encoding process executed by the encoder 211 in FIG. 7, the picture-position information and the slice-position information are recorded in the clip-position information stored in the stream memory 202.

After the process returns to step S203, processing in steps S203 to S209 is repeatedly executed until, in step S203, it is determined that the video stream has entirely been encoded.

If, in step S203, it is determined that the video stream has entirely been encoded, the process proceeds to step S210.

In step S210, the stream-output control section 316 outputs the clip-position information, and the encoding process finishes. Specifically, the stream-output control section 316 reads the clip-position information stored in the stream memory 202, and supplies the read clip-position information to the drive 112 through the bus 130 and the interface 129-3. The drive 112 records the clip-position information as a file different from a corresponding clip in the removable medium 116.

Next, a decoding process executed by the decoding unit 351 is described below with reference to the flowcharts shown in FIGS. 22 and 23. The flowcharts shown in FIGS. 22 and 23 differ from those shown in FIGS. 13 and 14 in that step S251 is added.

In other words, in step S251, the start-position detecting section 371 acquires the clip-position information. Specifically, the decoding control section 364 supplies the start-position detecting section 371 with information that directs acquiring clip-position information corresponding to a clip of the video stream to be decoded. Under the control of the start-position detecting section 371, the drive 112 reads the clip-position information from the removable medium 116, and supplies the read clip-position information to the start-position detecting section 371 through the interface 129-3 and the bus 130.

Figure 14:
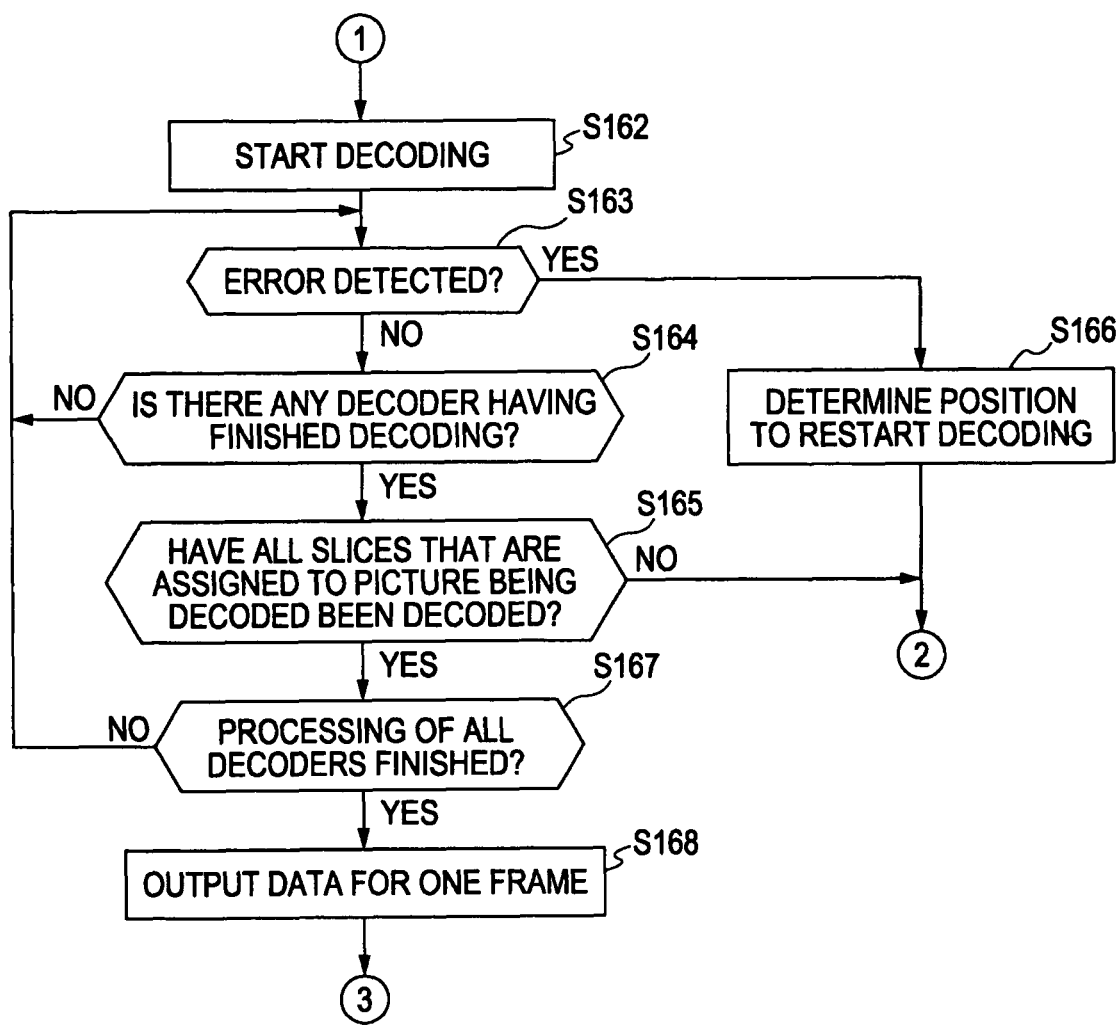
FIG. 14 is a flowchart illustrating the decoding process executed by the decoding unit shown in FIG. 8.
Figure 22:
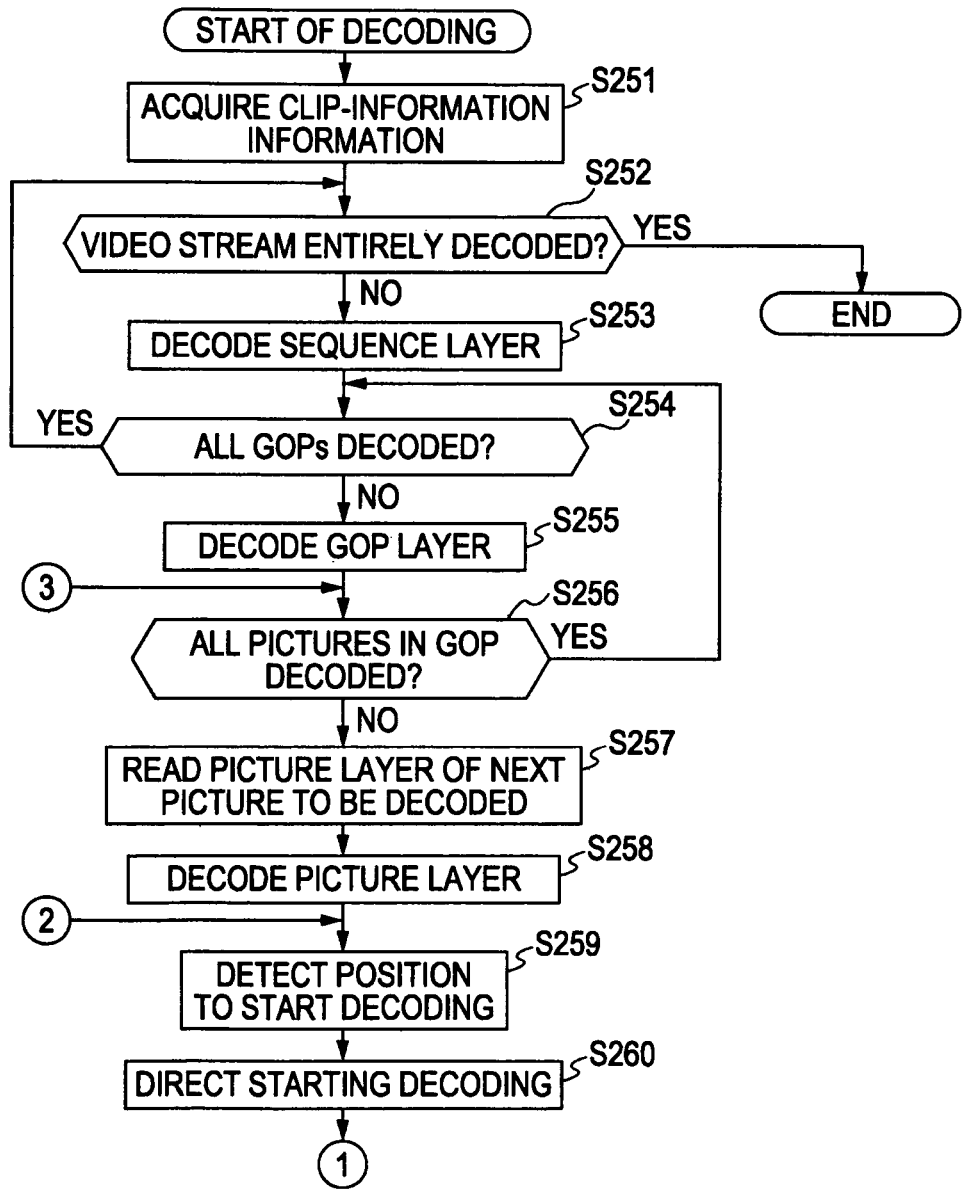
FIG. 22 is a flowchart illustrating a decoding process executed by the decoding unit shown in FIG. 17.
Figure 23:
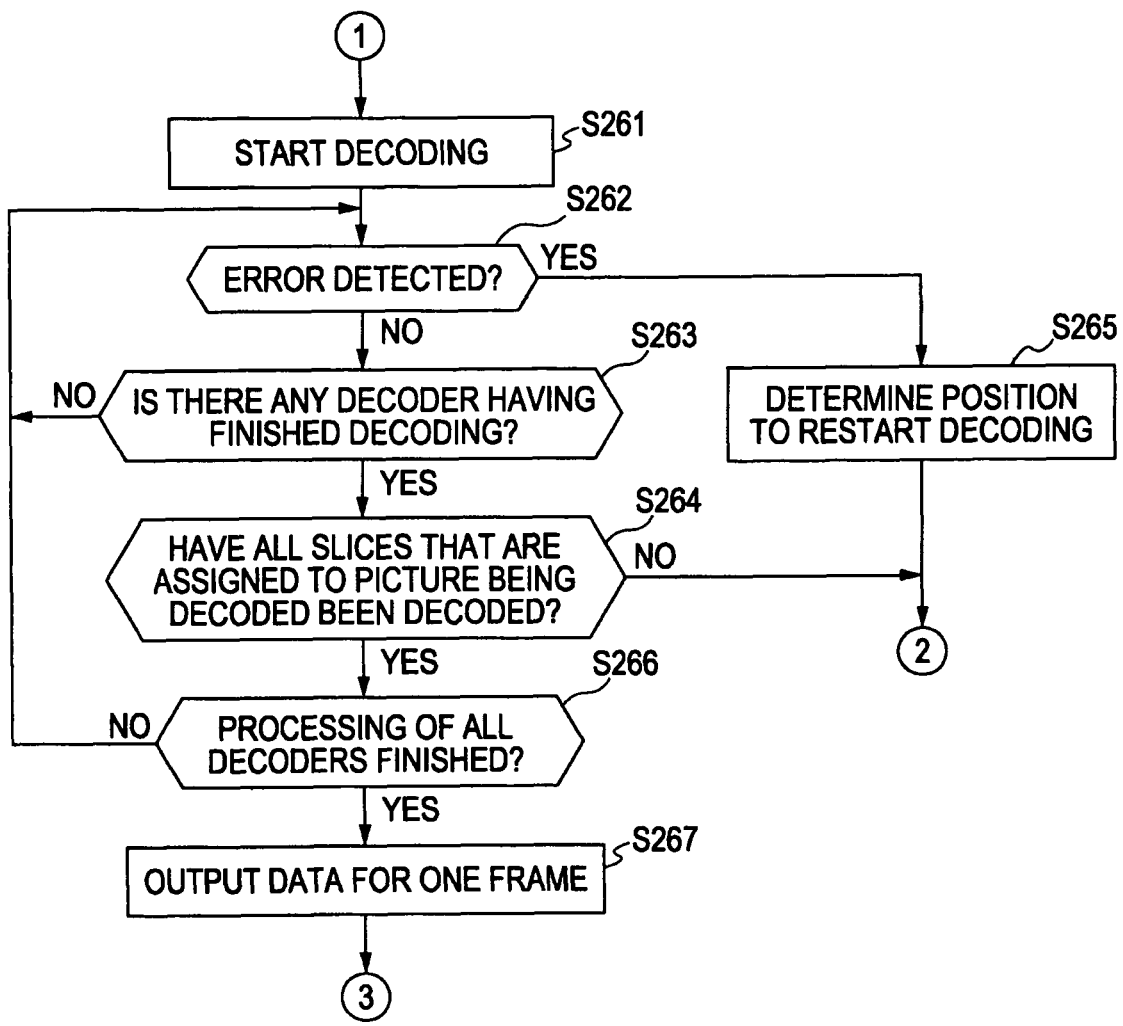
FIG. 23 is a flowchart illustrating the decoding process executed by the decoding unit shown in FIG. 17.

In the flowcharts shown in FIGS. 22 and 23, steps corresponding to steps S155 and 159 are deleted since, compared with the flowcharts shown in FIGS. 13 and 14, it is not necessary to extract the picture-position information and slice-position information recorded in the video stream. Therefore, a time necessary for extracting the picture-position information and slice-position information is reduced.

The other steps are similar to those described with reference to FIGS. 13 and 14. Accordingly, their description is omitted since it is a repetition. A start position of decoding the picture layer and decoding-start positions of the decoders 365 are detected on the basis of the clip-position information.

By combining the process described with reference to FIGS. 3 to 6 and the process described with reference to FIGS. 7 to 15 and FIGS. 16 to 21, that is, by setting divided decoding regions so as to include consecutive slices on the video stream and recording the picture-position information and the slice-position information, the speed of video stream decoding can be further increased. The following describes an embodiment of a combination of the process described with reference to FIGS. 3 to 6 and the process described with reference to FIGS. 7 to 15. The video stream encoding is similar to the processing described with reference to FIGS. 7, 11, and 12. Accordingly, its description is omitted since it is a repetition.

Figure 24:
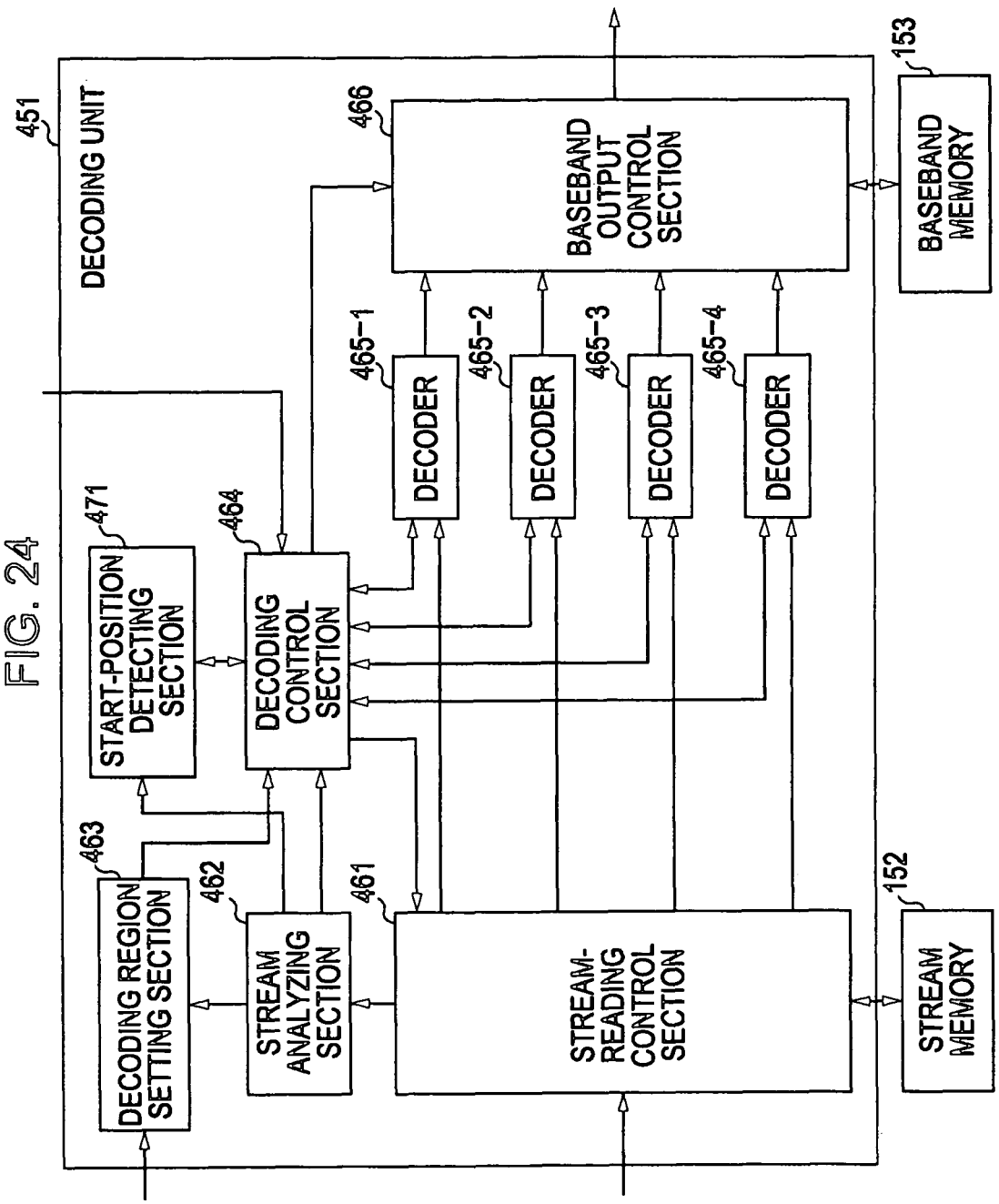
FIG. 24 is a block diagram showing another example of the configuration of functions of a decoding unit realized by the CPU shown in FIG. 2.

FIG. 24 is a block diagram showing an example of the configuration of functions of a decoding unit 451 realized by the CPU 121 that executes a predetermined program. The decoding unit 451 differs from the decoding unit 251 shown in FIG. 8 in that it includes a decoding region setting section 463. In FIG. 24, portions that correspond to those shown in FIG. 8 are denoted by reference numerals which each have last two digits identical to those of each reference numeral in FIG. 8. Accordingly, a description of each identical function is omitted since it is a repetition.

The decoding unit 451 includes a stream-reading control section 461, a stream analyzing section 462, a decoding region setting section 463, a decoding control section 464, decoders 465-1 to 465-4, a baseband output control section 466, and a start-position detecting section 471.

The stream analyzing section 462 decodes layers of the video stream up to the picture layer, and supplies the decoding control section 464 with information obtained by performing decoding. The stream analyzing section 462 also supplies the decoding region setting section 463 with information which represents the image size of the video stream and which is obtained by decoding the sequence layer of the video stream. The stream analyzing section 462 extracts the picture-position information and slice-position information recorded in the video stream, and supplies the extracted picture-position information and slice-position information to the start-position detecting section 471.

Similarly to the decoding region setting section 163 in FIG. 3, the decoding region setting section 463 sets divided decoding regions. The decoding region setting section 463 supplies the decoding control section 464 with information representing the set divided decoding regions.

In addition to the processing of the decoding control section 264 in FIG. 8, on the basis of the divided decoding regions, the decoding control section 464 determines slices to be decoded by the decoders 465-1 to 465-4.

When it is not necessary to each of the decoders 465-1 to 465-4, they are simply referred as the decoders 465.

Next, a decoding process executed by the decoding unit 451 is described below with reference to the flowcharts shown in FIGS. 25 and 26.

Similarly to step S1 in FIG. 4, in step S351, it is determined whether or not the video stream has entirely been decoded. If it is determined that the video stream has not entirely been decoded, the process proceeds to step S352.

Similarly to step S2 in FIG. 4, in step S352, a sequence layer of the video stream to be decoded is read from the removable medium 116, and the sequence layer is decoded.

Similarly to step S3 in FIG. 4, in step S353, the image size of the video stream is detected.

Similarly to step S4 in FIG. 4, in step S354, divided decoding regions to be decoded by the decoders 465 are set, and information representing the divided decoding regions is supplied to the decoding control section 464.

Similarly to step S5 in FIG. 4, in step S355, it is determined whether or not all the GOPs have been decoded. If it is determined that all the GOPs have not been decoded yet, the process proceeds to step S356.

Similarly to step S6 in FIG. 4, in step S356, the next GOP to be decoded is read from the removable medium 116, and a GOP layer of the read GOP is decoded.

Similarly to step S155 in FIG. 13, in step S357, picture-position information is extracted, and the picture-position information is supplied to the start-position detecting section 471.

Similarly to step S7 in FIG. 4, in step S358, it is determined whether or not all pictures in the GOP have been decoded. If it is determined that all the pictures in the GOP have not been decoded, the process proceeds to step S359.

Similarly to step S157 in FIG. 13, in step S359, a picture layer of the next picture to be decoded and supplied to the stream analyzing section 462.

Similarly to step S9 in FIG. 4, in step S360, the picture layer is decoded.

Similarly to step S159 in FIG. 13, in step S361, slice-position information is acquired and supplied to the start-position detecting section 471.

In step S362, the start-position detecting section 471 detects a start position of each divided decoding region. Specifically, by designating the slice number of the first slice in each divided decoding region to be decoded by the decoder 465 in the next picture to be decoded, the decoding control section 464 supplies the start-position detecting section 471 with start-position-detection directing information that directs detecting the start position of the divided decoding region. On the basis of the slice-position information, the start-position detecting section 471 detects the start position of the slice corresponding to the designated slice number. In other words, the start-position detecting section 471 detects the start position of the divided decoding region. The start-position detecting section 471 supplies the decoding control section 464 with information representing the detected start position.

In step S363, the decoding control section 464 directs starting decoding. Specifically, the decoding control section 464 supplies the stream-reading control section 461 with information that directs supplying each decoder 465 with slices included in each divided decoding region starting at the start position detected in step S362. In addition, the decoding control section 464 supplies the decoder 465 with information that directs starting to decode the next picture.

In step S364, the decoder 465 starts decoding. Specifically, the stream-reading control section 461 reads, from the stream memory 152, the slices included in each divided decoding region starting at the start position detected by the decoding control section 464. For each divided decoding region, the stream-reading control section 461 supplies the read slices to one decoder 465 to which decoding of the divided decoding region is assigned. The decoder 465 starts to decode the first slice in the divided decoding region. The decoder 465 sequentially supplies decoded data to the baseband output control section 466. The baseband output control section 466 stores the supplied data in the baseband memory 153.

Similarly to step S13 in FIG. 5, in step S365, it is determined whether or not an error has occurred. If it is determined that the error has occurred, the process proceeds to step S366.

In step S366, the decoding control section 464 determines a position to restart to perform decoding. The decoding control section 464 determines, as the position to restart to perform decoding, for example, a slice that follows a slice whose decoding has failed.

In step S365, the decoder 465 restarts decoding. Specifically, the decoding control section 464 supplies, to one decoder 465 in which an error has occurred, information that directs restarting to decode a slice that follows a slice in which an error has occurred. The decoder 465 restarts decoding from the designated slice.

If, in step S365, it is determined that the error has not occurred, the process proceeds to step S368, skipping over steps S366 and S367.

Similarly to step S16 in FIG. 5, in step S368, it is determined whether or not processing of all the decoders 465 has finished. If it is determined that the processing of all the decoders 465 has not finished yet, the process returns to step S365. Processing in steps S365 to S368 is repeatedly executed until, in step S368, it is determined that the processing of all the decoders 465 has finished.

If, in step S368, it is determined that the processing of all the decoders 465 has finished, the process proceeds to step S369.

Similarly to step S17 in FIG. 5, in step S369, data for one frame is output. After that, the process returns to step S358.

If, in step S358, it is determined that all the pictures in the GOP have been decoded yet, the process proceeds to step S359, and the processing in step S359 and subsequent steps is executed. In other words, the next picture is decoded.

If, in step S358, it is determined that all the pictures in the GOP have been decoded, the process returns to step S355.

If, in step S355, it is determined that all the pictures in the GOP have not been decoded, the process proceeds to step S356, and the processing in step S356 and subsequent steps is executed. In other words, the next GOP is decoded.

If, in step S355, it is determined that all the GOPs have been decoded, the process returns to step S351.

If, in step S351, it is determined that the video stream has not entirely been decoded, the process proceeds to step S352, and the processing in step S352 and subsequent steps is executed. In other words, the next sequence layer of the video stream is decoded.

If, in step S351, it is determined that the video stream has entirely been decoded, the decoding process finishes.

As described above, when the stream analyzing section 462 decodes the picture layer, a decoding start position is rapidly detected on the basis of the picture-position information without searching for a start position (start code) of the picture layer on the video stream. When each decoder 465 performs decoding, for each frame (picture), as a position at which the decoder 465 starts decoding, the start position of each divided decoding region only needs to be detected, and the start position of the divided decoding region is rapidly detected on the basis of the slice-position information without searching for the start position (start code) of the slice layer on the video stream. Therefore, a time necessary for detecting the decoding start position is reduced, thus increasing the speed of video stream decoding. Also, in the case of using one decoder to perform decoding without dividing a decoding process, the time necessary for detecting the decoding start position can be reduced, thus increasing the speed of video stream decoding.

Also a combination of the process described with reference to FIGS. 3 to 6 and the process described with reference to FIGS. 16 to 23 is not described since it is approximately similar to the process described with reference to FIGS. 24 to 26, excluding a point in that the picture-position information and the slice-position information are recorded in the clip-position information.

In addition, by further dividing the video stream decoding process into a plurality of stages, and using a plurality of pieces of hardware in parallel to perform the decoding process divided into the stages, the speed of the decoding process can further be increased. An embodiment of the present invention in a case in which a decoding process is divided into a plurality of stages and the stages of the decoding process are performed in parallel by a plurality of pieces of hardware is described with reference to FIGS. 27 to 37.

Figure 27:
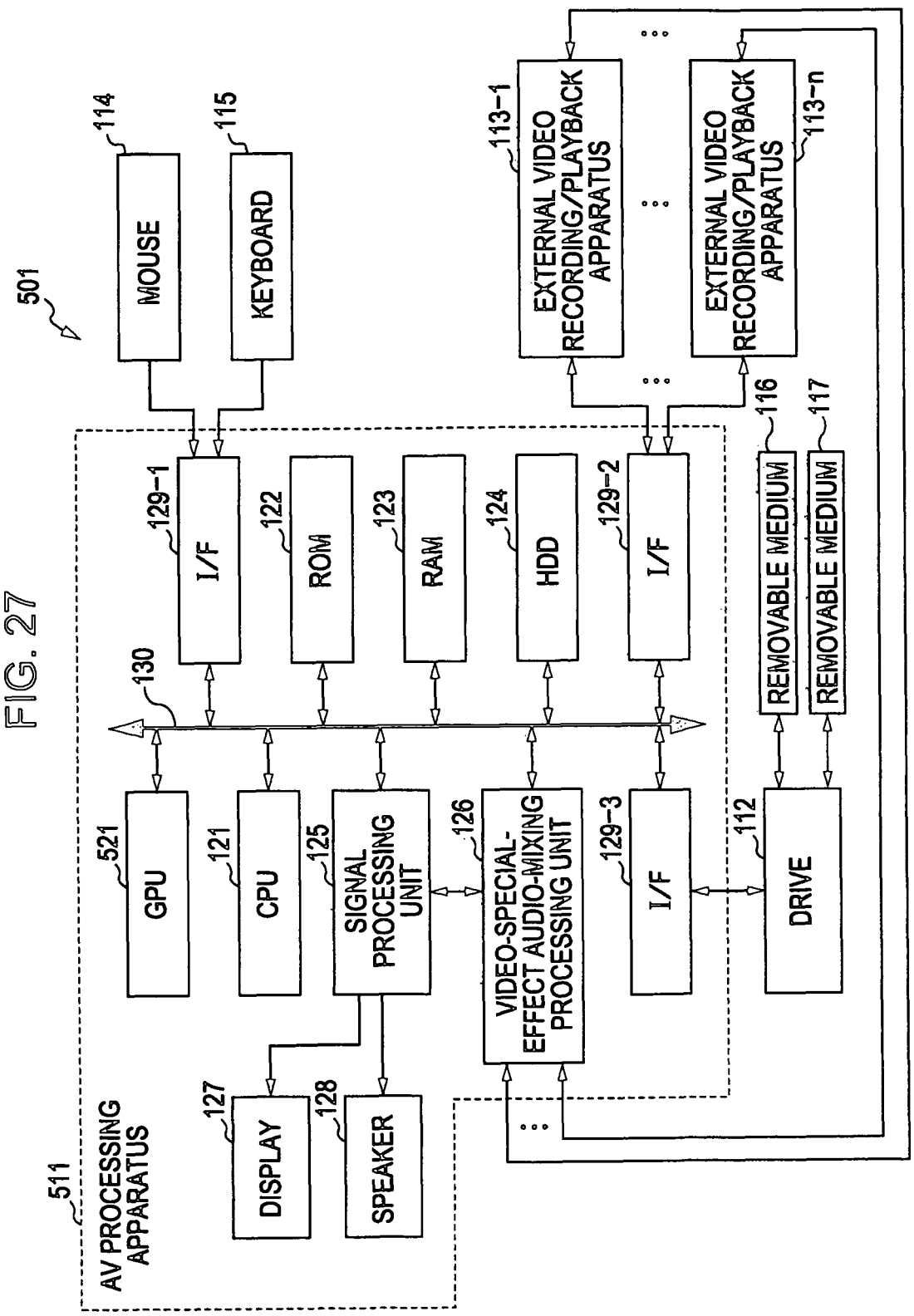
FIG. 27 is a block diagram showing an example of an AV processing system to which an embodiment of the present invention is applied.

FIG. 27 is a block diagram showing an embodiment of an AV processing system 501 in which a decoding process is divided into a plurality of stages and the stages of the decoding process are performed in parallel by a plurality of pieces of hardware. In FIG. 27, portions that correspond to those shown in FIG. 2 are denoted by identical reference numerals, and each portion whose processing is identical is not described since its description is a repetition.

Compared with the AV processing system 101 shown in FIG. 2, the AV processing system 501 is identical in that it includes the external video recording/playback apparatuses 113-1 to 113-n, the mouse 114, and the keyboard 115, and differs in that it includes the AV processing apparatus 511 instead of the AV processing system 101.

Compared with the AV processing apparatus 111 shown in FIG. 2, the AV processing apparatus 511 is identical in that it includes the CPU 121, the ROM 122, the RAM 123, the HDD 124, the signal processing unit 125, the video-special-effect audio-mixing processing unit 126, the display 127, the speaker 128, and the interfaces 129-1 to 129-3, and differs in that it includes a graphics processing unit (GPU) 521. The CPU 121, the ROM 122, the RAM 123, the HDD 124, the signal processing unit 125, the video-special-effect audio-mixing processing unit 126, the interfaces 129-1 to 129-3, and the GPU 521 are connected to one another by the bus 130.

The GPU 521 is a processor that mainly performs graphics processing. In the AV processing apparatus 511, as described later, two pieces (processors) of hardware, the CPU 121 and the GPU 521, divide video stream decoding into two stages, and execute the stages of the decoding in parallel.

Figure 28:
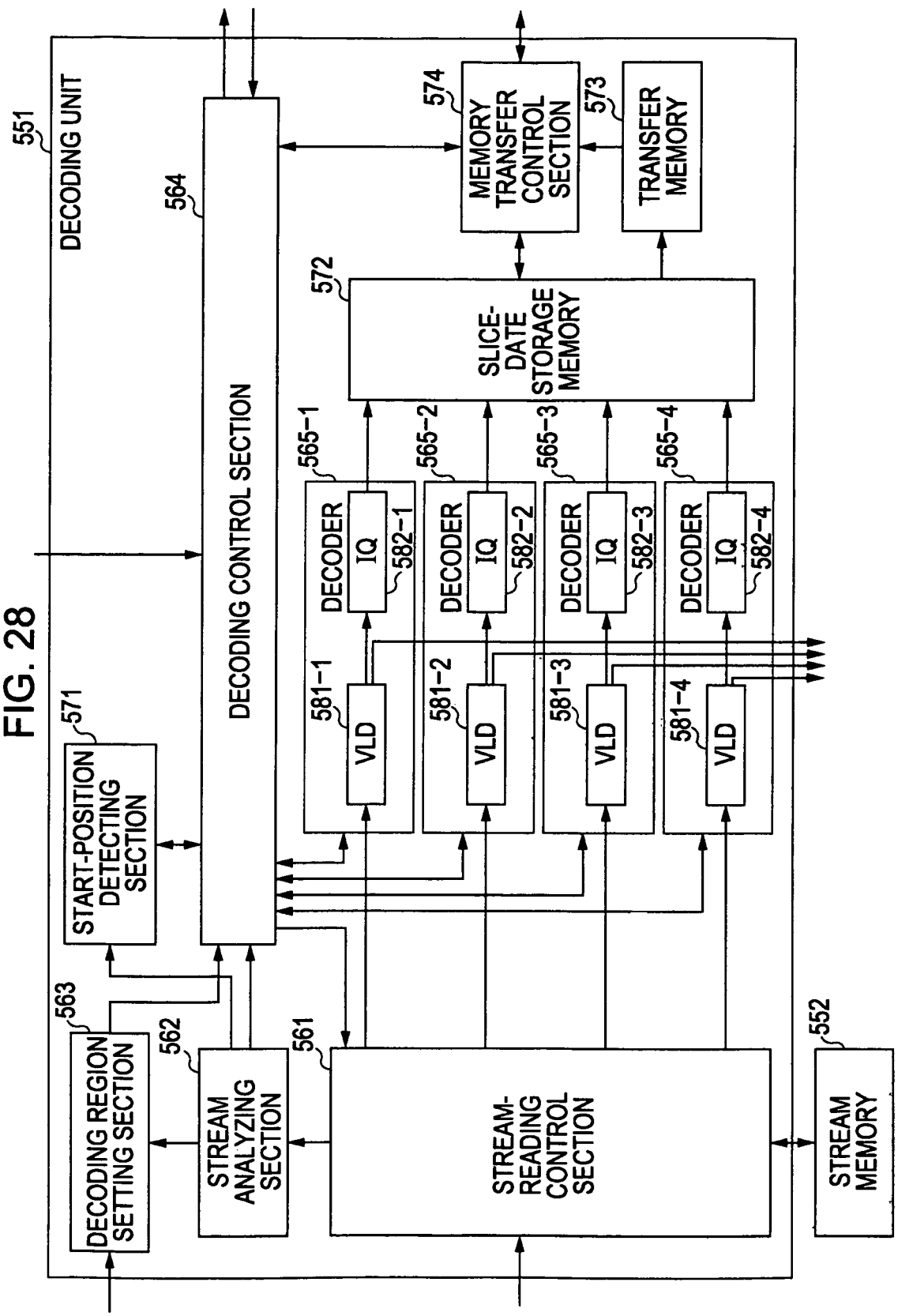
FIG. 28 is a block diagram showing an example of the configuration of functions of a decoding unit realized by the CPU shown in FIG. 27.

FIG. 28 is a block diagram showing an example of the configuration of functions of a decoding unit 551 realized by the CPU 121, which executes a predetermined program. In FIG. 28, portions that correspond to those shown in FIG. 24 are denoted by reference numerals which each have last two digits identical to those of each reference numeral in FIG. 24. Accordingly, a description of each identical function is omitted since it is a repetition.

The decoding unit 551 includes a stream-reading control section 561, a stream analyzing section 562, a decoding region setting section 563, a decoding control section 564, decoders 565-1 to 565-4, a start-position detecting section 571, a slice-date storage memory 572, a transfer memory 573, and a memory transfer control section 574.

The stream-reading control section 561 controls the drive 112 to read the video stream recorded in the removable medium 116. The stream-reading control section 561 acquires the video stream read by the drive 112 through the interface 129-3 and the bus 130. The stream-reading control section 561 reads the video stream recorded in the HDD 124 through the bus 130. The stream-reading control section 561 temporarily stores the read video stream in the stream memory 152, which is formed by a cache memory (not shown) in the CPU 121, if necessary. The stream-reading control section 561 supplies the read video stream to the stream analyzing section 562 or the decoders 565-1 to 565-4, if necessary.

In addition to the processing of the decoding control section 464 shown in FIG. 24, the decoding control section 564 controls the decoders 565-1 to 565-4 to generate threads for executing decoding (first half of a decoding process described later with reference to FIG. 32), up to a predetermined intermediate stage, of slices in each divided decoding region, and to execute the first half of the decoding process on the divided decoding region assigned to each decoder in parallel with another decoder. The decoding control section 564 also controls the memory transfer control section 574 and the GPU 521 to generate threads for executing the remaining stage of decoding (latter half of the decoding process described later with reference to FIGS. 33 and 34) on the slices decoded up to the intermediate stage by the decoders 565-1 to 565-4, and to execute the last part of the decoding process in parallel with the first part of the decoding process by the decoders 565-1 to 565-4.

The decoding control section 564 acquires, from the GPU 521, through the bus 130, information indicating that processing of the GPU 521 has finished. The decoding control section 564 also supplies the decoders 565-1 to 565-4 with information indicating whether or not the processing of the GPU 521 is being executed. The decoding control section 564 supplies the decoders 565-1 to 565-4 with information that directs starting the first part of the decoding process (the decoding control section 564 calls a thread for executing the first part of the decoding process and supplies the called thread with information necessary for the first part of the decoding process).

The decoding control section 564 supplies the memory transfer control section 574 and the GPU 521 with information that directs starting the latter half of the decoding process (the decoding control section 564 calls a thread for executing the latter half of the decoding process and supplies the thread with information necessary for the latter half of the decoding process). The information that directs starting the latter half of the decoding process includes history information indicating, to which stage, a slice to be decoded has been decoded.

The decoders 565-1 to 565-4 perform parallel decoding (variable length decoding and inverse quantization) on the divided decoding regions in each frame of the video stream which are assigned to the decoders 565-1 to 565-4. The decoders 565-1 to 565-4 include sets of variable length decoders (VLDs) 581-1 to 581-4 and inverse quantizers (IQs) 582-1 to 582-4. In the following description, when it is not necessary to distinguish each of the decoders 565-1 to 565-4, they are simply hereinafter referred to as the "decoders 565". When it is not necessary to distinguish each of the VLDs 581-1 to 581-4, they are simply hereinafter referred to as the "VDLs 581". When it is not necessary to distinguish each of the IQs 582-1 to 582-4, they are simply hereinafter referred to as the "IQs 582".

The VLDs 581 perform variable length decoding on the data (video stream) supplied from the stream-reading control section 561, and supplies the variable-length-decoded data to the IQs 582. The VLDs 581 uses the bus 130 to supply the GPU 521 with information representing a prediction mode, motion vector, and a frame/field prediction flag included in the decoded data. The VLDs 581 supply the IQs 582 with quantization scale information included in the decoded data.

In accordance with the quantization scale supplied from the VLDs 581, the IQs 582 inverse-quantize the data supplied from the VLDs 581, and store the inverse-quantized data in the slice-date storage memory 572. In addition, when the data quantized by the IQs 582 is stored for one slice in the slice-date storage memory 572, the IQs 582 transfer the data for one slice from the slice-date storage memory 572 to the transfer memory 573.

The memory transfer control section 574 transfer the data stored in the transfer memory 573 to the GPU 521 through the bus 130.

Figure 29:
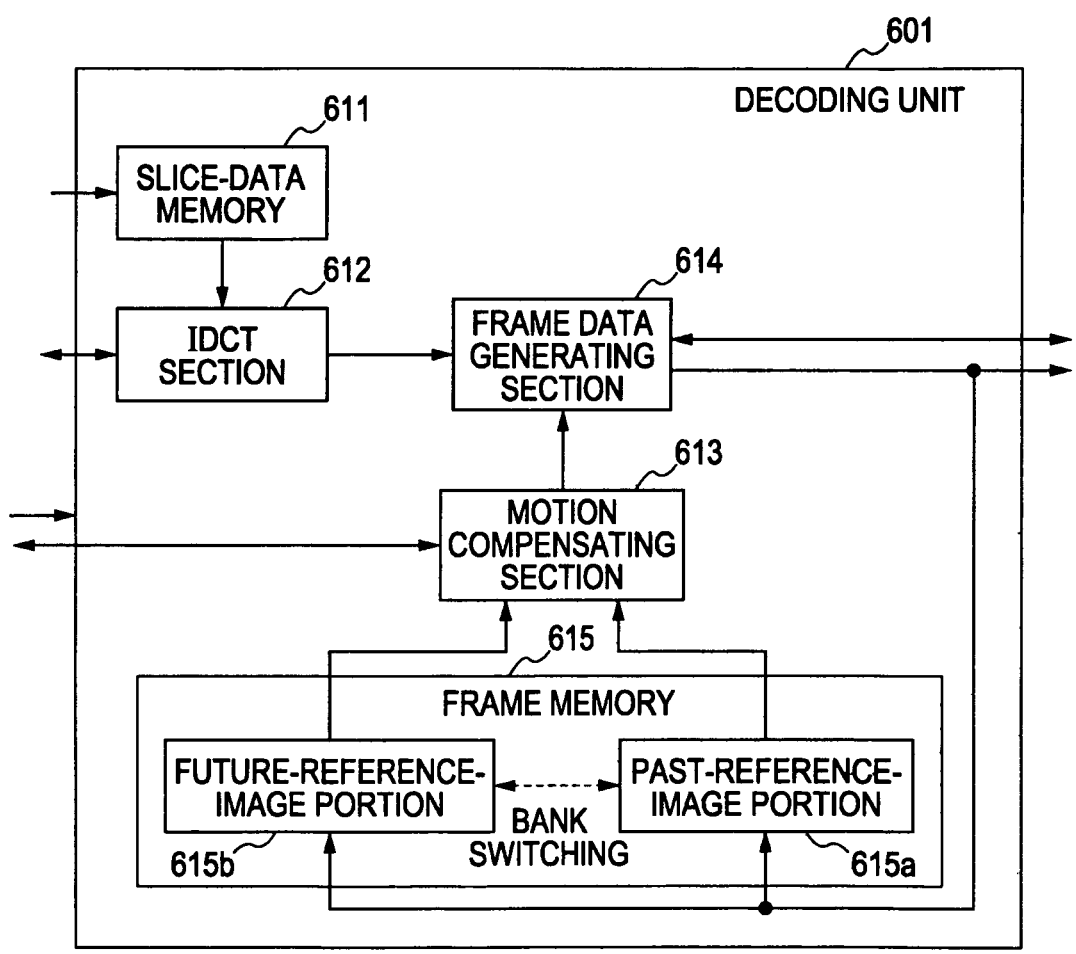
FIG. 29 is a block diagram showing an example of the configuration of functions of a decoding unit realized by the GPU shown in FIG. 27.

FIG. 29 is a block diagram showing an example of the configuration of functions of a decoding unit 601 realized by the GPU 521, which performs a predetermined program. The decoding unit 601 includes a slice-data memory 611, an inverse discrete cosine transform (IDCT) section 612, a motion compensating section 613, a frame data generating section 614, and a frame memory 615.

The slice-data memory 611 stores the inverse-quantized data for one slice supplied from the memory transfer control section 574.

Figure 34:
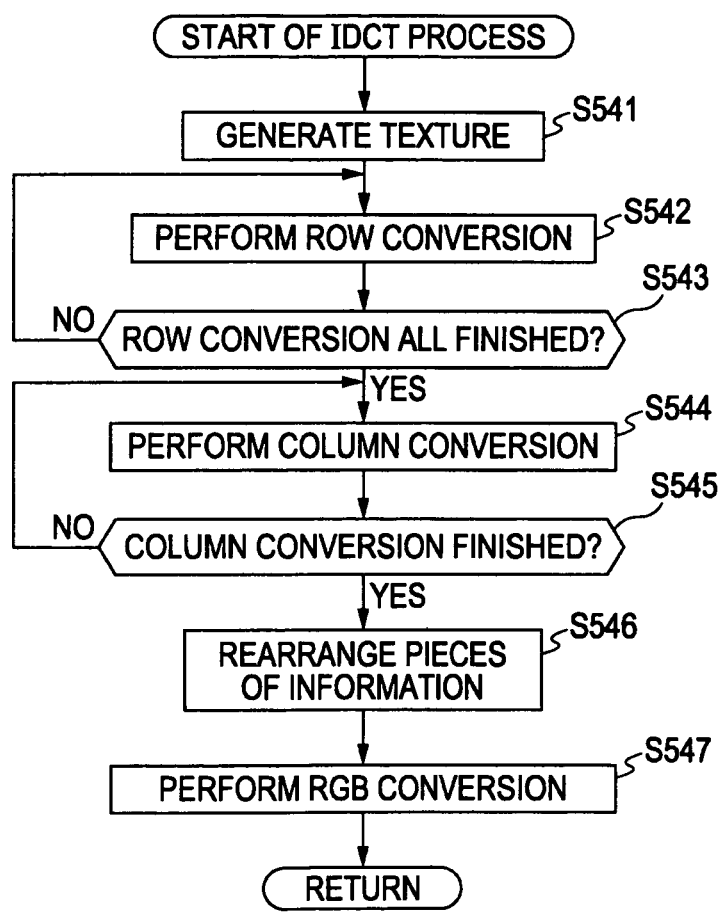
FIG. 34 is a flowchart illustrating details of an IDCT process in step S423 in FIG. 33.

Under the control of the decoding control section 564, the IDCT section 612 performs IDCT processing, which is described later with reference to FIG. 34, on the slice stored in the slice-data memory 611. The IDCT section 612 supplies the frame data generating section 614 with image data obtained by performing IDCT processing. The IDCT section 612 performs ICDT processing on macroblocks on the video stream on the basis of, for example, the fast IDCT algorithm. Details of the fast IDCT algorithm are disclosed in, for example, Yukihiro Arai, and two other persons, "Fast DCT-SQ Scheme for Images", THE TRANSACTIONS OF THE IEICE, vol. E 71, No. 11, November 1988, pp. 1095-1097.

The motion compensating section 613 acquires the information, from the VLDs 581 through the bus 130, representing the prediction mode, the motion vector, and the frame/field prediction flag. When the next image data the frame data generating section 614 generates is a P-picture in a forward prediction mode, the motion compensating section 613 generates predictive image data by performing, on the image data for one frame stored in a past-reference-image portion 615a of the frame memory 615, motion compensation corresponding to the motion vector supplied from the VLDs 581. The motion compensating section 613 supplies the generated predictive image data to the frame data generating section 614.

When the next image data the frame data generating section 614 generates is a B-picture, the motion compensating section 613 generates predictive image data by performing motion compensation (corresponding to the motion vector supplied from the VLDs 581), in response to the prediction mode supplied from the VLDs 581, image data stored in the past-reference-image portion 615a of the frame memory 615 (in the case of the forward prediction mode), image data stored in a future-reference-image portion 615b of the frame memory 615 (in the case of a reverse prediction mode), or both the image data stored in the past-reference-image portion 615a and the image data stored in the future-reference-image portion 615b (in the case of a bidirectional prediction mode). The motion compensating section 613 supplies the generated predictive image data to the frame data generating section 614.

When the image data stored in the future-reference-image portion 615b is a P-picture, and decoding of a B-picture which is anteriorly positioned than the P-picture entirely finishes, the motion compensating section 613 reads the P-picture stored in the future-reference-image portion 615b, and supplies the read P-picture to the frame data generating section 614 without performing motion compensation.

Under the control of the decoding control section 564, the frame data generating section 614 stores the image data supplied from the IDCT section 612, generates image data for one frame, and outputs the generated image data. Specifically, when the image data supplied from the IDCT section 612 represents an I-picture, or one of a P-picture in an intraframe prediction mode and a B-picture, the frame data generating section 614 generates image data for one frame on the basis of the image data supplied from the IDCT section 612. In addition, when the image data supplied from the IDCT section 612 is a P-picture or B-picture that does not have the intraframe prediction mode, the frame data generating section 614 generates image data for one frame by adding the predictive image data supplied from the motion compensating section 613 to the image data generated on the basis of the image data supplied from the IDCT section 612.

When the generated image data represents an I-picture, the frame data generating section 614 outputs the generated image data to the exterior (for example, to the signal processing unit 125 through the bus 130) of the decoding unit 601, and stores the generated image data in the past-reference-image portion 615a or future-reference-image portion 615b of the frame memory 615. When the generated image data represents a P-picture, the frame data generating section 614 stores the generated image data in the future-reference-image portion 615b of the frame memory 615 without outputting the generated image data to the exterior of the decoding unit 601. When the generated image data is a B-picture, the frame data generating section 614 outputs the generated image data to the exterior of the decoding unit 601.

In addition, when the motion compensating section 613 supplies the frame data generating section 614 with the image data (P-picture) stored in the future-reference-image portion 615b, the frame data generating section 614 outputs the supplied image data to the exterior of the decoding unit 601.

The frame data generating section 614 supplies the decoding control section 564 with information that reports that the latter half of the decoding process has finished.

As described above, in the frame memory 615, the image data (I-picture or P-picture) for use in generating the predictive image data is stored in the past-reference-image portion 615a or the future-reference-image portion 615b. In addition, the image data is transferred (bank switching is performed) between the past-reference-image portion 615a and the future-reference-image portion 615b, if necessary.

Next, the decoding process executed by the decoding unit 551 is described below with reference to the flowcharts shown in FIGS. 30 and 31. For brevity of description, it is assumed that the block type of each macroblock is an intra-type (intraframe encoded type). In addition, for brevity of description, steps concerning the above-described processing (for example, step S365 to S367 in FIG. 26) for responding to the occurrence of the error are omitted in the flowcharts in FIGS. 30 and 31.

Figure 25:
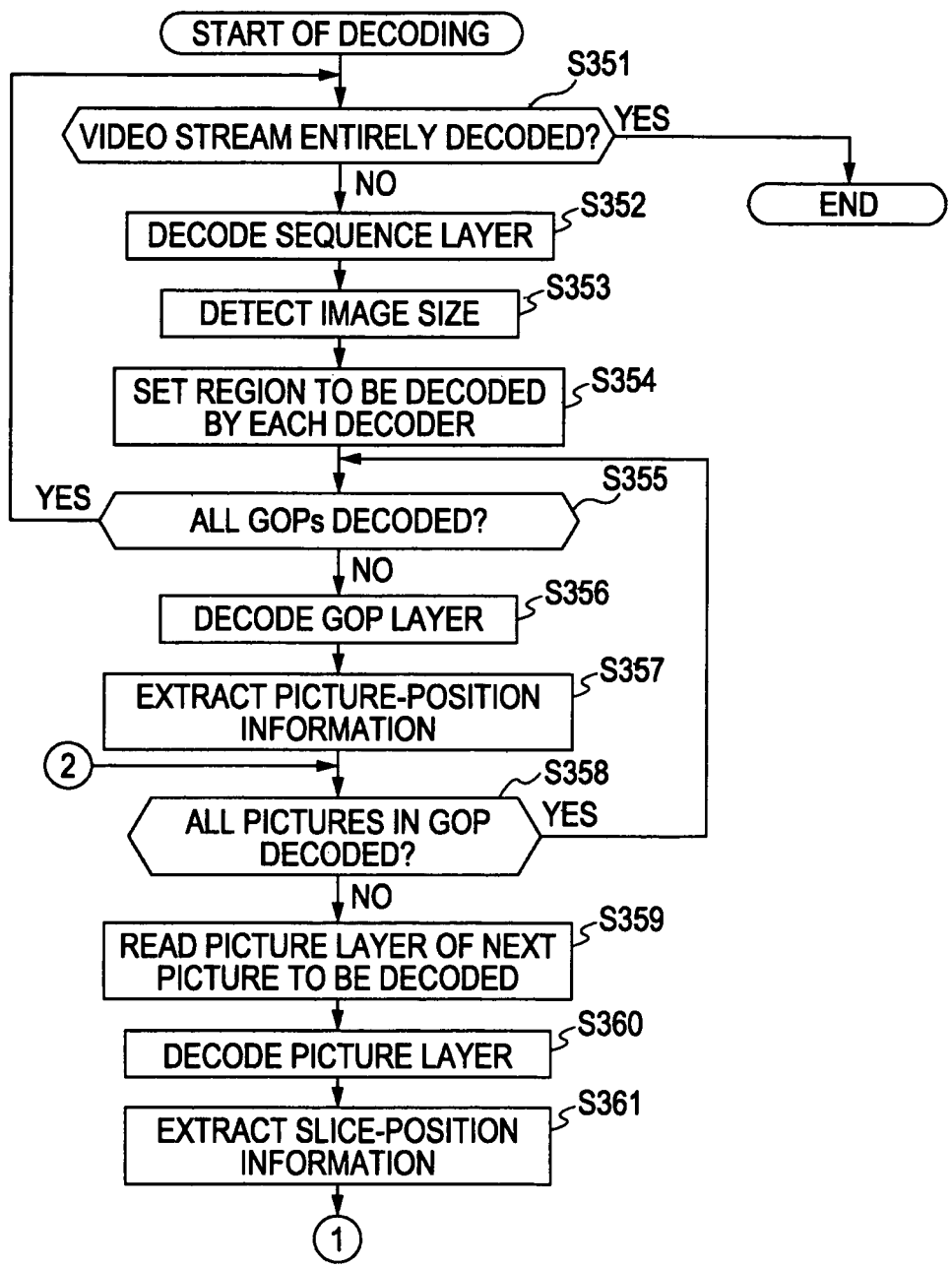
FIG. 25 is a flowchart illustrating a decoding process executed by the decoding unit shown in FIG. 24.
Figure 26:
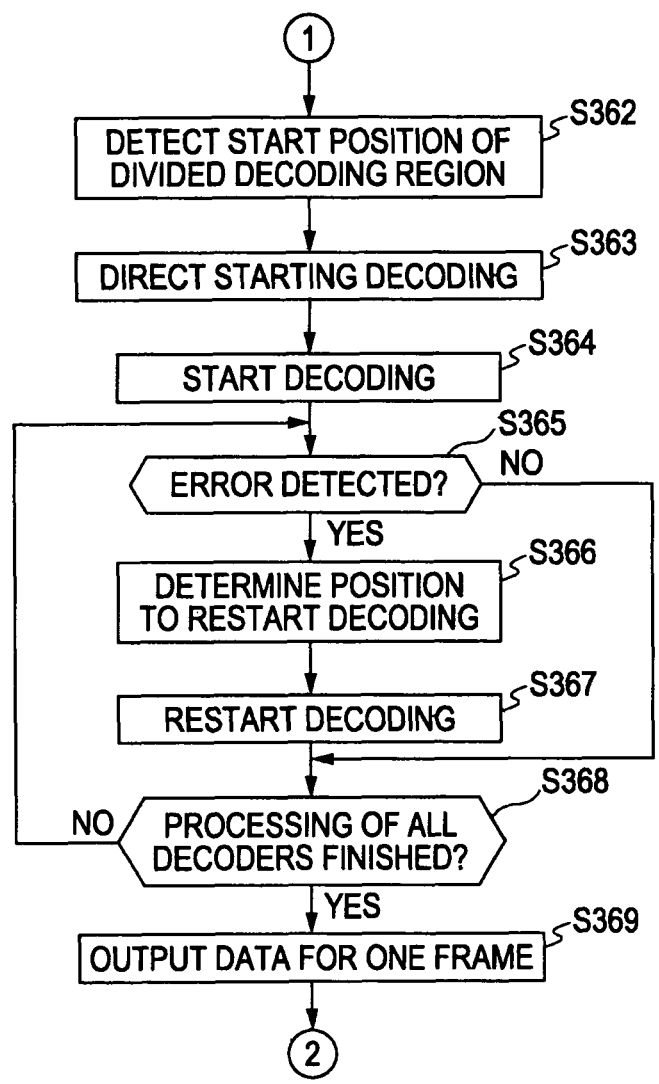
FIG. 26 is a flowchart illustrating the decoding process executed by the decoding unit shown in FIG. 24.

Step S451 and S462 are not described since both are similar to steps S351 and S362 in FIGS. 25 and 26 and their description is a repetition.

In step S463, the decoding control section 564 directs starting the first half of the decoding process. Specifically, the decoding control section 564 supplies the stream-reading control section 461 with information that directs supplying each decoder 465 with the slice included in each divided decoding region starting at the start position detected in step S462. In addition, the decoding control section 464 supplies each decoder 565 with information that directs starting the first half of the decoding process for the next picture.

In step S464, the decoders 565 perform the first half of the decoding process. Details of the first half of the decoding process are described later with reference to FIG. 32.

In step S456, the decoding control section 564 determines whether or not processing of all the decoders 565 has finished. Specifically, the decoding control section 564 determines whether or not to have been supplied with information that reports that decoding of all the slices in the divided decoding regions assigned to the decoders 565 has finished. The decoding control section 564 repeatedly performs the determination in step S465 until all the decoders 565 supply the decoding control section 564 with the information that reports the termination of decoding. When the information that reports the termination of decoding is supplied, the decoding control section 564 determines that the processing of all the decoders 565 has finished, and the process proceeds to step S458. After that, processing in step S458 and subsequent steps is executed.

Next, details of the first half of the decoding process are described below with reference to the flowchart shown in FIG. 32.

In step S501, the VLD 581 performs variable length decoding. Specifically, the VLD 581 performs variable length decoding on the first macroblock in the slice supplied from the stream-reading control section 561. The VLD 581 supplies the variable-length-decoded macroblocks to the IQ 582. The VLD 581 supplies the IQ 582 with information of a quantization scale for use in inverse quantization of macroblocks.

In step S502, the IQ 582 performs inverse quantization. Specifically, in accordance with the quantization scale supplied from the VLD 581, the IQ 582 inverse-quantizes the macroblocks supplied from the VLD 581.

In step S503, the IQ 582 stores the data inverse-quantized in step S502 in the slice-date storage memory 572.

In step S504, the IQ 582 determines whether or not data for one slice is stored in the slice-date storage memory 572. Specifically, when the data inverse-quantized by the IQ 582, stored in the slice-date storage memory 572, does not reach a one-slice data amount, the IQ 582 determines that the data for one slice has not been stored yet. The process returns to step S501. In step S504, processing in steps S501 to S504 is repeatedly executed until it is determined that the data for one slice is stored. In other words, the second and subsequent macroblocks from the first macroblock are sequentially variable-length-decoded and inverse-quantized.

If, in step S504, the data inverse-quantized by the IQ 582, stored in the slice-date storage memory 572, reaches a one-slice data amount, the IQ 582 determines that data for one slice has already been stored in the slice-date storage memory 572, and the process proceeds to step S502.

In step S505, the IQ 582 determines whether or not processing of the GPU 521 has finished. Specifically, from the decoding control section 564, the IQ 582 acquires information indicating whether or not processing of the GPU 521 is being executed. When the processing of the GPU 521 is being executed, the IQ 582 determines that the processing of the GPU 521 has not finished yet, and the process proceeds to step S506.

In step S506, the IQ 582 determines whether or not all the macroblocks in the divided decoding regions have been processed. If all the macroblocks in the divided decoding regions have not been processed yet, that is, when macroblocks which are not variable-length-decoded and inverse-quantized exist in the divided decoding region assigned to the IQ 582, the process returns to step S501. Variable length decoding and inverse quantization of the macroblocks in the divided decoding region are continuously performed.

If, in step S506, it is determined that all the macroblocks in the divided decoding region have already been processed, that is, when all the macroblocks in the divided decoding region assigned to the IQ 582 are variable-length-decoded and inverse-quantized, the process proceeds to step S507.

Similarly to step S505, in step S507, it is determined whether or not the processing of the GPU 521 has finished. Step S507 is repeatedly executed until it is determined that the processing of the GPU 521 has finished. If the processing of the GPU 521 has finished, that is, when the GPU 521 is in an idle state, the process proceeds to step S508.

In step S508, the IQ 582 transfers the inverse-quantized data. Specifically, in the data inverse-quantized by the IQ 582, stored in the slice-date storage memory 572, the first data for one slice is transferred to the transfer memory 573 by the IQs 582.

In step S509, the decoding control section 564 directs starting the latter half of the decoding process. The decoding control section 564 supplies the memory transfer control section 574 and the decoding unit 601 with information that directs starting the latter half of the decoding process for the slice stored in the transfer memory 573. This starts the latter half of the decoding process, which is described later with reference to FIG. 33. After that, the process proceeds to step S513.

If, in step S505, it is determined that the processing of the GPU 521 has finished, the process proceeds to step S510.

Similarly to step S507, in step S510, the inverse-quantized data for one slice is transferred to the transfer memory 573.

Similarly to step S509, in step S511, the latter half of the decoding process is directed to start.

Similarly to step S506, in step S512, it is determined whether or not all the macroblocks in the divided decoding region have been processed. If it is determined that all the macroblocks in the divided decoding region have not been processed yet, the process returns to step S501, and the variable length decoding and inverse quantization of the macroblocks in the divided decoding region are continuously performed.

If, in step S512, it is determined that all the macroblocks in the divided decoding region have been processed, the process proceeds to step S513.

In step S513, the IQ 582 determines whether or not to have transferred all the inverse-quantized data. When, in the data inverse-quantized by the IQ 582, data that has not been transferred to the transfer memory 573 yet remains in the slice-date storage memory 572, the IQ 582 determines that it has not transferred the inverse-quantized data yet, and the process returns to step S507. After that, processing in steps S507, S508, and S513 is repeatedly executed until, in step S513, it is determined that the inverse-quantized data has all been transferred.

If, in step S513, it is determined that the inverse-quantized data has all been transferred, the process proceeds to step S514.

In step S514, the decoder 565 reports the termination of the first half of the decoding process, and the first half of the decoding process finishes. Specifically, the decoder 565 supplies the decoding control section 564 with information that reports the termination of the first half of the decoding process.

The first half of the decoding process has been described, with one decoder noted. Actually, the first half of the decoding process is executed by the decoders 565-1 to 565-4 in parallel.

Figure 32:
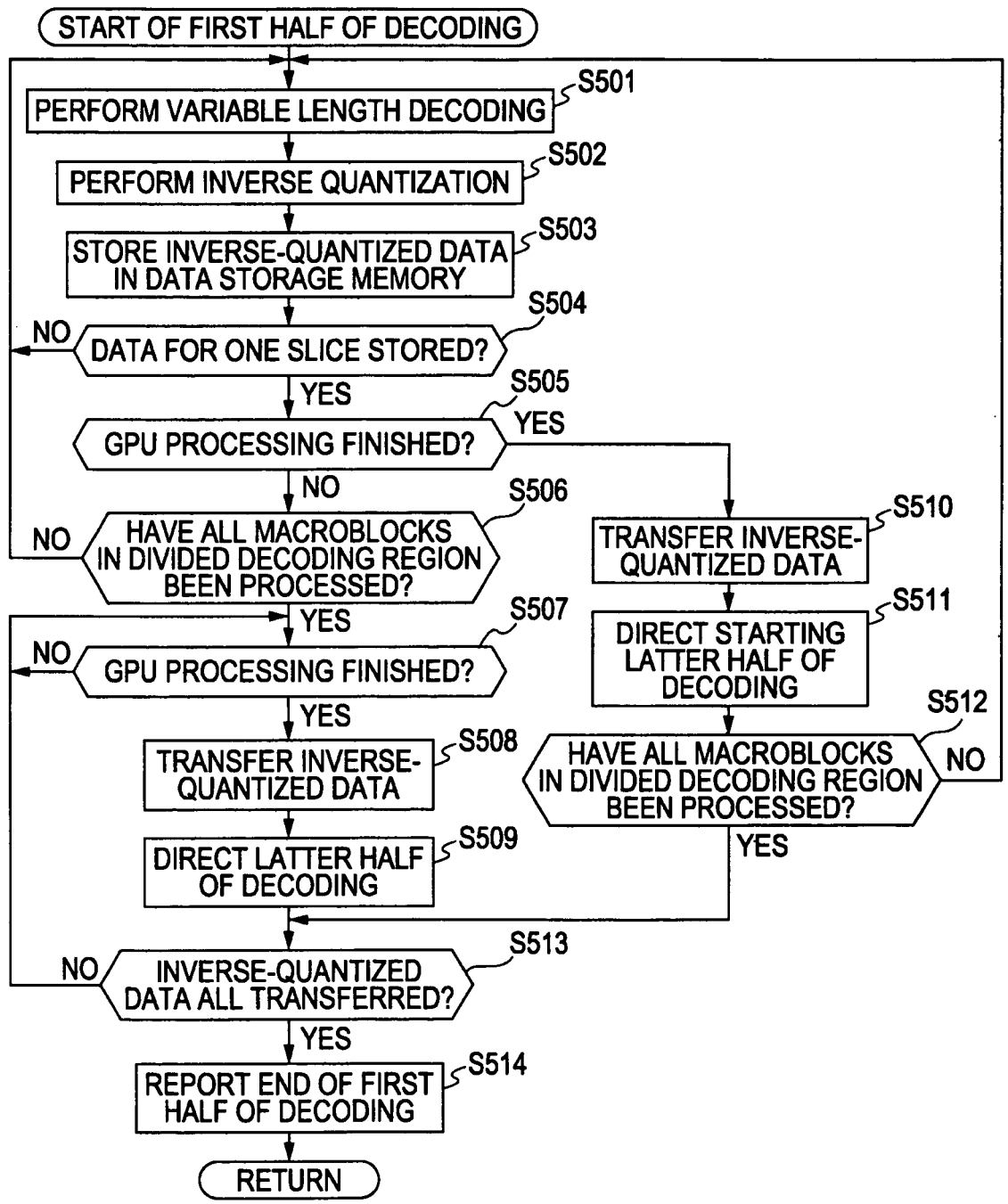
FIG. 32 is a flowchart illustrating details of the first half of a decoding process in step S464 in FIG. 31.

Next, the latter half of the decoding process that is executed by the decoding unit 551 and the decoding unit 601 correspondingly to the first half of the decoding process in FIG. 32 is described below with reference to the flowchart shown in FIG. 33. The latter half of the decoding process is executed in parallel with the first half of the decoding process which is executed by the decoder 565 and which has been described above with reference to FIG. 32.

In step S521, the memory transfer control section 574 determines whether or not the latter half of the decoding process has been directed to start. The determination in step S521 is repeatedly executed until it is determined that latter half of the decoding process has been directed to start. When, in step S509 or S511 in FIG. 32, the information that directs starting the latter half of the decoding process is supplied from the decoding control section 564 to the memory transfer control section 574, it is determined that the latter half of the decoding process has been directed to start, and the process proceeds to step S522.

In step S522, the memory transfer control section 574 transfers the data. Specifically, the memory transfer control section 574 transfers and stores, in the slice-data memory 611 in the decoding unit 601, through the bus 130, the inverse-quantized data for one slice stored in the decoding unit 601.

In step S523, the IDCT section 612 performs IDCT processing. Details of the IDCT processing are described later with reference to FIG. 34.

In step S524, the frame data generating section 614 determines whether or not image data for one frame has been decoded. If it is determined that the image data for one frame has not been decoded yet, the process proceeds to step S525.

In step S525, the frame data generating section 614 outputs the image data for one frame. Specifically, the frame data generating section 614 outputs, to the exterior (for example, to the signal processing unit 125 through the bus 130), image data for one frame whose decoding has been completed.

If, in step S524, it is determined that the image data for one frame has not been decoded yet, the process proceeds to step S526, skipping over step S525.

In step S526, the frame data generating section 614 reports the termination of the latter half of the decoding process. Specifically, the frame data generating section 614 uses the bus 130 to supply the decoding control section 564 with information that reports that the latter half of the decoding process has finished. After that, the process returns to step S521, and the above processing in step S521 and subsequent steps is executed.

Figure 33:
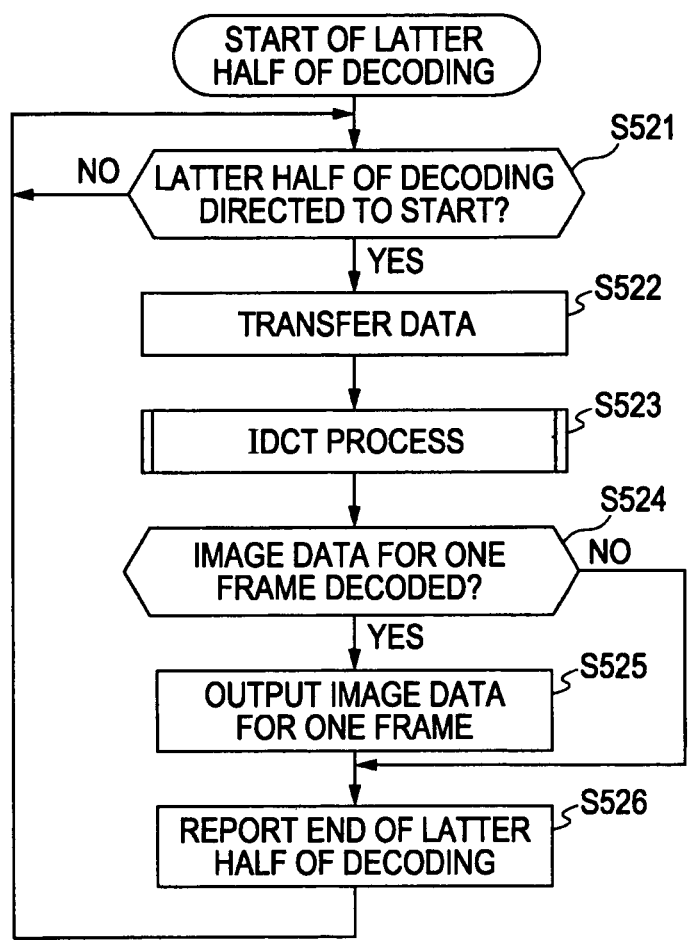
FIG. 33 is a flowchart illustrating the latter half of the decoding process executed by the decoding unit shown in FIG. 28 and the decoding unit shown in FIG. 29.

Next, details of the IDCT processing in step S523 in FIG. 33 are described below with reference to the flowchart shown in FIG. 34.

In step S541, the IDCT section 612 generates texture. Specifically, the IDCT section 612 reads data for one slice stored in the slice-data memory 611.

Figure 35:
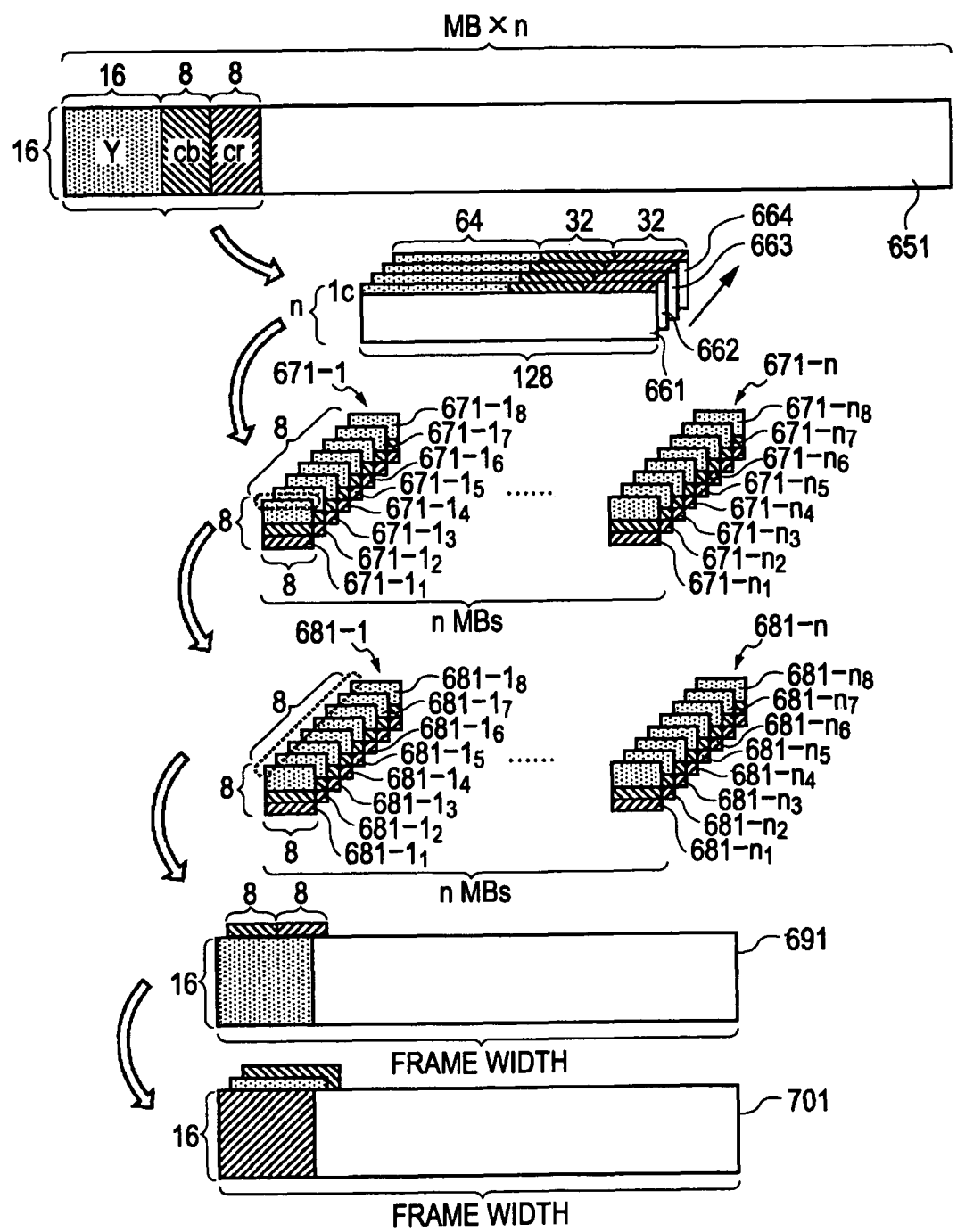
FIG. 35 is an illustration of transition of data generated by the IDCT process.

The IDCT processing is described below, assuming that the data for one slice has the format of a slice 651 in FIG. 35. The format 651 includes n macroblocks (MBs). One macroblock includes 16 by 16 pieces of luminance information Y, 16 by 8 pieces of color-difference information Cb, and 16 by 8 pieces of color-difference information Cr. In other words, the ratio of three components, that is, luminance information Y and color-difference information Cb and Cr, is 4:2:2. Pieces of information are disposed from the beginning in the order of 16 vertical pieces by 16 horizontal pieces of luminance information Y, 16 vertical pieces by 8 horizontal pieces of color-difference information Cb, 16 vertical pieces by 8 horizontal pieces of color-difference information Cr, 16 vertical pieces by 8 horizontal pieces of color-difference information Cb, and 16 vertical pieces by 8 horizontal pieces of color-difference information Cr.

For each of the macroblocks included in the slice 651, the IDCT section 612 generates four columns of information which is obtained by disposing 16 pieces of luminance information Y, 16 pieces of color-difference information Cb, 16 pieces of color-difference information Cr, 16 pieces of color-difference information Cb, and 16 pieces of color-difference information Cr. The IDCT section 612 generates four textures 661 to 664 in which four columns of information generated from each macroblock are arranged in order. Thus, one texture includes n vertical pieces by 128 horizontal pieces of information.

In step S542, the IDCT section 612 performs row conversion. Specifically, from information disposed in the first (horizontal) rows of the textures 661 to 664, that is, information included in the first macroblock of the slice 651, the IDCT section 612 generates a three-dimensional block 671-1 that includes 8 vertical pieces by 8 horizontal pieces by 8 temporal pieces of information.

The pieces of information that form the three-dimensional block 671-1 are generated such that, in accordance with a predetermined rule, the pieces of information in the first (horizontal) rows of the textures 661 to 664 are multiplied by a predetermined coefficient and the pieces multiplied by the predetermined coefficient are added up. The three-dimensional block 671-1 has pieces of luminance information Y disposed in the first to fourth rows from top, pieces of color-difference information Cb disposed in the fifth to sixth rows from top, and pieces of color-difference information Cr disposed in the seventh and eighth rows from top.

In step S543, the IDCT section 612 determines whether or not the row conversion has all finished. If it is determined that the row conversion has not all finished yet, the process proceeds to step S542, and, in step S543, processing in steps S542 and S543 is repeatedly executed until it is determined that the row conversion has all finished. In other words, for the rows of the textures 661 to 664, the above row conversion is sequentially performed. As a result, three-dimensional blocks 671-1 to 671-n are generated.

Eight two-dimensional blocks which form three-dimensional blocks 671-m (m=1, 2, 3, . . . , n) and which each include 8 vertical pieces by 8 horizontal pieces of information are hereinafter referred to as "two-dimensional blocks 671-$m_1$ to 671-$m_8$", where m=1, 2, 3, . . . , n.

If, in step S543, it is determined that the row conversion has all finished, the process proceeds to step S544.

In step S544, the IDCT section 612 performs column conversion. Specifically, from the three-dimensional block 671-1 generated from the first macroblock of the slice 651, in accordance with a predetermined rule, the IDCT section 612 generates a three-dimensional block 681-1 including 8 vertical pieces by 8 horizontal pieces by 8 temporal pieces of information.

The temporal pieces in the columns of the three-dimensional block 681-1 are generated such that the horizontal pieces in the rows of the three-dimensional block 671-1, which are associated with the columns in accordance with a predetermined rule, are multiplied by a predetermined coefficient and the pieces multiplied by the coefficient are added up. For example, the temporal pieces in the column of the three-dimensional block 681-1, at the left end on the outermost plane, are generated such that horizontal pieces of information in the first row of the two-dimensional block 671-11 forming the three-dimensional block 671-1, which corresponds to the column, are multiplied by a predetermined coefficient and the pieces multiplied by the coefficient are added up. In addition, the block 681-1 has pieces of luminance information Y disposed in the first to fourth rows from top, pieces of color-difference information Cb disposed in the fifth and sixth rows from top, and pieces of color-difference information Cr disposed in the seventh and eighth rows from top.

In step S545, the IDCT section 612 determines whether or not the column conversion has all finished. If it is determined that the column conversion has not all finished yet, the process returns to step S544, and processing in steps S544 and S545 is repeatedly executed until it is determined that column conversion has all finished. In other words, for the three-dimensional blocks 671-1 to 671-n, the above column conversion is sequentially performed. As a result, three-dimensional blocks 681-1 to 681-n are generated.

Eight two-dimensional blocks which form three-dimensional blocks 681-m (m=1, 2, 3, . . . , n) and which each include 8 vertical pieces by 8 horizontal pieces of information are hereinafter referred to as "two-dimensional blocks 681-$m_1$ to 681-$m_8$", where m=1, 2, 3, . . . , n.

If, in step S545, it is determined that the column conversion has all finished, the process proceeds to step S546.

In step S546, the IDCT section 612 rearranges pieces of information. Specifically, as shown in FIG. 36, from the pieces of luminance information Y included in the outermost plane (the top rows of the two-dimensional blocks 681-$m_1$ to 681-$m_8$) of the three-dimensional block 681-1, the IDCT section 612 generates a macroblock 711-1 having 8 by 8 pieces of information. Similarly, from the pieces of luminance information Y included in the second plane from top of the block 681-1, the IDCT section 612 generates a macroblock 711-2. From the pieces of luminance information Y included in the third place from top, the slice-data memory 611 generates a macroblock 711-3, and, from the pieces of luminance information Y from top, the slice-data memory 611 generates a macroblock 711-4.

When a slice-included picture that is being decoded has a field structure, the IDCT section 612 generates macroblocks 712-1 and 712-2 in which the rows of the macroblocks 711-1 and 711-3 are alternately arranged, and macroblocks 712-3 and 712-4 in which the macroblocks 711-2 and 711-4 are alternately arranged. The IDCT section 612 generates a 16-by-16 macroblock 713 having the macroblock 712-1 at the top left, the macroblock 712-2 at the bottom left, the macroblock 712-3 at the top right, and the macroblock 712-4 at the bottom right, as shown in the upper right part of FIG. 36.

When the slice-included picture that is being decoded has a frame structure, the IDCT section 612 generates a 16-by-16 macroblock 714 having the macroblock 711-1 at the top left, the macroblock 711-2 at the top right, the macroblock 711-3 at the bottom left, and the macroblock 711-4 at the bottom right, as shown in the lower right part of FIG. 36.

The IDCT section 612 similarly rearranges also the pieces of luminance information Y included in the three-dimensional blocks 681-2 to 681-n. In addition, also the pieces of color-difference information Cr and Cb included in the three-dimensional blocks 681-1 to 681-n are similarly rearranged. The IDCT section 612 also generates a slice 691 in which macroblocks whose pieces of information are rearranged are disposed in order from top. For example, when the slice-included picture has the field structure, as shown in FIG. 37, the macroblocks 712-1 to 712-4 generated from the three-dimensional block 681-1 are disposed at the beginning (at the left end of FIG. 37) of the slice 691. Subsequently, similarly, macroblocks generated from the three-dimensional blocks 681-2 to 688-n are arranged in order.

In step S547, the IDCT section 612 performs RGB conversion, and the ICDT processing finishes. Specifically, by converting luminance information Y and color-difference information Cb and Cr which form slice 691 into red (R), green (G), and blue (B) signals in the RGB system, image data 701 is generated. The IDCT section 612 supplies the generated image data 701 to the 714. The IDCT section 612 uses the bus 130 to supply the decoding control section 564 with information indicating that the IDCT processing has finished.

As described above, by using the CPU 121 and the GPU 521 to divide and execute in parallel the slice-and-lower-layers decoding process, the time necessary for the decoding process can be shortened and the load on the CPU 121 can be reduced. In addition, by using the GPU 521, which is inexpensive than a high performance processor such as a CPU, a necessary cost can be reduced.

As described above, in the cases of controlling frame-position information representing the position of a frame of a video stream, controlling recording of unit-region-position information representing the position of a unit region serving as a processing unit when the video stream is decoded, on the basis of frame-position information representing the position of a frame in a video stream, and unit-region-position information representing the position of a unit region serving as a processing unit used when the video stream is decoded, detecting a decoding-start position at which decoding of the video stream is started, and controlling decoding of the video stream so as to be started at the decoding start position, a time necessary to detecting a start position of decoding the video stream can be shortened, thus making it possible to decode the video stream at increased speed.

The above-described description exemplifies a case in which the number of decoders realized by the CPU 121 is four. However, the number of the decoders may be a value other than four.

The above-described description exemplifies a case in which the number of decoders realized by the GPU 521 is one. However, a plurality of decoders may be realized by a single GPU, and, by providing a plurality of decoders, parts of the latter half of the decoding process may be executed in parallel by the decoders.

Although, in the above-described description, the CPU 121 is formed by a multicore processor, by providing a plurality of processors such as CPUs, processes of decoders realized by the CPU 121 may be executed in parallel by the processors.

The above-described description exemplifies a case in which a video stream is encoded or decoded in MPEG-2. However, an embodiment of the present invention is applicable to a case in which a video stream is encoded or decoded in a system that does not record information which represents frame positions (for example, a relative position from the start of the video stream, a position at which the video stream is recorded on a recording medium, etc.) of the video stream, or the positions (for example, a relative position from the start of the video stream, a position at which the video stream is recorded on a recording medium, etc.) of processing units for use in decoding the video stream. In addition, an embodiment of the present invention is applicable to a case in which a plurality of decoders decode, in parallel, a video stream encoded in a method having a plurality of processing units included in a region of the video stream corresponding to a one-frame image of the video stream.

Figure 30:
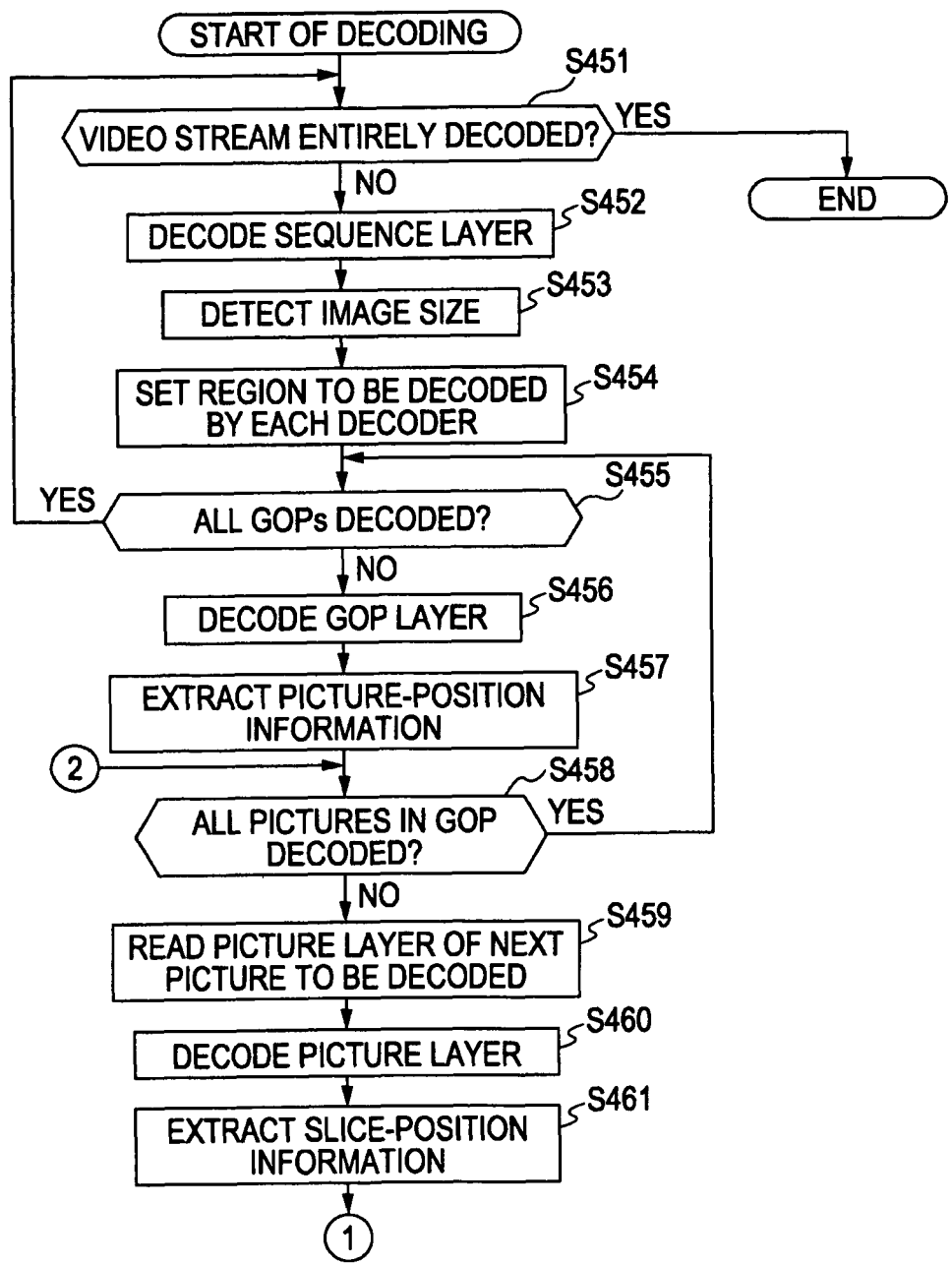
FIG. 30 is a flowchart illustrating a decoding process executed by the decoding unit shown in FIG. 28.
Figure 31:
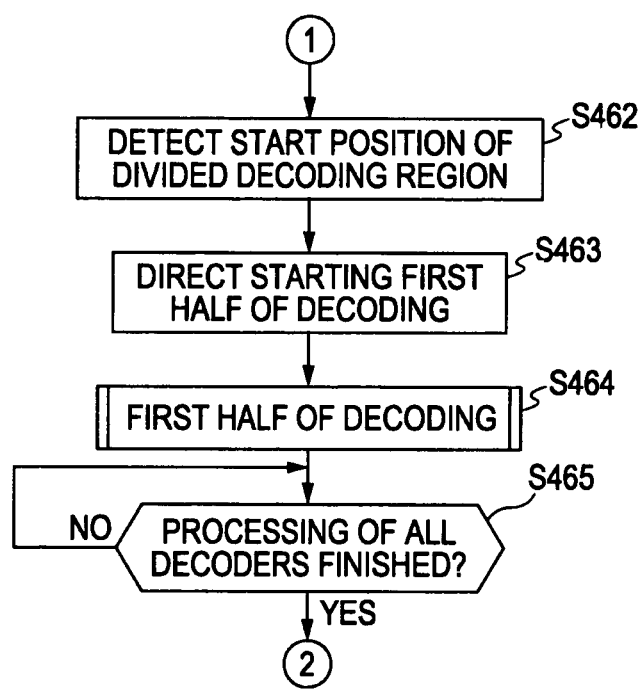
FIG. 31 is a flowchart illustrating the decoding process executed by the decoding unit shown in FIG. 28.

In addition, in step S509 or S511 in FIG. 30, the decoding control section 564 may store, in the transfer memory 573, history information that indicates to which stage a slice stored in the transfer memory 573 has been decoded. This clearly indicates to which stage the slice stored in the transfer memory 573 has been decoded. Thus, for example, when the decoding process is performed in a form divided into three or more stages, the slice stored in the transfer memory 573 may be used as information for determining which decoder performs decoding.

The above-described consecutive processing may be executed either by hardware (for example, the signal processing unit 125 in FIG. 2 or FIG. 27) or by software. When software is used to execute the above-described consecutive processing, a program that forms the software is installed from a network or a recording medium to, for example, the AV processing apparatus 111 or the like.

This recording medium is formed not only by the removable medium 117, which contains a program, and which is distributed separately from a computer in order to provide a user with the program, but also by the ROM 122, HDD 124, or the like, which contains a program, and which is provided to the user in a state built into a computer.

In this specification, steps constituting the program contained in the recording medium include not only those executed in a time-series manner in given order but also those which are executed in parallel or separately if not necessarily executed in a time-series manner.

In this specification, the term "system" means the entirety of apparatuses, a plurality of means, etc.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding method comprising the steps of:
controlling recording of frame-position information representing the position of a frame in a video stream; and
controlling recording of unit-region-position information representing the position of a unit region serving as a processing unit used when the video stream is decoded, wherein
in the frame-position-recording controlling step, the recording of the frame-position information is controlled so that the frame-position information is recorded in a frame position information file different from a file of the video stream, wherein said frame position information file being accessible without accessing said file of the video stream, and said frame-position information file and said file of the video stream are two separate files and not a single stream having multiple files therein, said frame position file including picture position information and slice position information that is not included in the file of the video stream.

2. The encoding method according to claim 1, wherein:
in the unit-region-position-recording controlling step, the recording of the unit-region-position information is controlled so that the unit-region-position information is recorded in the video stream when the video stream is in encoded form.

3. The encoding method according to claim 1, wherein:
in the unit-region-position-recording controlling step, the recording of the unit-region-position information is controlled so that the unit-region-position information is recorded in the different file.

4. The encoding method according to claim 1, wherein the video stream is encoded by using an MPEG standard, and the unit region is a slice.

5. The encoding method according to claim 4, wherein:
in the frame-position-recording controlling step, the recording of the frame-position information is controlled so that the frame-position information is recorded in a user data field of one of a sequence layer and a GOP layer which are included in the video stream encoded in the MPEG standard; and
in the unit-region-position-recording controlling step, the recording of the unit-region-position information is controlled so that the unit-region-position information is recorded in a user data field of a picture layer of the video stream encoded in the MPEG standard.

6. The encoding method according to claim 1, wherein:
the frame-position information includes information representing a relative position of the frame with respect to the beginning of the video stream; and
the unit-region-position information includes information representing a relative position of the unit region with respect to the beginning of the video stream.

7. The encoding method according to claim 6, wherein:
the frame-position information includes information representing a number assigned to the frame and a data length of the frame; and
the unit-region-position information includes information representing a number assigned to the unit region in the frame and a data length of the unit region.

8. The encoding method according to claim 1, wherein:
the frame-position information includes information representing a position on a data recording medium at which the frame is recorded; and
the unit-region-position information includes information representing a position on the data recording medium at which the unit region is recorded.

9. The encoding method according to claim 8, wherein:
the frame-position information includes information representing a number assigned to the frame and a data length of the frame; and
the unit-region-position information includes information representing a number assigned to the unit region in the frame and a data length of the unit region.

10. An encoding apparatus comprising:
encoding means which encodes a video stream; and
recording control means which controls recording of frame-position information and unit-region-position information, the frame-position information representing the position of a frame in the video stream, the unit-region-position information representing the position of a unit region serving as a processing unit used when the video stream is decoded, wherein
the recording control means records the frame-position information in a frame position information file different from a file of the video stream, wherein said frame position information file being accessible without accessing said file of the video stream, and said frame-position information file and said file of the video stream are two separate files and not a single stream having multiple files therein, said frame position file including picture position information and slice position information that is not included in the file of the video stream.

11. A decoding method comprising the steps of:
on the basis of frame-position information representing the position of a frame in a video stream, and unit-region-position information representing the position of at least one unit region serving as a processing unit used when the video stream is decoded, detecting at least one decoding-start position at which decoding of the video stream is started; and
controlling the decoding of the video stream so as to be started at the decoding-start position, wherein
the controlling step reads the frame-position information from a frame position information file different than a file of the video stream, wherein said frame position information file being accessible without accessing said file of the video stream, and said frame-position information file and said file of the video stream are two separate files and not a single stream having multiple files therein.

12. The decoding method according to claim 11, further comprising the step of:
extracting the unit-region-position information from the video stream.

13. The decoding method according to claim 11, further comprising the step of controlling acquisition of the unit-region-position information from a file different from the file of the video stream.

14. The decoding method according to claim 11, wherein:
the video stream is encoded in an MPEG standard; and
said at least one unit region is a slice.

15. The decoding method according to claim 11, wherein:
in the detecting step, on the basis of the frame-position information and the unit-region-position information, the decoding-start positions, which correspond to a plurality of decoding means which perform parallel decoding of the video stream, are detected; and
in the decoding control step, the decoding of the video stream is controlled so that the plurality of decoding means start the parallel decoding at the decoding-start positions.

16. The decoding method according to claim 15, further comprising the step of setting divided regions which are obtained by dividing, by the number of the plurality of decoding means, a region corresponding to an image in one frame of the video stream, and which each include the unit regions,
wherein, in the decoding control step, the decoding of the video stream is controlled so that the divided regions in the frame are decoded in parallel by the plurality of decoding means.

17. The decoding method according to claim 11, wherein:
the frame-position information includes information representing a relative position of the frame with respect to the beginning of the video stream; and
the unit-region-position information includes information representing a relative position of said at least one unit region with respect to the beginning of the video stream.

18. The decoding method according to claim 17, wherein:
the frame-position information includes information representing a number assigned to the frame and a data length of the frame; and
the unit-region-position information includes information representing a number assigned to said at least one unit region in the frame and a data length of said at least one unit region.

19. The decoding method according to claim 11, wherein:
the frame-position information includes information representing a position on a data recording medium at which the frame is recorded; and
the unit-region-position information includes information representing a position on the data recording medium at which said at least one unit region is recorded.

20. The decoding method according to claim 19, wherein:
the frame-position information includes information representing a number assigned to the frame and a data length of the frame; and
the unit-region-position information includes information representing a number assigned to said at least one unit region in the frame and a data length of said at least one unit region.

21. A decoding apparatus for decoding a video stream, comprising:
detecting means which detects a decoding-start position at which decoding of the video stream is started on the basis of frame-position information representing the position of a frame in the video stream, and unit-region-position information representing the position of a unit region serving as a processing unit used when the video stream is decoded; and
decoding control means which controls decoding of the video stream so as to be started at the decoding-start position, wherein
the detecting means retrieves the frame-position information from a frame position information file different than a file of the video stream, wherein said frame position information file being accessible without accessing said file of the video stream, and said frame-position information file and said file of the video stream are two separate files and not a single stream having multiple files therein, said frame position file including picture position information and slice position information that is not included in the file of the video stream.

22. An encoding apparatus comprising:
an encoder encoding a video stream; and
a recording controller controlling recording frame-position information and unit-region-position information, the frame-position information representing the position of a frame in the video stream, the unit-region-position information representing the position of a unit region serving as a processing unit used when the video stream is decoded, wherein
the frame-position information being recorded in a frame position information file different than a file of the video stream, wherein said frame position information file being accessible without accessing said file of the video stream, and said frame-position information file and said file of the video stream are two separate files and not a single stream having multiple files therein, said frame position file including picture position information and slice position information that is not included in the file of the video stream.

23. A decoding apparatus for decoding a video stream, comprising:
a detector detecting a decoding-start position at which decoding of the video stream is started on the basis of frame-position information representing the position of a frame in the video stream, and unit-region-position information representing the position of a unit region serving as a processing unit used when the video stream is decoded; and
a decoding controller controlling the decoding of the video stream so as to be started at the decoding-start position, wherein
the frame-position information being recorded in a frame position information file different than a file of the video stream, wherein said frame position information file being accessible without accessing said file of the video stream, and said frame-position information file and said file of the video stream are two separate files and not a single stream having multiple files therein, said frame position file including picture position information and slice position information that is not included in the file of the video stream.

* * * * *

UNITED STATES PATENT AND TRADEMARK OFFICE
CERTIFICATE OF CORRECTION

PATENT NO. : 8,670,653 B2
APPLICATION NO. : 11/395358
DATED : March 11, 2014
INVENTOR(S) : Sayoko Shibata et al.

It is certified that error appears in the above-identified patent and that said Letters Patent is hereby corrected as shown below:

On the title page, Item (75), the fourth Inventor's country of residence is incorrect.
Item (75) should read:

-- (75) Inventors : Sayoko Shibata, Kanagawa (JP); Zhifang Zeng, Kanagawa (JP); Junichi Ogikubo, Kanagawa (JP); Taro Shigata, Kanagawa (JP) --

Signed and Sealed this
Seventeenth Day of June, 2014

Michelle K. Lee
*Deputy Director of the United States Patent and Trademark Office*